United States Patent
Nakayama et al.

(10) Patent No.: US 7,257,264 B2
(45) Date of Patent: Aug. 14, 2007

(54) IMAGE PROCESSING APPARATUS AND METHOD FOR COMPRESSION-ENCODING IMAGE AREA INFORMATION

(75) Inventors: Tadayoshi Nakayama, Tokyo (JP); Ken-Ichi Ohta, Kanagawa (JP); Hidefumi Osawa, Saitama (JP); Shinichi Kato, Kanagawa (JP); Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 552 days.

(21) Appl. No.: 10/230,276

(22) Filed: Aug. 29, 2002

(65) Prior Publication Data
US 2003/0043905 A1  Mar. 6, 2003

(30) Foreign Application Priority Data

| Aug. 29, 2001 | (JP) | ............................ 2001/259465 |
| Sep. 19, 2001 | (JP) | ............................ 2001/285682 |
| Jan. 10, 2002 | (JP) | ............................ 2002/003894 |

(51) Int. Cl.
 *G06K 9/36* (2006.01)
 *G06K 9/46* (2006.01)

(52) U.S. Cl. .................................... 382/239
(58) Field of Classification Search ............... 358/3.21; 382/239
See application file for complete search history.

(56) References Cited

U.S. PATENT DOCUMENTS

| 5,267,333 A | 11/1993 | Aono et al. .................... 382/56 |
| 5,291,282 A | 3/1994 | Nakagawa et al. ......... 348/384 |
| 5,402,248 A | 3/1995 | Sato et al. .................. 358/426 |
| 5,486,826 A | 1/1996 | Remillard .................... 341/51 |
| 5,543,844 A | 8/1996 | Mita et al. .................. 348/405 |
| 5,581,373 A | 12/1996 | Yoshida ....................... 358/476 |
| 5,604,846 A | 2/1997 | Kadota ....................... 358/1.16 |
| 5,732,157 A | 3/1998 | Osawa ........................ 382/244 |
| 5,757,965 A | 5/1998 | Ohki .......................... 382/232 |

(Continued)

FOREIGN PATENT DOCUMENTS

EP  0469835 A  2/1992

(Continued)

OTHER PUBLICATIONS

"60 to 140 Mbps Compatible HDTV coding," Video Information, Jan. 1992, pp. 51-58.

*Primary Examiner*—Wenpeng Chen
*Assistant Examiner*—Yuzhen Ge
(74) *Attorney, Agent, or Firm*—Fitzpatrick, Cella, Harper & Scinto

(57) ABSTRACT

From inputted multilevel image data it is generated, for each pixel, image area information constituted by an image area component indicating whether the pixel exists in a character•line drawing area or halftone area and an image area component indicating whether the pixel is chromatic or achromatic. The information is encoded by a lossless encoding unit on a block basis and stored, and an amount of code is monitored. When the amount of code exceeds a target amount, the lossless encoding unit performs encoding upon changing image area components, of subsequently input image area components, which coincide with a condition. The codes that have already been stored are temporarily decoded by a lossless code re-encoding unit, and the above image area components are changed. The resultant data is then re-encoded and stored.

51 Claims, 42 Drawing Sheets

U.S. PATENT DOCUMENTS

| | | | | |
|---|---|---|---|---|
| 5,764,806 | A | 6/1998 | Horiuchi et al. | 382/239 |
| 5,801,650 | A | 9/1998 | Nakayama | 341/67 |
| 5,812,146 | A | 9/1998 | Sato et al. | 345/501 |
| 5,818,970 | A | 10/1998 | Ishikawa et al. | 382/248 |
| 5,832,126 | A * | 11/1998 | Tanaka | 382/239 |
| 5,841,381 | A | 11/1998 | Nakayama | 341/67 |
| 5,861,892 | A | 1/1999 | Sato et al. | 345/435 |
| 5,917,947 | A * | 6/1999 | Ishida et al. | 382/232 |
| 5,982,937 | A | 11/1999 | Accad | 382/239 |
| 5,986,594 | A | 11/1999 | Nakayama et al. | 341/107 |
| 5,987,183 | A * | 11/1999 | Saunders et al. | 382/239 |
| 5,991,445 | A | 11/1999 | Kato | 382/232 |
| 5,991,449 | A | 11/1999 | Kimura et al. | 382/238 |
| 5,991,515 | A * | 11/1999 | Fall et al. | 358/1.15 |
| 6,020,975 | A | 2/2000 | Chen et al. | 358/1.16 |
| 6,061,473 | A * | 5/2000 | Chen et al. | 382/235 |
| 6,167,160 | A | 12/2000 | Osawa | 382/247 |
| 6,195,024 | B1 | 2/2001 | Fallon | 341/51 |
| 6,233,355 | B1 | 5/2001 | Kajiwara | 382/238 |
| 6,408,102 | B1 | 6/2002 | Nakayama | 382/246 |
| 6,441,913 | B1 | 8/2002 | Anabuki et al. | 358/1.12 |
| 6,449,058 | B1 | 9/2002 | Ueda | 358/1.16 |
| 6,473,531 | B1 * | 10/2002 | Kunitake | 382/239 |
| 6,549,676 | B1 | 4/2003 | Nakayama et al. | 382/246 |
| 6,552,819 | B2 * | 4/2003 | Osawa et al. | 358/1.17 |
| 6,553,143 | B2 | 4/2003 | Miyake et al. | 382/239 |
| 6,560,365 | B1 | 5/2003 | Nakayama et al. | 382/233 |
| 6,567,562 | B1 | 5/2003 | Nakayama et al. | 382/246 |
| 6,643,405 | B1 * | 11/2003 | Sako | 382/239 |
| 6,704,281 | B1 * | 3/2004 | Hourunranta et al. | 370/230 |
| 6,711,295 | B2 | 3/2004 | Nakayama et al. | 382/232 |
| 6,792,153 | B1 * | 9/2004 | Tsujii | 382/239 |
| 6,832,005 | B2 * | 12/2004 | Malvar | 382/238 |
| 6,865,299 | B1 | 3/2005 | Nakayama | 382/246 |
| 6,898,310 | B1 | 5/2005 | Ohmi et al. | 382/166 |
| 6,952,501 | B2 | 10/2005 | Nakayama | 382/243 |
| 2002/0051230 | A1 | 5/2002 | Ohta | 358/448 |
| 2002/0078113 | A1 | 6/2002 | Nakayama | 708/300 |
| 2002/0090142 | A1 | 7/2002 | Igarashi et al. | 382/246 |
| 2002/0122599 | A1 | 9/2002 | Igarashi et al. | 382/239 |
| 2002/0154042 | A1 | 10/2002 | Igarashi et al. | 341/67 |
| 2002/0164080 | A1 | 11/2002 | Igarashi et al. | 382/233 |
| 2003/0002743 | A1 * | 1/2003 | Ohta et al. | 382/239 |
| 2003/0031371 | A1 | 2/2003 | Kato et al. | 382/239 |
| 2003/0043905 | A1 | 3/2003 | Nakayama et al. | 375/240.04 |
| 2003/0043907 | A1 | 3/2003 | Nakayama | 375/240.08 |
| 2003/0058143 | A1 | 3/2003 | Chiba et al. | 341/67 |
| 2003/0086597 | A1 | 5/2003 | Ohta et al. | 382/131 |
| 2003/0118240 | A1 | 6/2003 | Satoh et al. | 382/239 |
| 2003/0206659 | A1 * | 11/2003 | Hamanaka | 382/239 |

FOREIGN PATENT DOCUMENTS

| | | |
|---|---|---|
| JP | 8-32037 B4 | 3/1996 |
| JP | 2523953 B2 | 8/1996 |
| JP | 2897563 B2 | 5/1999 |
| JP | 3038022 B2 | 8/2000 |

* cited by examiner

F I G. 13
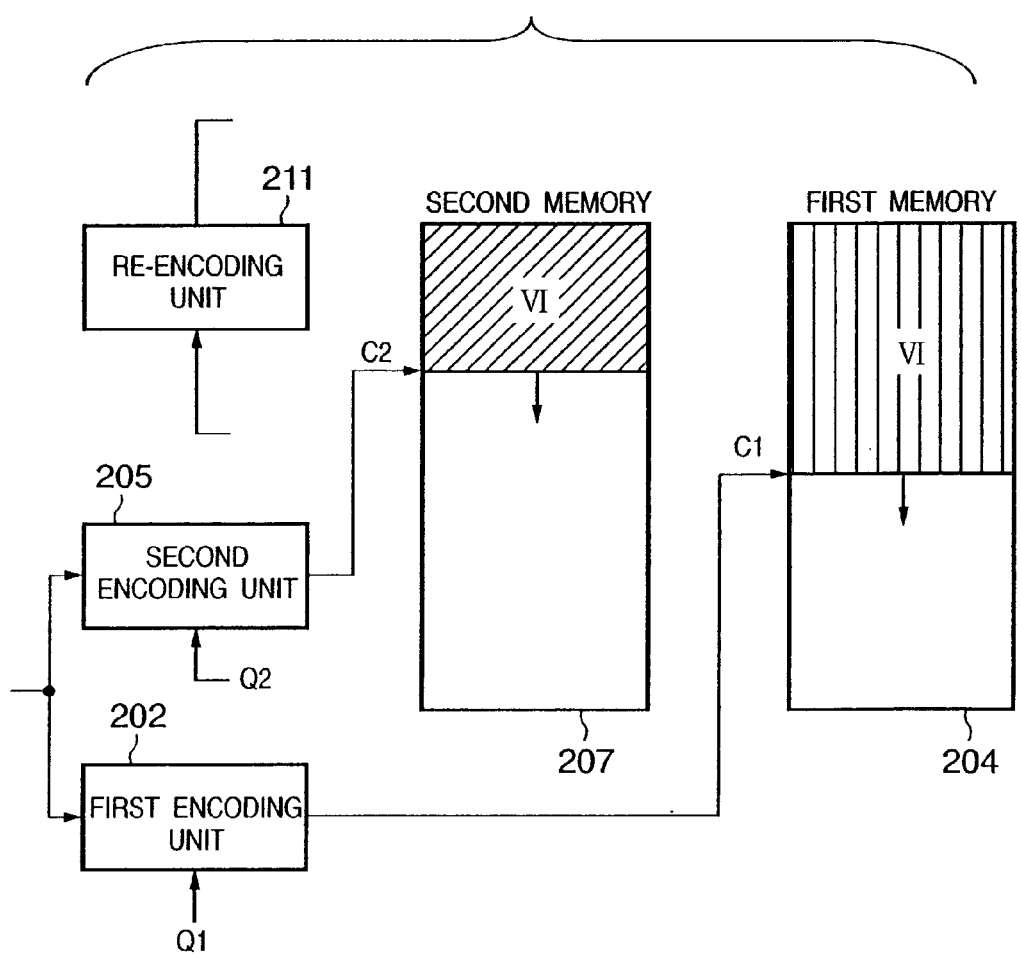

FIG. 19A  000000BB(8BITS)

1/0
— CHARACTER/NON-CHARACTER PORTION FLAG
— CHROMATIC/ACHROMATIC FLAG

FIG. 24A  000000BB(8BITS)
                              ↑↑
                              │└── CHROMATIC/ACHROMATIC FLAG
                              └── CHARACTER/NON-CHARACTER PORTION FLAG (1/0)

FIG. 30A 000000BB (8BITS)

1/0
　　　　　　　　CHARACTER/NON-CHARACTER PORTION FLAG
　　　　　　　　CHROMATIC/ACHROMATIC FLAG

NINTH EMBODIMENT

FLOW CHART OF LOSSLESS ENCODING PROCESSING IN NINTH EMBODIMENT

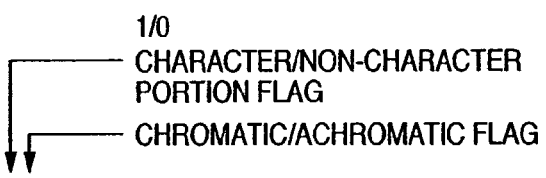
FIG. 36A  000000BB (8BITS)
FIG. 36B  1,1,1,1,2,3,2,3,2,2,2,2,2,1,0,1,0,0,0,0,0,0,2,
FIG. 36C  -4,1,4,2,3,2,3,-5,2,3,1,0,1,-6,0,
FIG. 36D  1,1,1,1,3,3,3,3,3,3,3,3,3,1,1,1,1,1,1,1,1,1,3,
FIG. 36E  -4,1,-9,3,-9,1,

10TH EMBODIMENT

IMAGE PROCESSING APPARATUS AND METHOD FOR COMPRESSION-ENCODING IMAGE AREA INFORMATION

FIELD OF THE INVENTION

The present invention relates to an image processing apparatus having a function of compression-encoding image data and image area information accompanying the image data falls within a predetermined amount of code.

BACKGROUND OF THE INVENTION

Conventionally, as still image compression schemes, a JPEG scheme using discrete cosine transform and a scheme using Wavelet transform are used in many cases. An encoding scheme of this type is a variable-length encoding scheme, and hence the amount of code changes for each image to be encoded.

According to the JPEG scheme as an international standardization scheme, only one quantization matrix can be defined for an image. If, therefore, this scheme is applied to a system which cannot adjust an amount of code without prescan and stores codes in a limited memory, a memory overflow may occur.

In order to prevent this, conventional schemes used a method of re-reading an original upon changing the compression ratio when the actual amount of code exceeds an expected amount of code, a method of estimating an amount of code in advance by prescan and re-setting quantization parameters to adjust the amount of code, and the like.

As an amount of code control scheme using prescan, for example, a scheme of storing pre-compressed data in an internal buffer memory, decompressing the data, full-compressing it upon changing the compression parameter, and outputting the resultant data to an external memory is available. In this case, the compression ratio in full-compression is higher than that in pre-compression.

Another scheme is known, in which an allowable amount of code for each pixel block is obtained, and the coefficients obtained by level-shifting DCT coefficients n times are Huffman-encoded to reduce the amount of code. This shifting times n is determined from the allowable amount of code.

Conventionally, however, a compression buffer with a capacity larger than a target compression capacity is required as a compression buffer, and a buffer having a capacity large enough to record original image data is inevitably required to prevent an overflow in an intermediate buffer.

In addition, in the method of repeating encoding operation, since decoding and re-compression operations are performed for the overall compressed data, an increase in the speed of continuous processing cannot be expected.

On the other hand, so-called image area information accompanies original image data. The image area information is mainly used to color processing or adjustment of the number of graylevels in an image output unit in order to improve the appearance of an output image. Consider a natural image having both chromatic and achromatic components and black characters that are often seen in an original. The natural image can be made to look more like a natural image and black characters can be sharpened by using different types of black inks.

If attribute flag data, each consisting one bit and identifying a chromatic component, achromatic component, or character portion, is provided for each pixel, the quality of an output image can be improved at the time of image output, and in particular, at the time of printout. The image area information includes information other than the above information.

To compress image information, the above image area information must be compressed as well as image data. The image area information is a set of binary data. This information must be basically compressed by using a lossless encoding scheme. Conventionally, the PackBits and JBIG encoding schemes have been used to compress image area information.

However, amount of code adjustment cannot be done by simply compressing the above image area information using such an encoding scheme. When such a scheme is used in a system designed to store data in a limited memory, memory overflow may occur, posing a serious problem.

Conventionally, however, studies have been centered on the compression of image data, but little studies have been made on the compression of image area information. In addition, almost no consideration has been given to compressing the image area information into an amount of code within a target value, and the image area information has been simply encoded by using a given encoding scheme.

SUMMARY OF THE INVENTION

The present invention has been made in consideration of the prior art described above, and has as its object to provide an effective image processing apparatus which makes the amount of code of input image area information fall within a target value, a control method for the apparatus, a computer program, and a storage medium.

It is another object of the present invention to provide an image processing apparatus which can effectively generate code which falls within a set size without requiring re-inputting of an image, and can also efficiently compress the attribute information of the image, a control method for the apparatus, a computer program, and a storage medium.

In order to achieve the above objects, for example, an image processing apparatus according to the present invention has the following arrangement.

There is provided an image processing apparatus which inputs image area information constituted by a plurality of types of image area component data for each pixel of multilevel image data and compression-codes the image area information, comprising:

first encoding means for losslessly encoding the input image area information;

storage means for storing encoded data losslessly encoded by said first encoding means;

second encoding means for decompressing the encoded data stored in the storage means, losslessly encoding the encoded data again, and storing the data in the storage means;

monitoring means for monitoring an amount of code generated by the first encoding means and determining whether the amount of code has exceeded a target amount; and control means for, when said monitoring means determines that the data amount exceeds the target data amount, changing information entropy in the image area information to be encoded by the first encoding means and the image area information obtained by the second encoding means by decompression, in accordance with a predetermined condition, wherein when the control means issues a request to change the predetermined image area component data, the first encoding means changes the requested image area component data in successively input image area information and stores the data in the storage means, and the second encoding means changes the requested image area component data in the image area information obtained by decompressing the encoded data and already stored in the storage means, re-codes the data, and stores the data in the storage means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 13 is a view showing data flows and memory contents in the encoding phase in the initial state in the arrangement in FIG. 2;

FIGS. 19A to 19E are views showing losslessly encoded data and encoded data after re-encoding in the first embodiment;

FIGS. 21A to 21E are views showing losslessly encoded data and encoded data after re-encoding in the second embodiment;

FIGS. 24A to 24E are views showing losslessly encoded data and encoded data after re-encoding in the third embodiment;

FIGS. 26A to 26E are views showing losslessly encoded data and encoded data after re-encoding in the fourth embodiment;

FIGS. 32A to 32E are views showing losslessly encoded data and encoded data after re-encoding in the sixth embodiment;

FIGS. 36A to 36E are views showing losslessly encoded data and encoded data after re-encoding in the ninth embodiment;

FIGS. 37A to 37E are views showing another example of losslessly encoded data after re-encoding and encoded data obtained by re-encoding after re-encoding;

DETAILED DESCRIPTION OF THE PREFERRED EMBODIMENTS

The embodiments of the present invention will be described below with reference to the accompanying drawings. The basic portion of the present invention will be described first.

Figure 1:
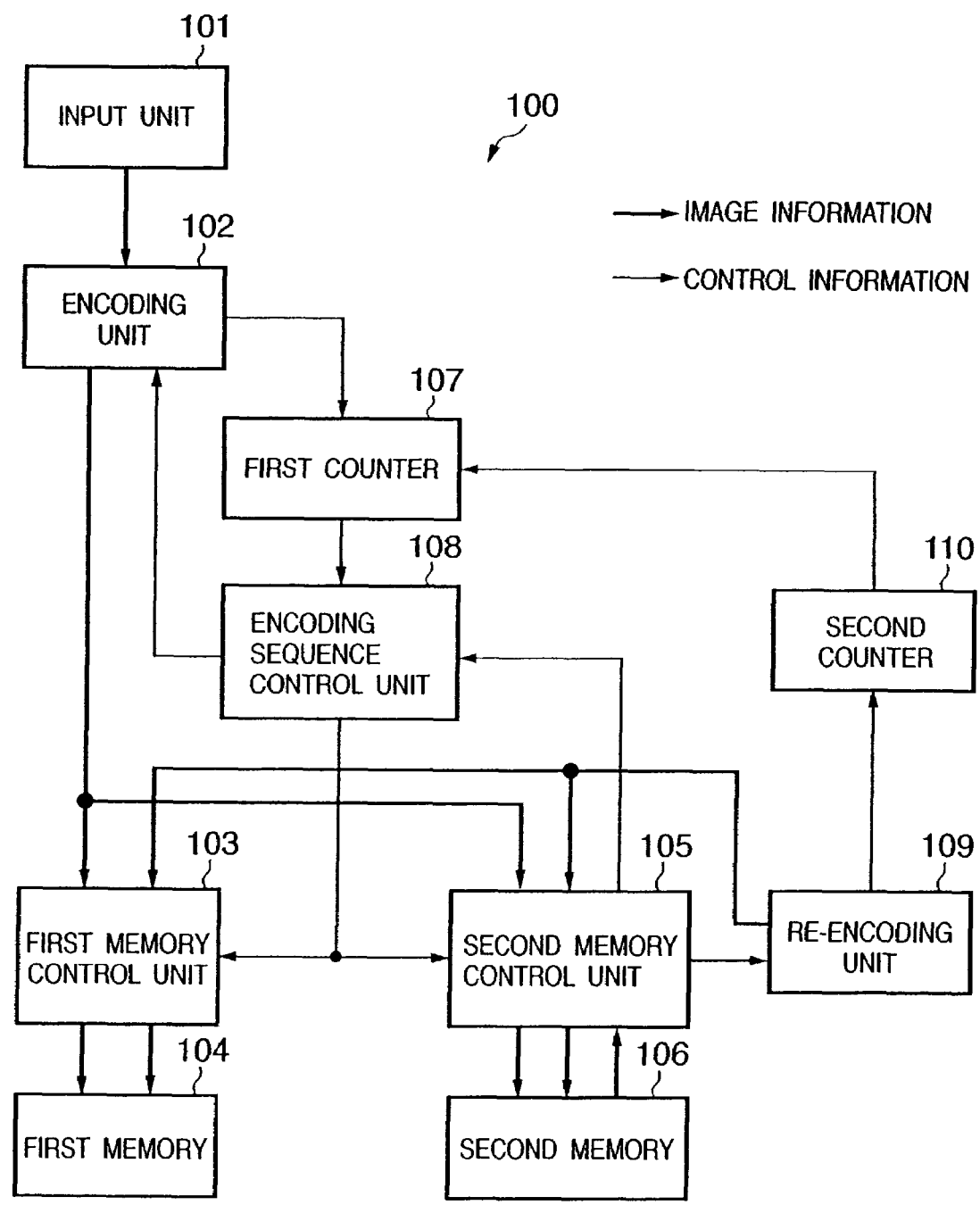
FIG. 1 is a block diagram showing the first basic arrangement of an image processing apparatus to which the present invention is applied.

FIG. 1 is a block diagram of an image processing apparatus 100 to which the embodiments are applied. Each unit in FIG. 1 will be briefly described below.

The image processing apparatus 100 includes an input unit 101 for inputting an image from an image scanner. Note that the input unit 101 may input image data by page description language rendering or the like or implement input operation by loading an image file from a storage medium. In some case, the input unit 101 may receive image data from a network.

An encoding unit 102 codes input image data. Note that the encoding unit 102 uses a known JPEG encoding scheme to orthogonally transform the image data every 8×8 pixels, and performs quantization using a quantization step to be described later and Huffman encoding.

First and second memory control units 103 and 105 perform control to store the above encoded data (identical code data) output from the encoding unit 102 in first and second memories 104 and 106. In this case, the first memory 104 is a memory for holding encoded data which is finally confirmed (completely compressed to a data amount within a target value) so as to output it to a network device, image output apparatus, large-capacity storage unit, or the like externally connected to the basic arrangement shown in FIG. 1. The second memory 106 is a work memory for assisting compression-encoding processing to form the encoded data in the first memory.

A counter 107 counts the data amount of image data compression-encoded by the encoding unit 102 and holds the count value. The counter 107 also outputs the count result to an encoding sequence control unit 108 for controlling an encoding sequence.

The encoding sequence control unit 108 detects whether the count value of the counter 107 has reached a given set value. Upon detecting that the count value has reached the set value (has exceeded a target value), the encoding sequence control unit 108 outputs a control signal to the first memory control unit 103 to discard the data has already been stored in the first memory 104. The first memory control unit 103 discards the stored data by clearing the memory address counter or the encoded data management table on the basis of this control signal. At this time, the encoding sequence control unit 108 clears the counter 107 to zero (data is kept input from the input unit 101) and controls the encoding unit 102 to perform encoding at a higher compression ratio. That is, the encoding sequence control unit 108 performs control to reduce the data amount of encoded data generated in encoding processing by this apparatus to, for example, 1/2. Obviously, although the data amount is reduced to 1/2 in this case, the compression ratio can be set to an arbitrary value.

The encoded data after a change in compression ratio is stored in the first and second memories 104 and 106 through the first and second memory control units 103 and 105 as in the above case.

The encoding sequence control unit 108 outputs a control signal to the second memory control unit 105 to read out the encoded data that has been stored in the second memory 106 so far and output the encoded data to a re-encoding unit 109 as encoded data conversion means.

The re-encoding unit 109 decodes the input encoded data and re-quantizes the data to reduce its data amount. The re-encoding unit 109 then performs encoding processing again and outputs, to a second counter 110, the resultant data with the same compression ratio as that of the encoding unit 102 whose compression ratio is changed.

The encoded data output from this re-encoding unit 109 is stored in the first and second memories 104 and 106 through the first and second memory control units 103 and 105.

The second memory control unit detects whether re-encoding processing is completed. More specifically, if all data are read out for re-encoding processing, the encoding sequence control unit 108 is notified of the end of re-encoding processing. In practice, the encoding processing is completed when the processing by the re-encoding unit 109 is terminated as well as the read processing by the second memory control unit 105.

The count value obtained by the second counter 110 is added to the counter value held in the first counter 107. This sum represents the total data amount in the first memory 104 immediately after the completion of re-encoding processing. That is, when encoding processing for one frame by the encoding unit 102 and re-encoding unit 109 is completed, the counter value held in the first counter 107 after the above addition represents the total amount of data generated when one-frame data is encoded by this apparatus (to be described in detail later).

The encoding unit 102 continues encoding processing as long as image data to be encoded which is input from the input unit 101 is left regardless of whether the re-encoding processing is completed or not.

Whether the count value of the counter 107 has reached the set value is kept checked until encoding processing (encoding and re-encoding) for one-page image data input from the input unit 101 is completed. The above encoding processing and re-encoding processing are executed under the control corresponding to the detection result obtained in this case.

Figure 8:
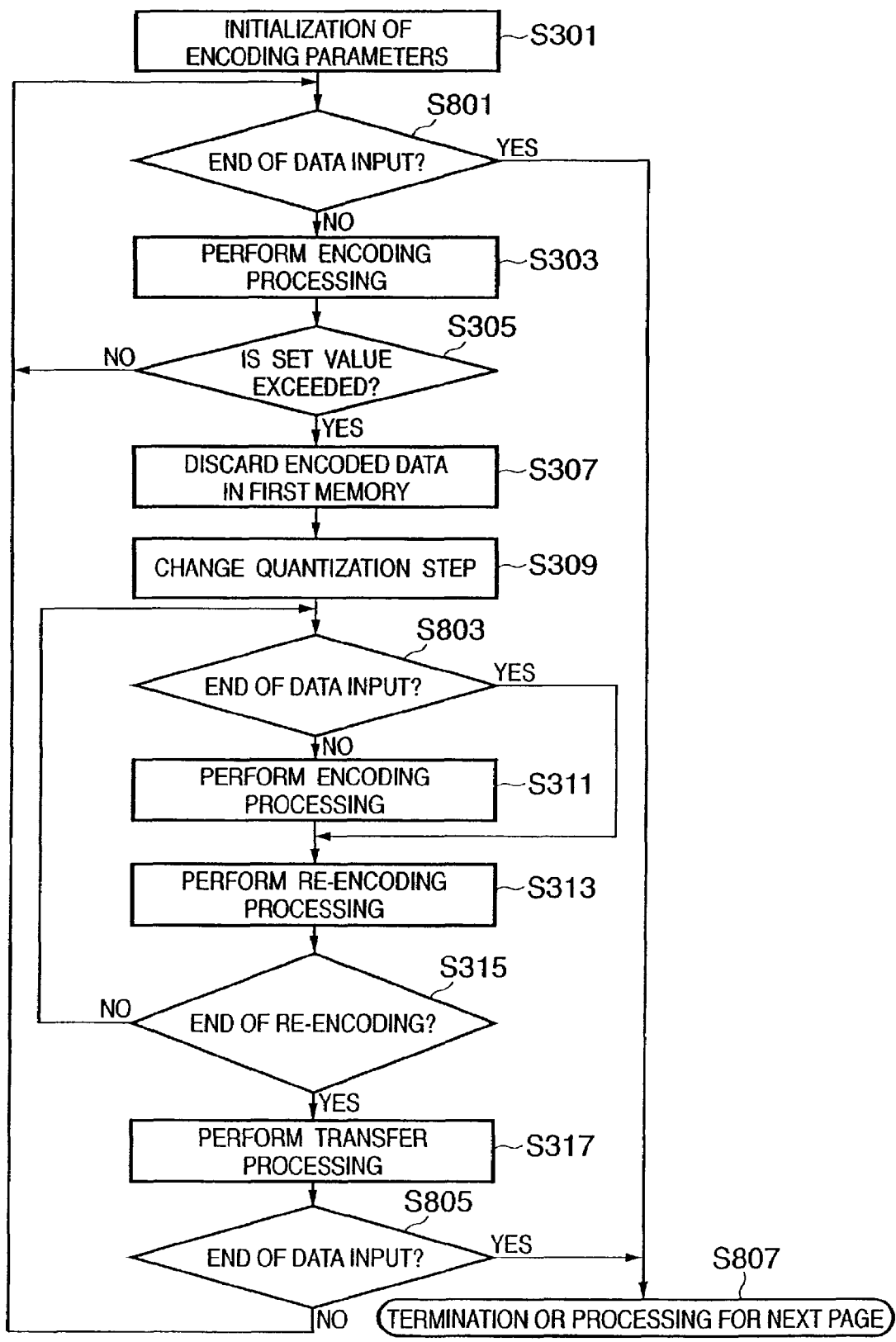
FIG. 8 is a flow chart showing the details of the processing in the arrangement in FIG. 1.

FIG. 8 is a flow chart showing processing in the arrangement shown in FIG. 1. For the sake of simplicity, this processing will be described first with reference to the simplified flow chart of FIG. 3.

As has been described above, the image processing apparatus 100 of the present invention is an apparatus for compression-encoding one-page image data input from the input unit 101 such as a scanner to a predetermined data amount or less. In order to realize this encoding processing, the apparatus has the encoding unit 102, re-encoding unit 109, first memory 104, second memory 106, and the like in addition to the input unit 101. The apparatus performs encoding processing by using these functional blocks on the basis of the flow chart shown in FIG. 3.

Figure 3:
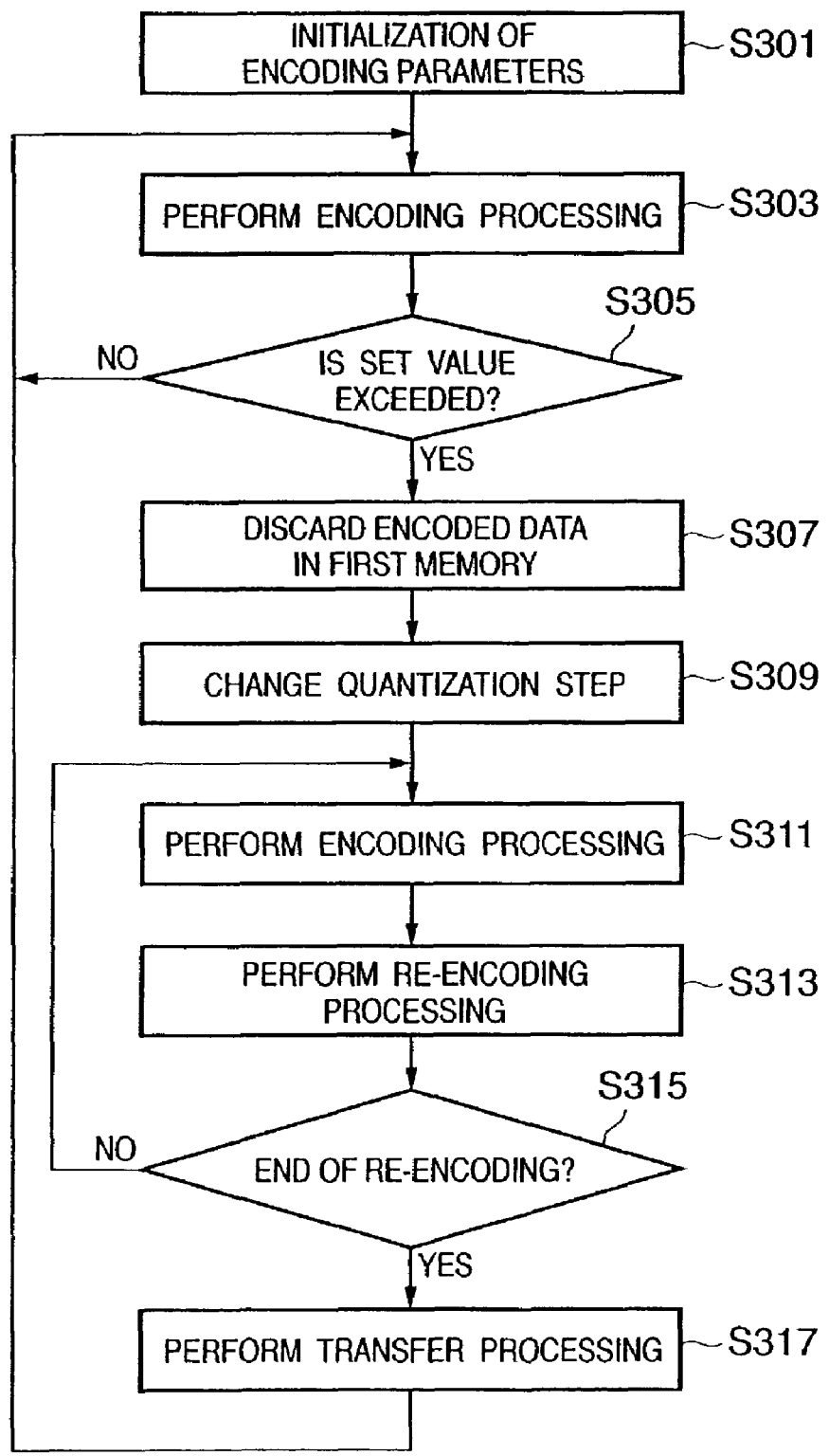
FIG. 3 is a flow chart showing processing in the arrangement in FIG. 1 in a simplified form.

The flow chart of FIG. 3 is roughly divided into the following three processing phases:

(1) encoding phase, (2) encoding/re-encoding phase, and (3) transfer phase.

FIGS. 4 to 7 are views that make it easy to visually understand how image data, encoded data, and the like flow, are processed, and stored in memories in the respective processing phases described above.

Figure 4:
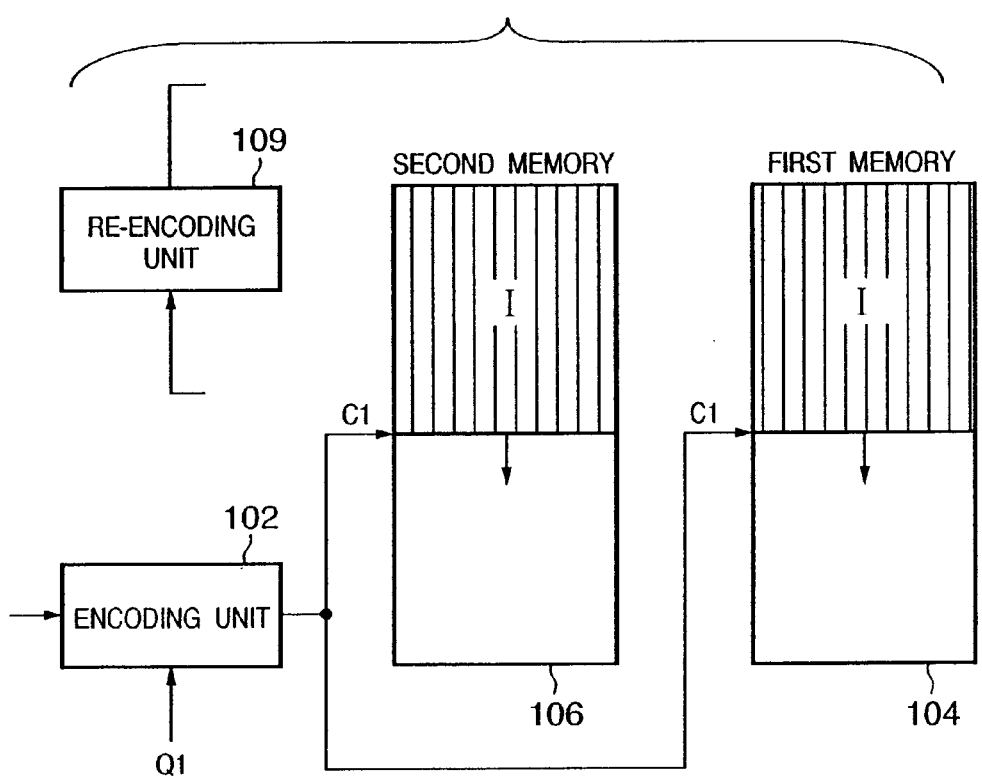
FIG. 4 is a view showing data flows and memory contents in an encoding phase in an initial state.
Figure 5:
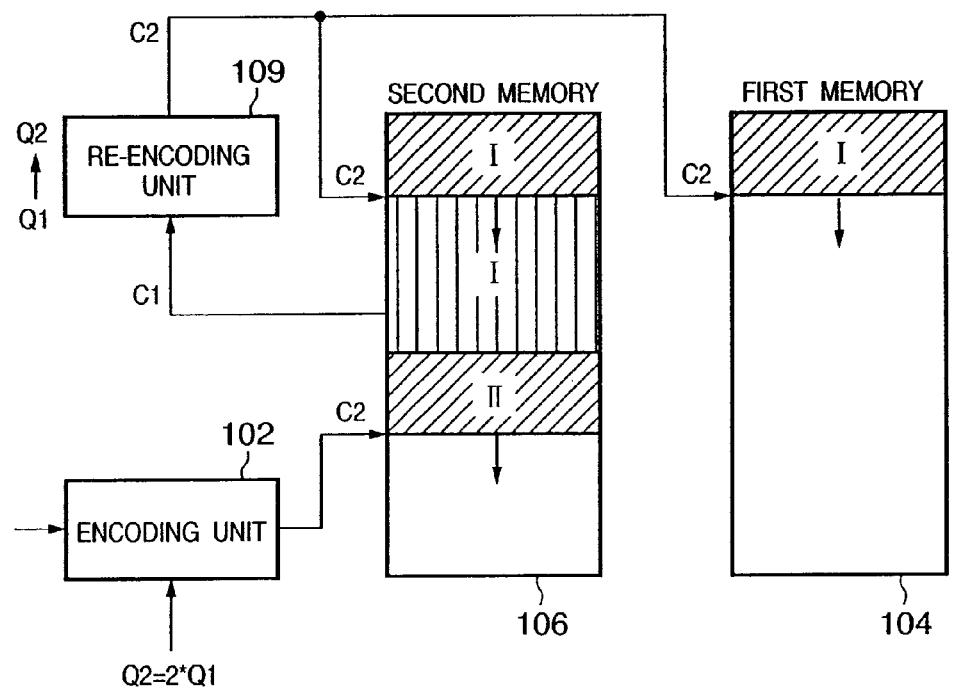
FIG. 5 is a view showing data flows and memory contents in an encoding/re-encoding phase.
Figure 6:
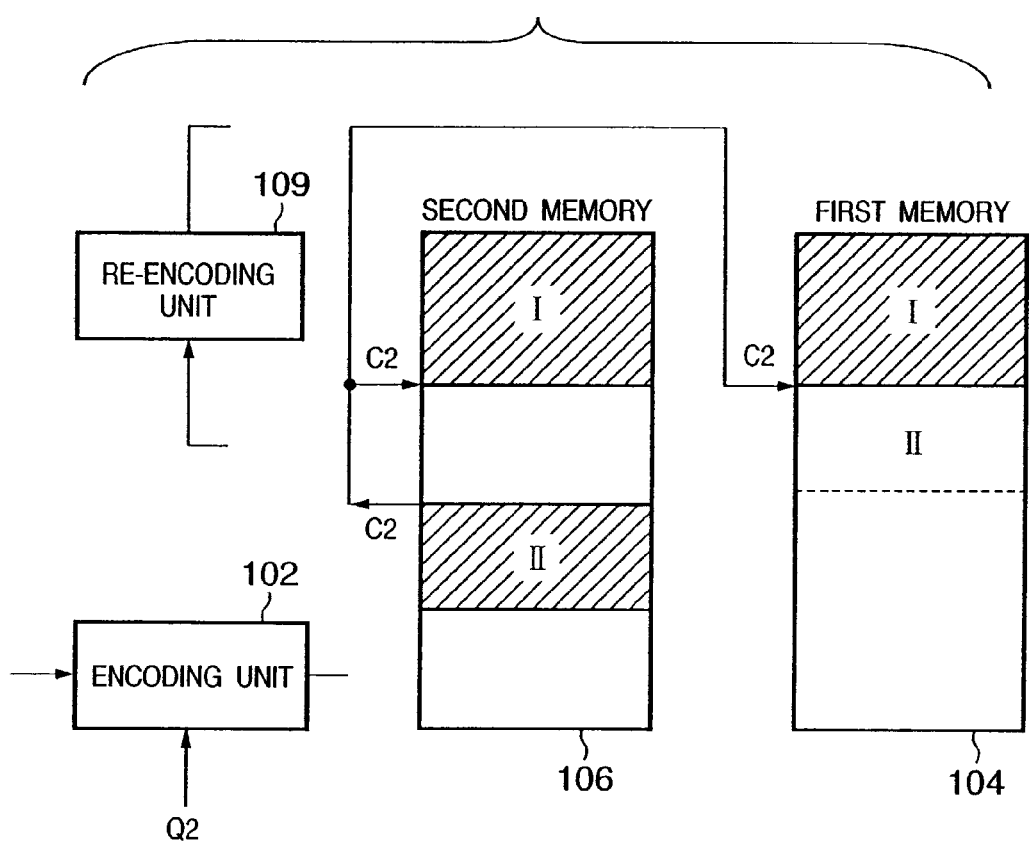
FIG. 6 is a view showing data flows and memory contents in a transfer phase.
Figure 7:
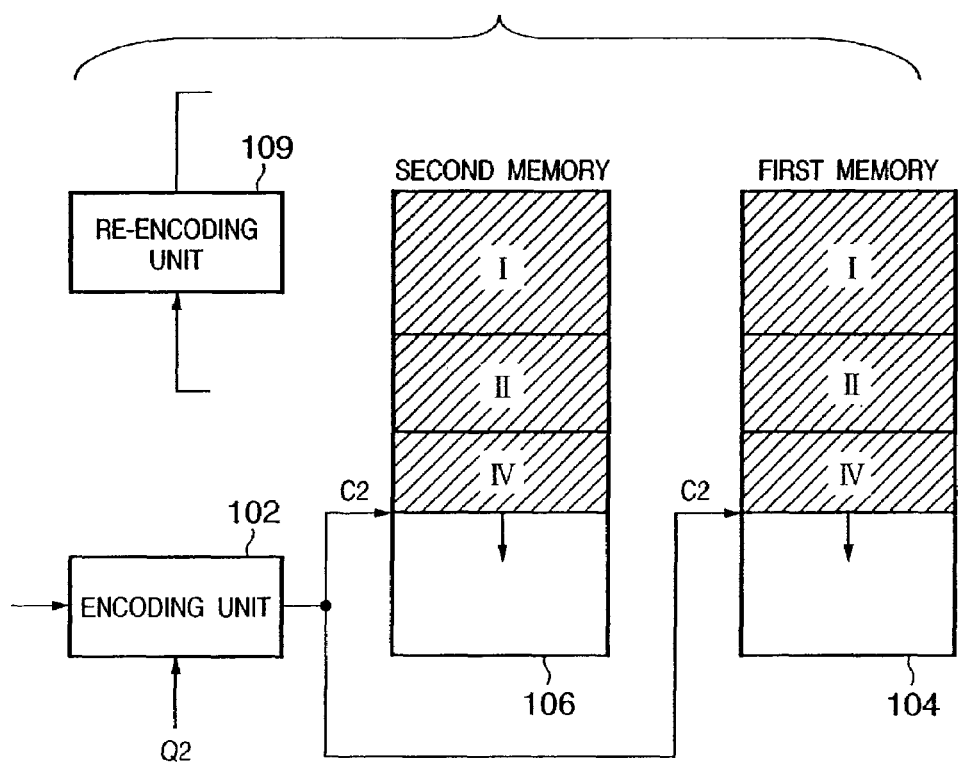
FIG. 7 is a view showing data flows and memory contents in an encoding phase after the transfer phase.

FIG. 4 shows the initial state of the encoding phase corresponding to steps S303 and S305 in the flow chart of FIG. 3. FIG. 5 shows the processed state of the encoding/re-encoding phase corresponding to steps S307 to S315. FIG. 6 shows the processed state of the transfer phase corresponding to step S317. FIG. 7 shows the processed state of the encoding phase after the transfer phase. Each phase will be described below.

<<Encoding Phase>>

Encoding processing for one-page image data starts from initialization of encoding parameters (step S301). In this step, parameters such as the upper limit of the encoded data amount uniquely determined from an image size for encoding processing (the size of a sheet read by the input unit 101 such as a scanner) and a quantization step (Q1) applied to the encoding unit 102 (assume that a known JPEG encoding scheme is used in this case) are set.

In step S303, the first counter 107 cumulatively counts the data amount of encoded data output upon actual execution of encoding processing (JPEG compression of image data in units of 8×8 pixels).

In step S305, it is checked whether the count value of the data amount exceeds the upper limit. If NO in step S305, the JPEG encoding processing in step S303 is continued. This is an encoding phase in the initial state.

The encoded data output from the encoding unit 102 are stored in both the first and second memories 104 and 106, as shown in FIG. 4. The areas indicated by the vertical stripes represent the stored codes.

<<Encoding/Re-encoding Phase>>

As the encoding processing by the encoding unit 102 proceeds and the count value of the data amount exceeds the set upper limit, the encoded data in the first memory 104 is discarded in step S307. In addition, in step S309, the quantization step in the encoding unit 102 is changed to Q2.

That the count value of the data amount of encoded data exceeds the set upper limit means that the data amount after compression exceeds a target value. For this reason, the quantization step Q1 is changed to the quantization step Q2 which is larger in quantization step width than Q1.

After the quantization step is changed, the encoding processing by the encoding unit 102 is resumed in step S311, and the encoded data is stored in only the second memory 106, as shown in FIG. 5. Along with this processing, the re-encoding processing in step S313 is performed. In the re-encoding processing, only the encoded data stored in the second memory 106 is read out and re-encoded by the re-encoding unit 109. The re-encoded data is then stored in the two memories 104 and 106. The encoding processing and re-encoding processing are continued until all the codes represented by vertical stripes I are re-encoded. The re-encoded data output from the re-encoding unit 109 is the same as the encoded data that is obtained by encoding with the same quantization step as that for the encoded data output from the encoding unit 102.

More specifically, in this re-encoding processing, the respective quantized values obtained by temporarily Huffman-decoding encoded data are subjected to bit shift processing that can obtain the same result as that obtained by dividing these quantized values by $2^n$, and then, the resultant data is Huffman-encoded again. This method allows high-speed re-encoding processing because it changes the quantization step by only bit shift processing and does not perform inverse orthogonal transform and re-orthogonal transform processing. In step S315, the end of re-encoding processing is detected.

Since the data amount after re-encoding becomes smaller than that of encoded data before re-encoding, the encoded data after re-encoding can be overwritten/stored in the memory area in which the encoded data before re-encoding has been stored, as shown in FIG. 5. When the re-encoding processing is terminated, the data amount of encoded data represented by the vertical stripes I is reduced to that of encoded data represented by oblique stripes I in FIG. 6.

Steps S307 to S315 described above are performed in the encoding/re-encoding phase.

<<Transfer Phase>>

When the re-encoding processing is completed, transfer processing is performed in step S317. In this transfer processing, as shown in FIG. 6, the encoded data which is represented by oblique stripes II and stored only in the second memory 106 in the encoding/re-encoding phase is transferred to an address linked to the encoded data represented by the oblique stripes I and stored in the first memory 104, and stored at the address. On the other hand, the encoded data represented by the oblique stripes II is transferred within the second memory 106 to the encoded data represented by the oblique stripes I such that the encoded data represented by the oblique stripes I and II which are distributed in the second memory 106 are consecutively stored in the first memory 104. This processing is done in the transfer phase.

When the above transfer phase is completed, the flow returns to the encoding phase in steps S303 and S305 to output the codes represented by oblique stripes IV from the encoding unit 102 and store them in the two memories 104 and 106, as shown in FIG. 7. This encoding phase slightly differs from the encoding phase in the initial state (FIG. 4) in that the quantization step is changed from Q1 to Q2 in encoding by the encoding unit 102, and the encoded data stored in the two memories 104 and 106 are a set of codes processed in various phases. If these differences are neglected, the encoding phase immediately after the transfer phase can be regarded as the same as the encoding phase in the initial state.

By repeating the three phases, namely the encoding phase, encoding/re-encoding phase, and transfer phase, the codes obtained by compressing one-page image data to a set data amount or less can be stored in the first memory. In addition, the input unit 101 only continues input operation until a series of operations is completed. That is, there is no need to input image data again from the beginning.

The flow chart of FIG. 3 describes only processing corresponding to the respective phases shown in FIGS. 4, 5, and 6 for the sake of easy understanding. In practice, however, input operation for one-page image data ends in one of the phases. The subsequent operation therefore slightly differs depending on the phase in which the input operation is terminated. The flow chart of FIG. 8 shows the flow of processing in consideration of this. The flow chart of FIG. 8 describes processing in consideration of the relationship between the completion of inputting of one-page image data and the respective types of processing described with reference to FIG. 3. In this case, steps S801, S803, S805, and S807 are added to the flow chart of FIG. 3.

In steps S801, S803, and S805, the end of inputting of one-page image data from the input unit 101 is detected in the encoding phase, encoding/re-encoding phase, and transfer phase, respectively.

If it is detected that inputting of one-page image data is completed in the encoding phase and transfer phase (steps S801 and S805), the flow advances to step S807 to terminate the compression-encoding processing for the page and start compression-encoding processing for the next one-page image data if image data corresponding to one or more pages are left to be processed. If there is no such data, the apparatus enters a halt condition.

If the end of inputting of one-page image data is detected in the encoding/re-encoding phase (step S803), since the encoding unit 102 must temporarily stop operation until no image data to be re-encoded is left, encoding processing in step S311 is skipped, and only re-encoding processing is continued in step S313 to suppress the image data encoded by the encoding unit 102 to a predetermined encoded data amount. Since encoded data of entire one-page image data cannot be acquired in the first memory unless all the re-encoding processing and subsequent transfer processing are completed, re-encoding processing and subsequent transfer processing must be continued even after the end of inputting of one-page image data. In this case, if it is detected in step S315 that all the re-encoding processing is completed, the encoded data stored in only the second memory 106 is transferred to the first memory during the encoding/re-encoding phase (step S317). Thereafter, the end of inputting of one-page image data is detected in step S805, and the flow advances to step S807.

The above operation is described in the flow chart of FIG. 8.

<Modification to Method of Storing Data in Memories>

Figure 9:
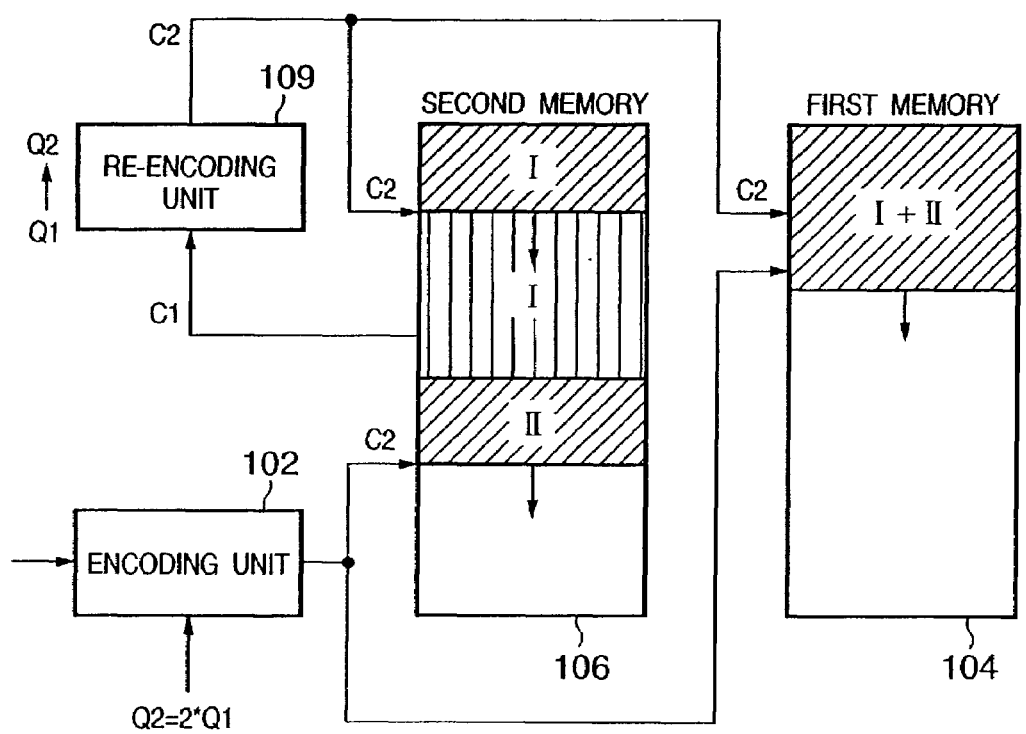
FIG. 9 is a view showing data flows and memory contents in the encoding/re-encoding phase in a modification to the arrangement in FIG. 1.
Figure 10:
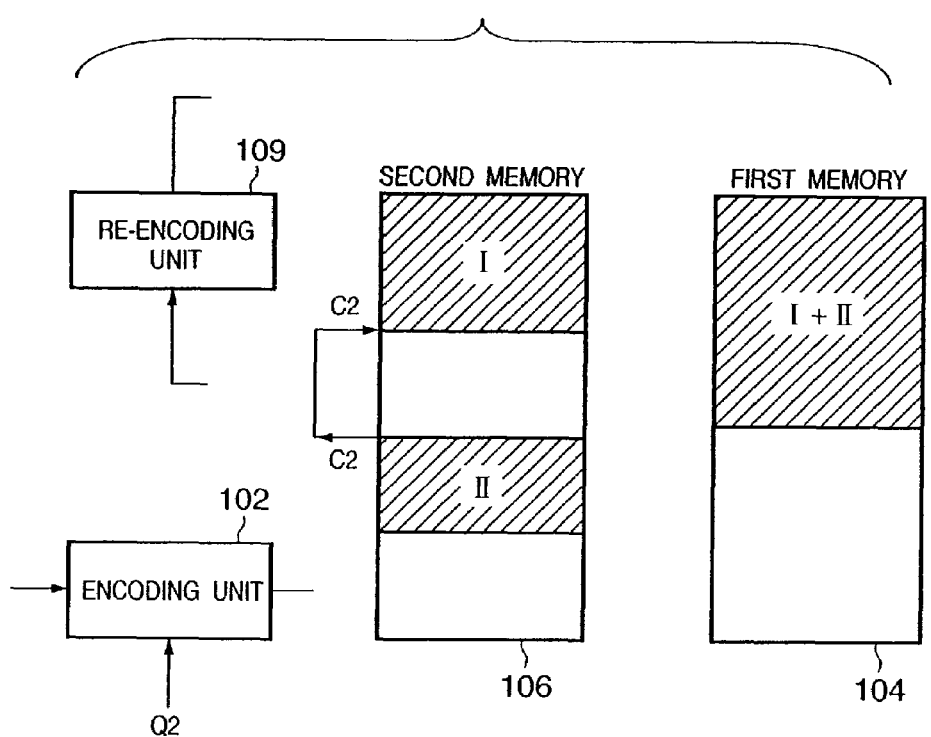
FIG. 10 is a view showing data flows and memory contents in the transfer phase in the modification in FIG. 9.

FIGS. 9 and 10 are views showing a modification to the method of storing data in the memories indicated by the conceptual views of FIGS. 5 and 6.

In the conceptual view of FIG. 5, in the encoding/re-encoding phase, the encoded data output from the encoding unit 102 is stored in only the second memory 106. As shown in FIG. 9, however, in the encoding/re-encoding phase, the encoded data output from the encoding unit 102 is directly stored in both the first and second memories.

When viewed from the encoding unit 102, encoded data is stored in the two memories regardless of the phase in which the data is encoded and output. Unlike the conceptual view of FIG. 6, as shown in FIG. 10, there is no need to perform data transfer between memories in the transfer phase. In addition, in this modification, in the encoding/re-encoding phase, encoded data and re-encoded data are sequentially stored in the first memory 104 in the order in which they are sent. For this reason, two types of data are mixed together.

In this modification, therefore, in order to solve this problem, encoded data is delimited in given units, and the resultant data are managed as files or packets. More specifically, a file management table, packet management table, or the like is separately generated to manage files or packets.

According to one technique, in storing data from the encoding unit 102 into the first memory 104, management numbers are assigned to the image data from the beginning in proper unit (e.g., every (8×i) (where i is an integer, e.g., 1, 2, ...)-line data because the unit of orthogonal transform is 8×8 blocks), and a management table is generated, in which the storage start addresses corresponding to the respective management numbers and the corresponding encoded data amounts can be stored in the management number order.

The encoding unit 102 and re-encoding unit 109 hold the management numbers of data under processing and write the start address and encoded data amount of encoded data in the management table on the basis of the management numbers when storing the encoded data. With this operation, even if the encoded data processed by the encoding unit 102 and re-encoding unit 109 are randomly stored, the encoded data can be sequentially read out from the first memory 104 from the beginning of the image by accessing the management table in the order of management numbers and reading out the data on the basis of the start address and encoded data amount read out at the time of the access. With such a management mechanism, there is no need to consecutively store consecutive data of an image in a memory.

Figure 11:
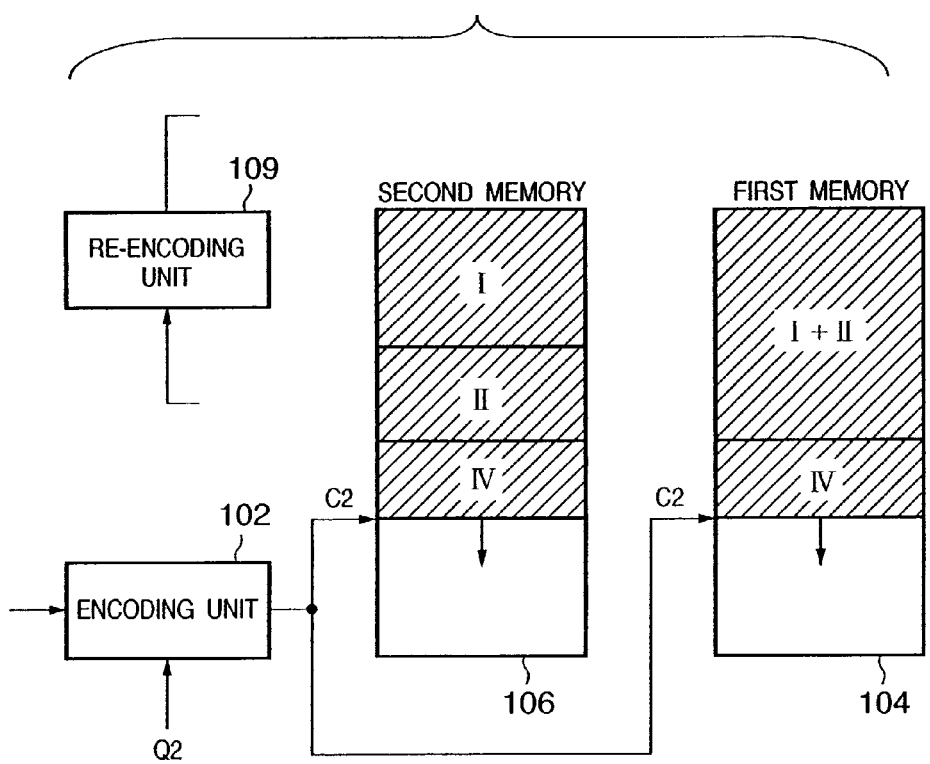
FIG. 11 is a view showing data flows and memory contents in the encoding phase after the transfer phase in the modification in FIG. 9.

The encoding phase after the transfer phase in the conceptual view of FIG. 10 is almost the same as the two encoding phases (FIGS. 4 and 7) described so far except that the stored state of codes in the first memory slightly differs from that in the encoding phases described above, as shown in FIG. 11. Therefore, the technique described above is the same as this modification in terms of repetitive processing of the three phases.

The second example of the basic arrangement (the arrangement described above will be referred to as the first example) for performing encoding processing unique to the present invention will be described next with reference to FIG. 2.

Figure 2:
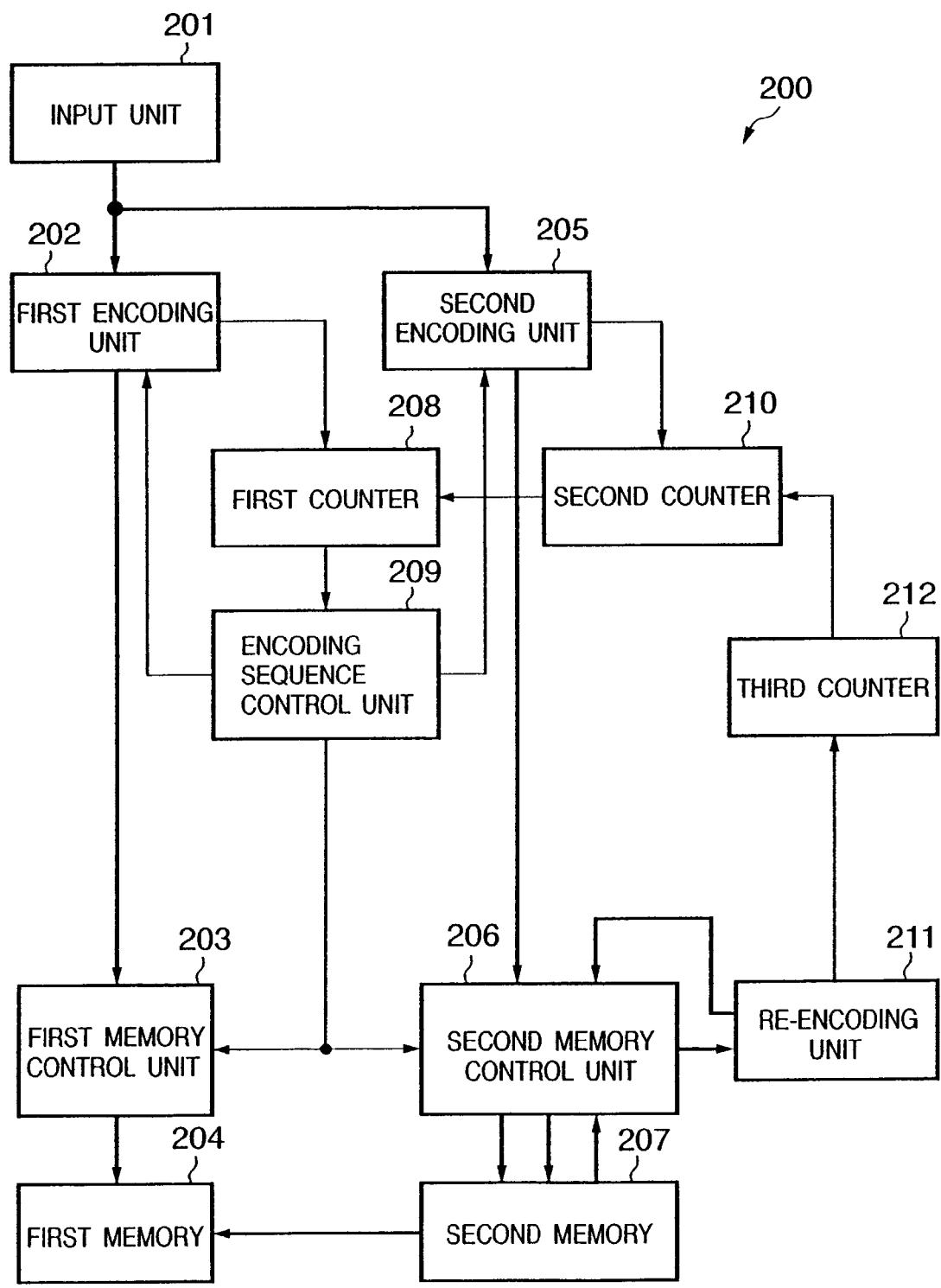
FIG. 2 is a block diagram showing the second basic arrangement of an image processing apparatus to which the present invention is applied.

FIG. 2 is a block diagram of an image processing apparatus 200 according to the second example.

This apparatus greatly differs from the image processing apparatus 100 in FIG. 1 in that two encoding units for encoding data for the first time exist in parallel. The image processing apparatus 200 concurrently encodes the image data input from an input unit 201 in first and second encoding units 202 and 205 to generate two types of encoded data with different compression ratios. In this example as well, a known JPEG encoding scheme is used, image data are orthogonally transformed every 8×8 pixels, and quantization using a quantization step to be described later and Huffman encoding are performed.

A case wherein the compression ratio applied to the second encoding unit 205 is set to be higher than that applied to the first encoding unit 202. Let Q1 be the quantization step in the first encoding unit 202, and Q2 (=2×Q1) be the quantization step in the second encoding unit 205.

The encoded data output from the first encoding unit 202 is stored in a first memory 204 through a first memory control unit 203. At this time, a first counter 208 counts the data amount of encoded data output from the first encoding unit 202 and holds it. The first counter 208 also outputs it to an encoding sequence control unit 209.

The data encoded by the second encoding unit 205 is stored in a second memory 207 through a second memory control unit 206. At this time, the second counter 210 counts the data amount of encoded data output from the second encoding unit 205 and holds it. At the same time when the encoded data stored in the second memory 207 is to be transferred to the first memory 204, the above count value is transferred to the first counter 208.

If the count value has reached a given set value while the first counter 208 counts the data amount of encoded data output from the first encoding unit 202, the encoding sequence control unit 209 outputs a control signal to the first memory control unit 203 to discard the data stored in the first memory 204 as in the first example.

The encoding sequence control unit 209 reads out the encoded data stored in the second memory 207 and transfers it to the first memory 204. The encoding sequence control unit 209 then outputs control signals to the memory control units 206 and 203 to store the encoded data in the first memory 204. As a consequence, the count value of a second counter 210 is transferred to the first counter 208 and is loaded (overwritten) as the count value of the first counter.

In brief, since the count value of the second counter 210 represents the data amount of encoded data stored in the second memory 207, it may be considered that the count value and encoded data are directly copied to the first counter and first memory so as to keep their relationship unchanged.

The encoding sequence control unit 209 also outputs control signals to the first and second encoding units 202 and 205 to perform encoding so as to reduce the amounts of encoded data.

For example, a quantization step S in the first and second encoding units 202 and 205 is doubled. As a result, the first encoding unit 202 inherits the quantization step Q2 (=2×Q1) set in the second encoding unit 205 immediately before this operation, whereas the second encoding unit 205 will perform encoding processing by using a further larger quantization step Q2×2 with a higher compression ratio in anticipation of an overflow.

In this case, the magnification ratio of the quantization step is set to two. Obviously, however, the present invention is not limited to this, and a magnification ratio can be arbitrarily set. The encoded data output from the encoding units 202 and 205 whose quantization steps have been changed are respectively stored in the corresponding memories 204 and 207 through the corresponding memory control units 203 and 206.

The encoding sequence control unit 209 then outputs a control signal to the second memory control unit 206 to read out the encoded data already stored therein and send the data to a re-encoding unit re-encoding unit 211. The re-encoding unit 211 re-encodes the encoded data in the same manner as the re-encoding unit 109 in FIG. 1.

A third counter 212 counts the amount of data output from the re-encoding unit 211. The third counter 212 is reset to zero immediately before the start of re-encoding processing and counts the amount of data output during re-encoding processing. When the re-encoding processing is completed, the third counter 212 transfers the obtained count value to the second counter 210.

The second counter 210 calculates the total data amount of encoded data and re-encoded data stored in the second memory 207 by adding the transferred data amount count value to the counter value held in the second counter 210. That is, the amount of data stored in the second memory 207 coincides with the count value of the second counter 210.

The two encoding units 202 and 205 continue encoding processing as long as image data to be encoded which is input from the input unit 201 is left regardless of whether the re-encoding processing is completed or not. Whether the count value of the counter 208 has reached a given set value is kept checked until encoding processing (encoding and re-encoding) for one-page image data input from the input unit 201 is completed. The above encoding processing and re-encoding processing are executed under the control corresponding to the detection result obtained in this case.

Figure 12:
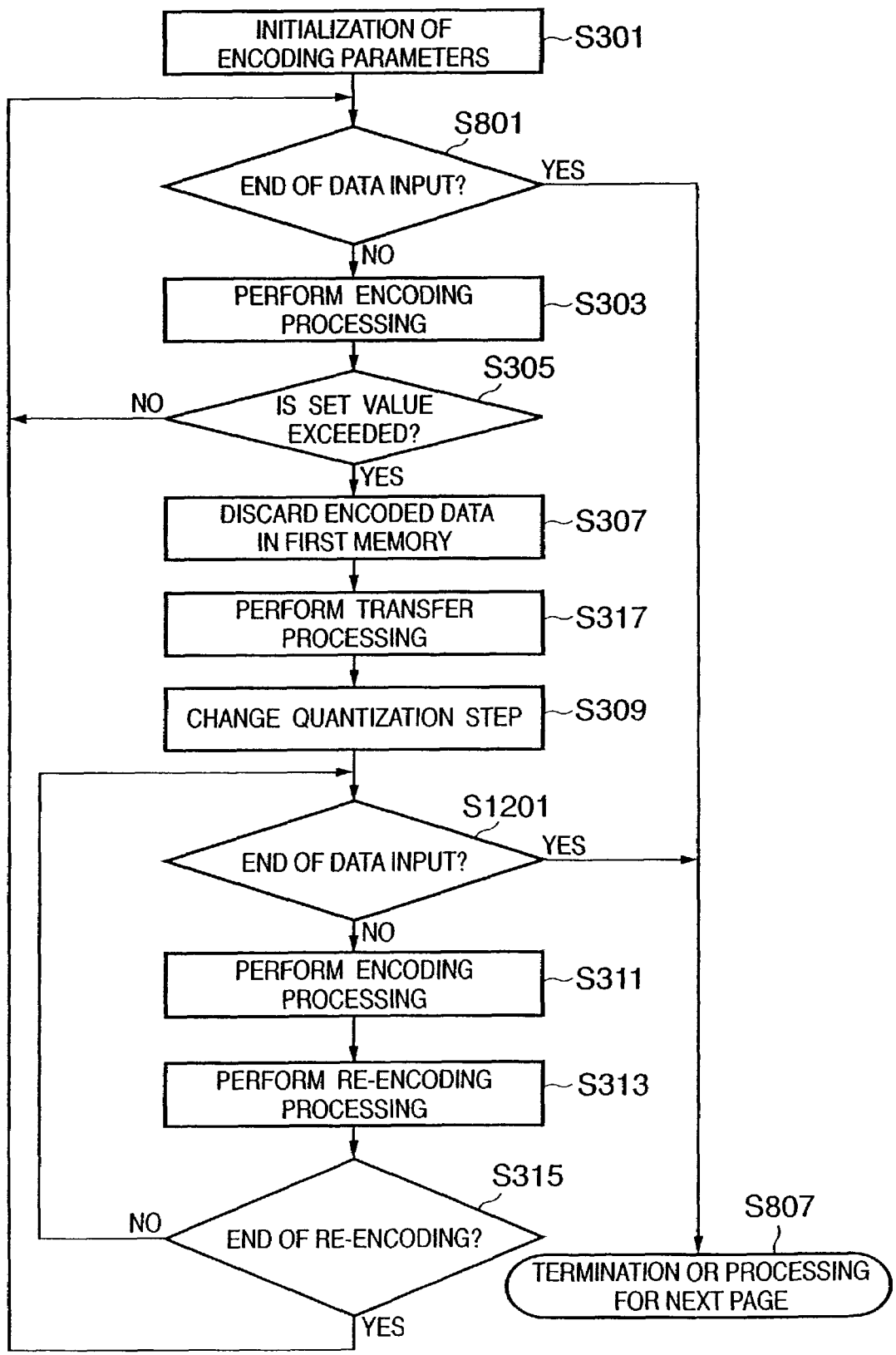
FIG. 12 is a flow chart showing a processing procedure in the arrangement shown in FIG. 2.

FIG. 12 is a flow chart showing the flow of processing in the arrangement in FIG. 2.

When there are two encoding units as described with reference to FIG. 2, one-page image data is encoded on the basis of the flow chart shown in FIG. 12. The description based on FIG. 12 is similar to that based on FIG. 8, which is a flow chart for the case wherein only one encoding unit is used, and a person skilled in the art can fully understand the characteristic features of the second example from the above description. Therefore, the second example will be described with reference to processing in three phases as in the case of the single encoding unit, and the differences between the processing in FIG. 12 and that in FIG. 8 will be mainly described below.

The biggest difference between the flow in FIG. 8 and that in FIG. 12 is that the transfer processing instep S317 is moved between step S307 and step S309. That is, it can be considered that the encoding/re-encoding phase and transfer phase change their places (discarding processing for encoded data in step S307 is an exception).

In initialization of encoding parameters instep S301, the quantization step Q1 is set in the first encoding unit 202, and the quantization step Q2 (=2×Q1) is set in the second encoding unit 205.

In the encoding phase, steps S801, S303, and S305 are repeatedly executed. Although the processing in steps S801 and S305 is the same as that in the case of the single encoding unit, only the encoding processing in step S303 differs, as shown in FIG. 13.

In order to store encoded data with higher compression ratios stepwise, the first encoded data stored in the first memory 204 is the data encoded with the smallest quantization step Q1, and the encoded data stored in the second memory is the data encoded with the quantization step Q2.

Figure 14:
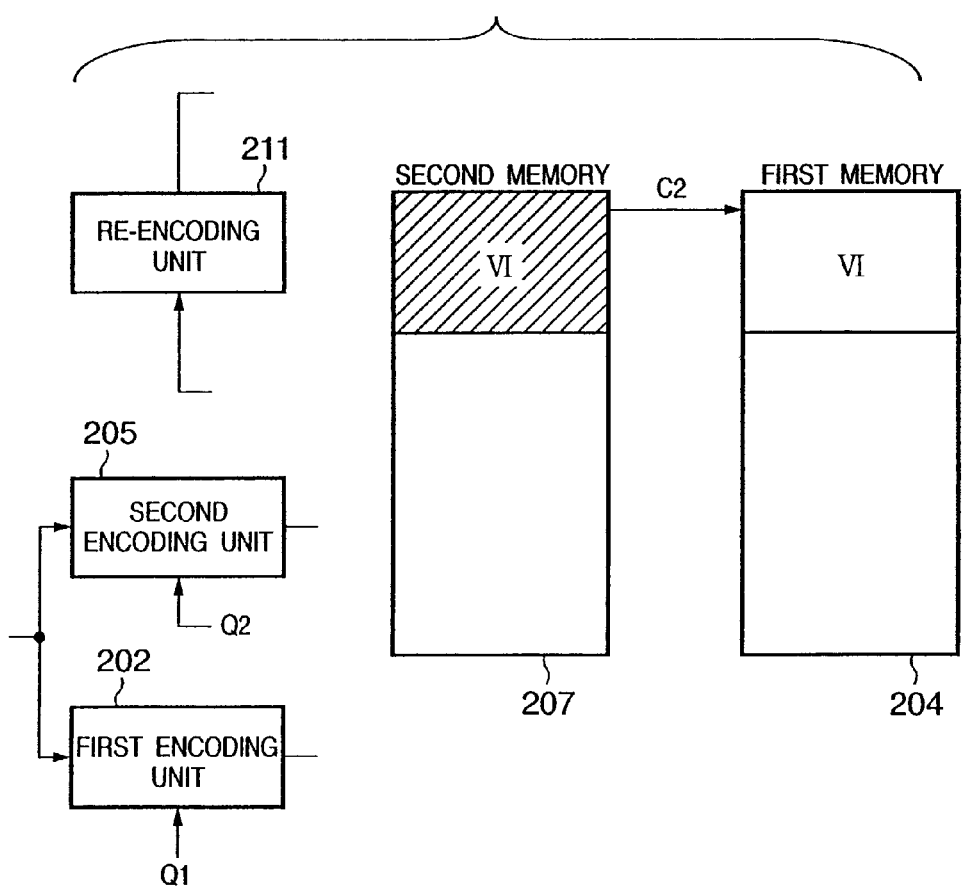
FIG. 14 is a view showing data flows and memory contents in the transfer phase in the arrangement in FIG. 2.

If the amount of data that is being stored in the first memory 204 exceeds the set upper limit (step S305), the encoded data held in the first memory 204 is immediately discarded (step S307), and the encoded data with a higher compression ratio which is held in the second memory 207 is transferred to the first memory 204 (see step S317 in FIG. 14). This operation makes it possible to store, in the first memory 204, the encoded data as the proper second candidate which does not exceed the upper limit without waiting for the end of the first re-encoding processing. In comparison with the arrangement in FIG. 1, this is the largest merit in using the arrangement in FIG. 2 which has the two encoding units.

The second example is based on the idea that it is useless to have encoded data with the same compression ratio in the two memories 204 and 207, and hence encoded data with a compression ratio higher than that of encoded data stored in the first memory 204 is stored in the second memory 207. The subsequent processing is performed on the basis of this idea. After the processing (transfer phase) of transferring the encoded data in the second memory 207 to the first memory 204, therefore, the encoded data in the second memory 207 is re-encoded to make the memory hold encoded data with a compression ratio higher than the preceding compression ratio by one step.

Figure 15:
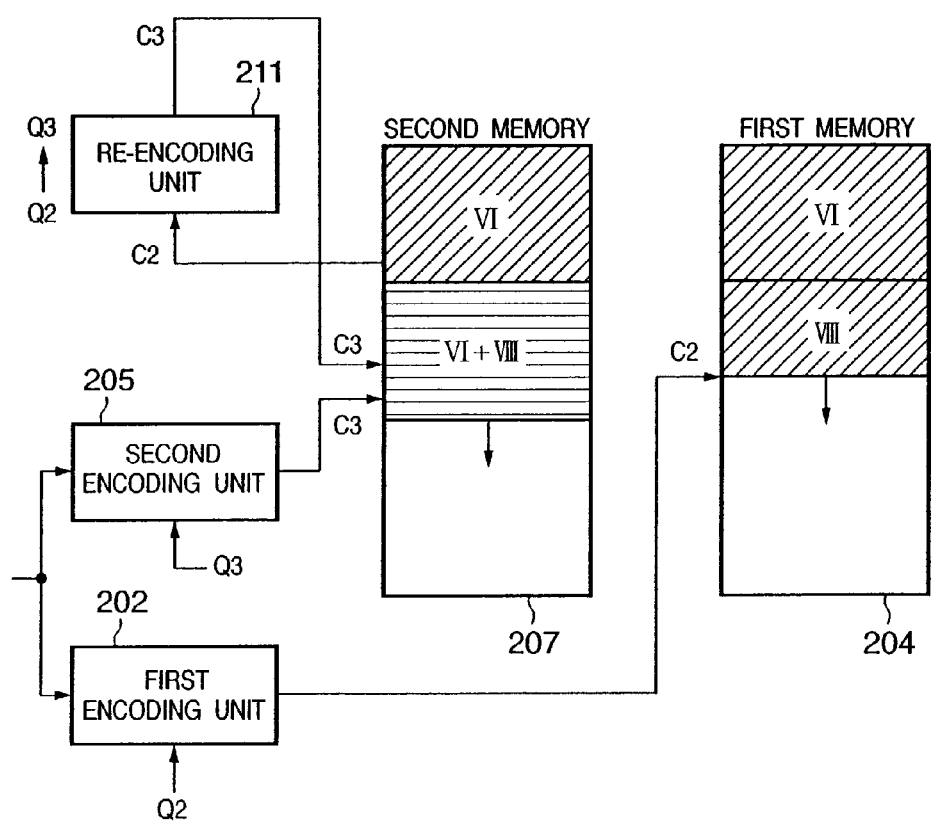
FIG. 15 is a view showing data flows and memory contents in the encoding/re-encoding phase in the arrangement in FIG. 2.

More specifically, as shown in FIG. 15, in the encoding/re-encoding phase following the transfer phase, the quantization steps Q1 and Q2 applied to the two encoding units 202 and 205 are changed to Q2 and Q3, respectively (step S309) before the above re-encoding processing. If one-page image is continuously input (step S803), the succeeding image data as the input data are encoded by the two encoding units in which the new quantization steps are set (step S311), and the encoded data are stored in the corresponding memories 204 and 207. Along with the above encoding processing, the encoded data stored in the second memory (transferred to the first memory 204) is re-encoded by the re-encoding unit 211 with the quantization step Q3 to be changed into encoded data with a compression ratio higher than that of the encoded data in the first memory by one step (step S313). The re-encoded data is then re-stored in the second memory 207

As in the first example, in the second example, in this re-encoding processing, the respective quantized values obtained by temporarily Huffman-decoding encoded data are subjected to bit shift processing that can obtain the same result as that obtained by dividing these quantized values by $2^n$, and then, the resultant data is Huffman-encoded again. This method allows high-speed re-encoding processing because it changes the quantization step by only bit shift processing and does not perform inverse orthogonal transform and re-orthogonal transform processing.

If there are two encoding units as in the second example, encoded data and re-encoded data are mixed and stored in the second memory 207, as shown in FIG. 15. As described above, therefore, decoded data must be delimited in given units to be managed in the form of files or packets in the second memory 207 as well. For this purpose, an arrangement similar to that in the modification to the first example may be provided.

Figure 16:
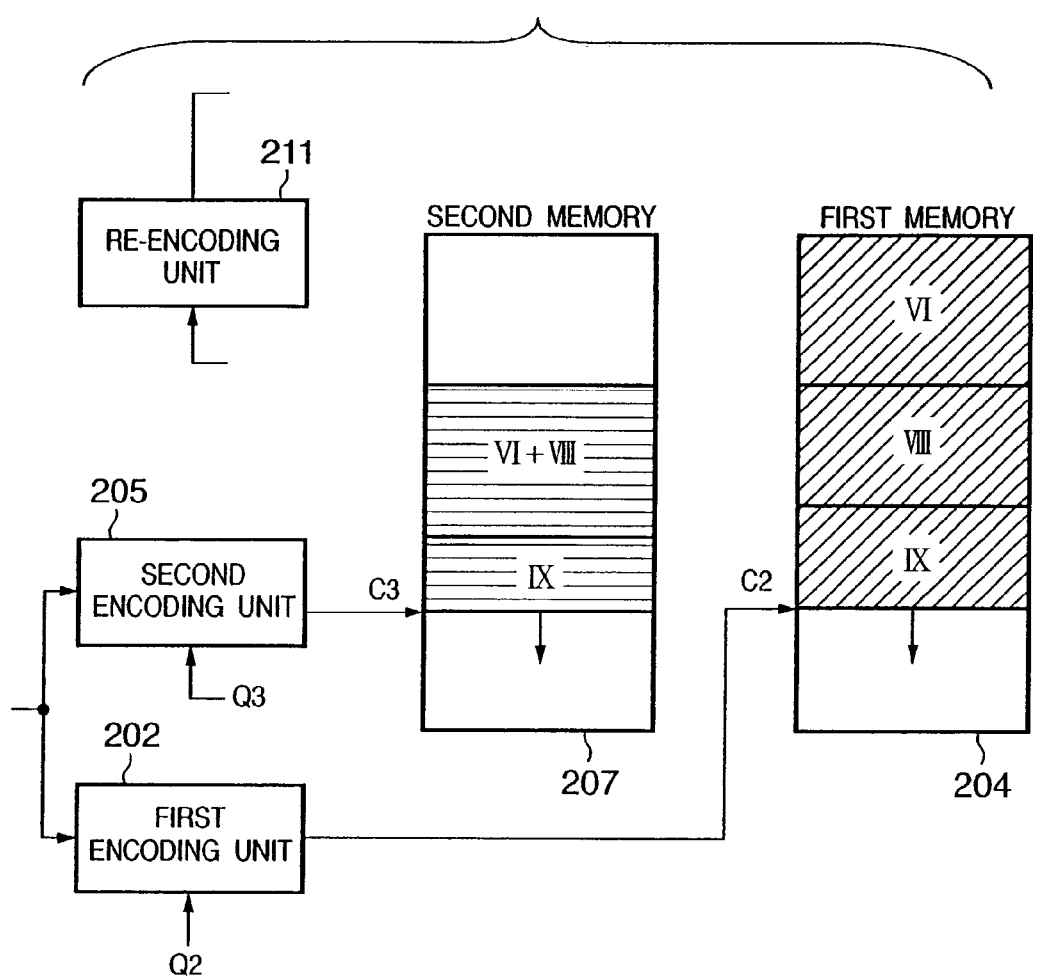
FIG. 16 is a view showing data flows and memory contents in the encoding phase after the encoding/re-encoding phase in the arrangement in FIG. 2.

Referring to FIG. 12, if the end of re-encoding processing is detected in step S315, the flow shifts to the encoding phase (steps S801 and S303) again. As shown in FIG. 16, in the encoding phase after the encoding/re-encoding phase, the encoded data held in the two memories 204 and 207 differ in their compression ratios, and the manners in which the encoded data are mixed (addresses) greatly differ. If, therefore, the data amount of the first memory 204 exceeds the set value again, the encoded data (the codes in areas indicated by horizontal stripes VI+VIII) held in the second memory 207 must be transferred to the first memory 204. In consideration of these points, the encoded data in the first memory 204 must be managed in the form of files or packets as well as in the second memory 207. A management mechanism using the above management table is also required for the first memory 204.

The state of the encoding phase shown in FIG. 16 is the same as the initial state of the encoding phase (FIG. 13) except that the quantization step and the manner in which encoded data are mixed before re-encoding processing differ from those after re-encoding processing. By repeating the encoding phase, transfer phase, and encoding/re-encoding phase, the encoded data obtained by compressing one-page image data to the set upper limit or less can be reliably stored in the first memory 204 in the end.

The transfer phase and encoding/re-encoding phase in the second example are performed in a reverse order with respect to the first example. For this reason, the detection of the end of inputting of one-page image data after transfer processing in FIG. 8 (step S805) is done at almost the same timing as that of the detection of the end of inputting of one-page image data in the encoding/re-encoding phase (step S803). In addition, the two detection processes are the same as step S805 in terms of function and are the same as step S803 in terms of timing. These two steps are therefore integrated into a new step of detecting the end of inputting of one-page image data and written as step S1201.

In the first and second examples described above, the first and second memories are physically different memories. This is because the two memories can be accessed independently. This arrangement is a characteristic feature of the present invention. However, the present invention also incorporates a case wherein the first and second memories are not physically different memories. As is obvious, the present invention can also be realized by one memory if two areas corresponding to the first and second memories are ensured in a physically single memory, and the above description is applied to this arrangement, with the first and second memories being replaced with the first and second memory areas, respectively.

When each example described above is to be realized by one memory, some of the data transfer processes described in the transfer phase can be omitted. A detailed description of this will be omitted because such operation can be easily imagined. If the above two areas are to be strictly used as different areas, data transfer processing is required in the same manner as in the case wherein two physically different memories are used. If, however, the same data is to be shared between the two areas, data transfer processing becomes unnecessary, and a reduction in storage capacity can be attained.

Assume that the encoded data held in the second memory area is to be transferred to the first memory area. In this case, the same effect as that of transferring the encoded data can be obtained by simply transferring two kinds of information, i.e., the start address at which the encoded data is stored and the data size from the second memory control unit to the first memory control unit.

If the encoded data is stored in a file or packet form, a slightly larger amount of information must be transferred between the memory control units, and management table information associated with the encoded data must be transferred. However, this operation is more efficient than transferring the encoded data.

According to the above image processing apparatus, when input image data is to be encoded, even if a target size is exceeded, the processing can be continued, while the input operation is continued, such that the encoded data will fall within the target size. The present invention also controls the amount of code of data obtained by encoding image area information accompanying the image data as well as controlling the amount of code of compressed data of the image data.

The above description has been made on the techniques on which the present invention is based. Note that each embodiment described below is based on the above arrangement and operation.

<First Embodiment>

The following embodiment will exemplify how to control encoding processing for image area information and the amount of code of encoded data.

Figure 17:
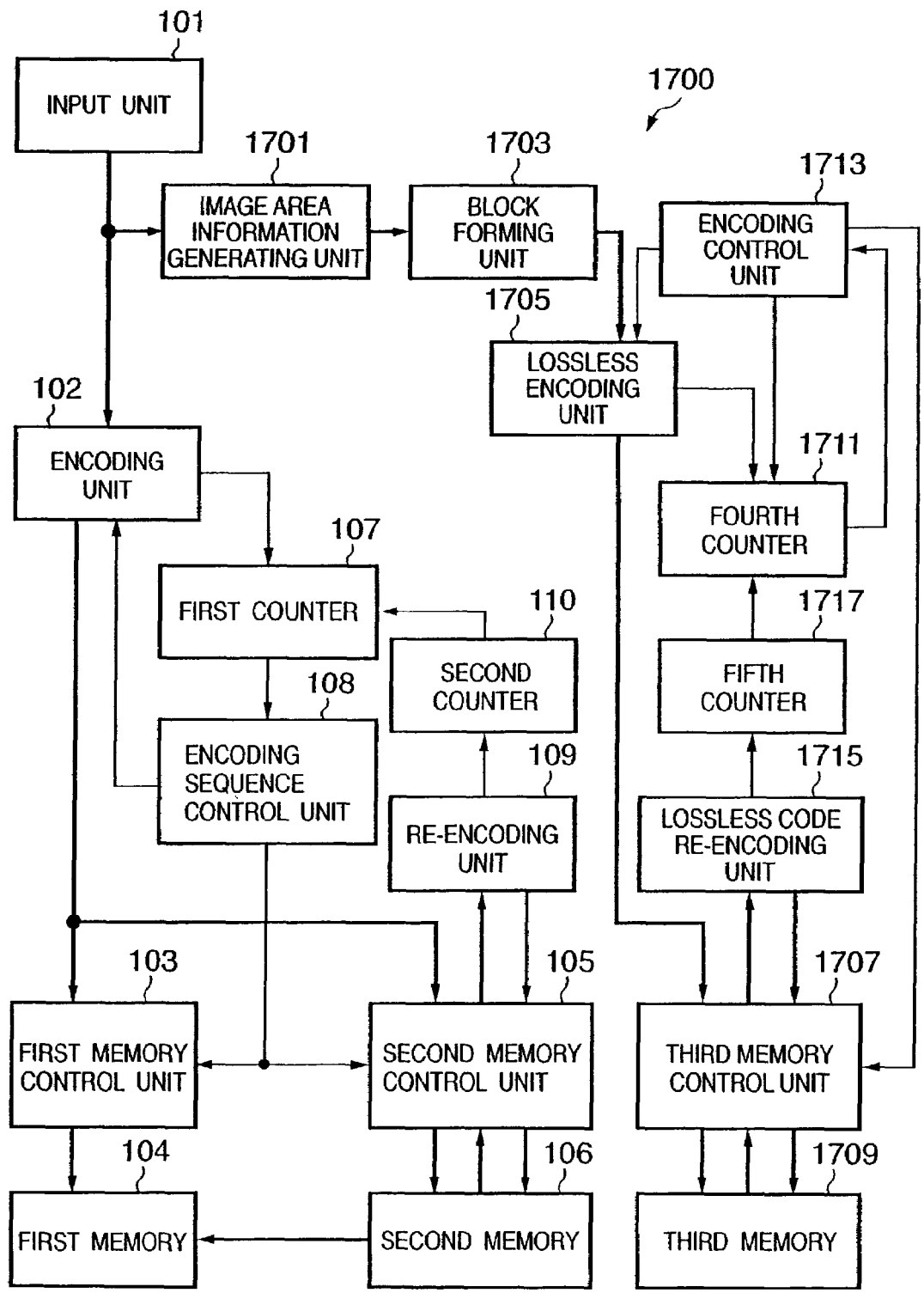
FIG. 17 is a block diagram showing an apparatus according to the first embodiment of the present invention.

FIG. 17 shows the first embodiment in which the present invention is applied to the above image processing apparatus. In the embodiment shown in FIG. 17, the present invention is applied to the basic arrangement shown in FIG. 1. The same reference numerals as in FIG. 1 denote the same functional blocks in FIG. 17, and a description thereof will be omitted.

The image data inputted from an image scanner or page description rendering through an input unit 101 is repeatedly encoded and re-encoded on the basis of the processing method described above to obtain encoded data within a predetermined amount of code.

Meanwhile, the image data is supplied to an image area information generating unit 1701 to generate the above image area information. This embodiment exemplifies a scanner input image, and hence image area information is generated on the basis of only image data. In a case of an image bitmapped/drawn by a page description language (PDL), however, image area information can be generated by referring to the PDL information as well. Note that image area information may be generated by an image input device such as a scanner. In this case, the image area information is also inputted through the input unit 101 and sent to the next unit upon passing through the image area information generating unit 1701.

The image area information generated by the image area information generating unit 1701, which indicates whether a target pixel belongs to a character•line drawing area or halftone area and a chromatic component or achromatic component is generated. Each information can be expressed by one bit, and image area information constituting of a total of two bits (each bit constitutes image area information and hence will be referred to as image area component information) is generated for each pixel.

The operation of the image area information generating unit 1701 will be briefly described below.

Consider first determination of a target pixel belonging to a character•line drawing area or halftone area. If the target pixel belongs to a character•line drawing area, the luminance (or density) of the target pixel abruptly changes with respect to the background. If the target pixel belongs to a halftone area, a change in the luminance (or density) of the target pixel is small with respect to adjacent pixels. Letting $L_i$ be the luminance of a target pixel and $L_{i-1}$, and $L_{i+1}$ be the luminances of the left and right pixels, if $$|L_i - L_{i-1}| > T \text{ or } |L_i - L_{i+1}| > T$$

then it can be determined that the target pixel belongs to a character•line drawing area (its edge). Note that |x| in this case represents the absolute value of x.

Note that a mathematical expression for determining whether density abruptly changes or not is not limited to the above expression. For example, this determination can be made according to $$|2L_i - L_{i-1} - L_{i+1}| > T$$

This determination can be made not only in a one-dimensional direction but also in a two-dimensional direction (Note that in the case of two-dimensional determination, the image area information generating unit 1701 needs to incorporate a memory for storing image data corresponding to a plurality of lines).

Consider determination of chromatic component/achromatic component. Since input image data is read by a scanner, the data has an RGB data format.

An achromatic component is a component in which R, G, and B components have the same luminance. If, therefore, a given component satisfies the relation defined as $$R = G = B$$

then it is determined that the component is achromatic. If the component does not satisfy this relation, it is determined that the component is chromatic. In practice, however, since the precision of the CCD of the scanner must be taken into consideration, if a given component satisfies all the following inequalities:

$$B - \Delta < R < B + \Delta$$

$$R - \Delta < G < R + \Delta$$

$$G - \Delta < B < G + \Delta$$

it may be determined that the component is achromatic ($\Delta$ is an arbitrary small numeral value). Otherwise, it may be determined that the component is chromatic.

In some case, an RGB color space may be converted into luminance, hue, and saturation (e.g., an Lab display color space), and the component may be determined as an achromatic component if the saturation is equal to or less than a predetermined value, and may be determined as a chromatic component if the saturation exceeds the predetermined value.

As described above, the image area information generating unit 1701 generates and outputs, from input image data, two-bit image area information indicating whether a target pixel belongs to a character•line drawing area or halftone area and is chromatic or achromatic.

Referring back to FIG. 17, the image area information generated in the above manner is formed into a block having a data size that allows encoding at once, e.g., a size of M×N (i.e., M×N×2 bits) by the block forming unit 1703. In this case, the block size is set to 32×32. In order to increase the encoding efficiency, however, the block size may be set to, for example, 64×64 or 128×128, and need not be a square size. For this reason, the block size is expressed as M×N.

A multilevel lossy compression scheme such as JPEG used for compression of general image data is not suitable for encoding image area information. For this reason, JBIG or a run-length encoding scheme such as PackBits, which is a lossless compression scheme, is used. A lossless encoding unit 1705 losslessly codes the image area information of the corresponding block.

The encoded image area information is stored in a third memory 1709 through a third memory control unit 1707. At the same time, a fourth counter 1711 cumulatively counts (which is reset when starting to read one page) the amount of code outputted from the lossless encoding unit 1705, and supplies the result to an encoding control unit 1713.

The encoding control unit 1713 has a register (not shown), in which a predetermined target amount of code for image area information is set in advance. The encoding control unit 1713 monitors whether the amount of code counted by the fourth counter 1711 exceeds this target value. Upon detecting that the amount of code has exceeded the target value, the encoding control unit 1713 issues the following commands to the lossless encoding unit 1705 and a lossless code re-encoding unit 1715 and resets the fourth counter 1711.

First of all, the encoding control unit 1713 issues a command to the lossless code re-encoding unit 1715 to read out encoded image area data from the third memory 1709 and re-encode it. As a consequence, the lossless code re-encoding unit 1715 reads out encoded image area information from the third memory 1709 on a block basis, and temporarily decodes it. The lossless code re-encoding unit 1715 then performs processing of reducing information entropy, re-codes the data, and stores the resultant data in the third memory 1709.

The following two processes are prepared for this processing of reducing information entropy:

process P1: changing all pieces of chromatic/achromatic identification information at pixel positions where character•line drawing/halftone pixel identification bits indicate halftone pixels into pieces of information indicating chromatic components.

process P2: changing character•line drawing/halftone pixel identification bits so as to indicate halftone pixels.

Upon detecting first that the amount of code exceeds the target value while encoding the image area information of a given page, the encoding control unit 1713 uses process P1 described above. If the encoding control unit 1713 detects (second time) that the amount of code exceeds the target value even after this processing, the unit 1713 re-encodes the information by using process P2.

The reason why the pieces of chromatic/achromatic identification information are changed to pieces of information indicating chromatic components is that no serious problem arises because a chromatic space in a color space includes an achromatic space. The pieces of character•line drawing/halftone pixel identification information are changed to pieces of information indicating halftone areas for the same reason.

In any case, the entropy of such image area information decreases when such image area information is changed, the data amount after run-length encoding decreases. The attribute data after re-encoding is stored in the memory 1709 again, and its amount of code is counted by a fifth counter 1717. The lossless code re-encoding unit 1715 performs this processing for all the codes of data which has already been encoded by the lossless encoding unit 1705. In this manner, when a command is sent from the encoding control unit 1713, the encoded data (data encoded by the lossless encoding unit 1705) stored in the third memory 1709 is re-encoded and stored. A this time, the amount of code is counted by the fifth counter 1717, and the count result is added to the fourth counter.

The lossless encoding unit 1705 starts the processing as that done by the lossless code re-encoding unit 1715 with respect to a target block and subsequent blocks in accordance with the instruction issued from the encoding control unit 1713 when the amount of code exceeds the target value. If it is detected first that the amount of code of data obtained by encoding a given page exceeds the target value, processing of reducing information entropy is performed for a block from a block forming unit 1703 by using process P1 described above. The resultant data is stored in the third memory 1709. During this operation, the fourth counter (which is reset when it is detected that the amount of code exceeds the target value) starts counting the amount of data encoded by the lossless encoding unit 1705. As described above, since this amount of code is added to the amount of code (fifth counter 1717) obtained when the lossless code re-encoding unit 1715 performs re-encoding. As a result, therefore, the fourth counter 1711 counts the same amount of code as that obtained by process P1 with respect to the attribute information about one page.

If the encoding control unit 1713 detects that the amount of code exceeds the target value again while the image area information is encoded upon switching to process P1, the unit 1713 resets the fourth counter 1711 and issues commands to the lossless encoding unit 1705 and lossless code re-encoding unit 1715 to switch the process to process P2 described above.

The above processing will be summarized as follows.

When the encoding control unit 1713 monitors the amount of code of image area information in the lossless encoding unit 1705 and detects that the amount of code exceeds the target value, the unit 1713 makes settings for the lossless encoding unit 1705 and lossless code re-encoding unit 1715 to use process P1, and resets the fourth counter 1711. Subsequently, the fourth counter 1711 adds the amount of code obtained by the lossless encoding unit 1705 and the count value of the fifth counter 1717. As a consequence, when the lossless code re-encoding unit 1715 completes re-encoding, substantially the same amount of code as that obtained by process P1 is counted with respect to one image (or one-page image) from the start. In addition, the encoded data obtained by process P1 is stored in the third memory 1709.

If the encoding control unit 1713 detects again during operation using process P1 that the amount of code exceeds the target value, the unit 1713 makes settings for the lossless encoding unit 1705 and lossless code re-encoding unit 1715 to use process P2, and resets the fourth counter 1711 and fifth counter 1717.

As a result, while image data is kept input from the input unit 101, the image information can be losslessly encoded within the target value (target size).

Figure 18:
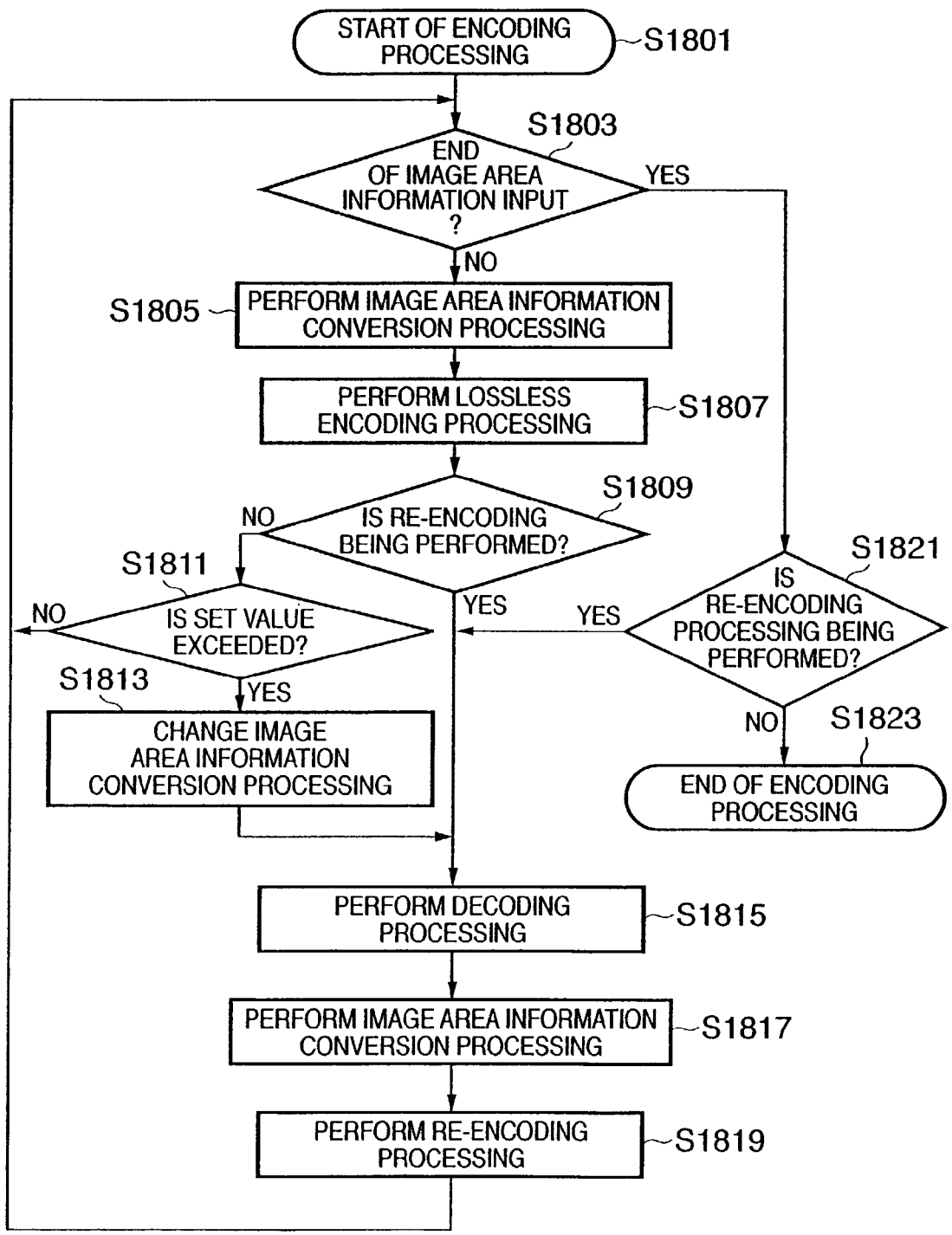
FIG. 18 is a flow chart showing a processing procedure in the first embodiment.

The contents of processing in the first embodiment are shown in the flow chart of FIG. 18 and will be described with reference to the flow chart. The processing in this embodiment is roughly divided into two processes, as described above. One is a lossless encoding process, the other is a re-encoding process.

The encoding process is constituted by image area information conversion processing in step S1805 and lossless encoding processing in step S1807. The re-encoding process is constituted by decoding processing in step S1815, image area information conversion processing in step S1817, and re-encoding processing in step S1819.

The remaining steps are conditional branching, start, and end steps except for changing of image area information conversion processing in step S1813.

Image area information encoding processing is started from step S1801. In step S1803, it is checked whether image area information corresponding to one-page image data is completely inputted. If YES in step S1803, the flow advances to step S1821. If NO in step S1813, i.e., there is still image area information to be input, image area information conversion processing in step S1805 is performed.

In the initial state wherein re-encoding processing has not been activated at all, nothing is done in the image area conversion processing, and the input image area information is directly encoded in the lossless encoding processing in step S1807.

In step S1809, it is checked whether re-encoding processing is being done. If YES in step S1809, the re-encoding processing constituted by steps S1815 to S1819 is performed. If NO in step S1809, the flow advances to step S1811 to check whether the encoded data (amount of code) has exceeded the set value.

If NO in step S1811, the flow returns to step S1803 to repeat encoding processing. If YES in step S1811, the contents of the image area information conversion processing are changed. With this change, the contents of the image area information conversion processing in steps S1805 and S1817 are changed. More specifically, in the initial state, process P1 is performed, i.e., all pieces of chromatic/achromatic identification information at pixel positions where pieces of character•line drawing/halftone identification information in the input image area information are changed to pieces of information indicating chromatic components.

After this change of the image area information conversion processing contents, re-encoding processing is performed. In re-encoding processing, the encoded image area information is decoded and restored into the data before encoding in step S1815. In step S1817, the image area information conversion processing is performed. In step S1819, the converted image area information is losslessly encoded again.

After the above re-encoding processing, the flow returns to step S1803. If image area information is inputted, the information is encoded. If the amount of code exceeds the set value at least once, the contents of the image area information conversion processing are changed. After the process is replaced with process P1 in the image area information conversion processing in step S1805, the information is losslessly encoded in step S1807.

After the process is replaced with process P1 in this manner, if it is detected again in step S1811 that the amount of code has exceeded the target value, settings are made in step S1813 to change the image area information conversion processing in steps S1805 and S1817 to process P2.

In any case, if image area information is completely inputted and re-encoding processing is completed, the flow advances to step S1823 to terminate the image area information encoding processing.

As described above, according to the first embodiment, one or one-page image data is encoded within a target size without interrupting the inputting of image data or re-inputting it. In addition, the image area information of this image can also be losslessly encoded within a target size.

A case wherein the lossless encoding unit and lossless re-encoding unit in this embodiment use the PackBits encoding scheme will be described below.

The specific contents of processing in this embodiment, in which image area information constituted by two bits per pixel is converted into eight-bit information by adding six-bit data "000000", and PackBits encoding is performed as lossless encoding, will be described with reference to FIGS. 19A to 19E.

As shown in FIG. 19A, the eight-bit data before PackBits encoding is designed such that the upper six bits are all "0"s, and a flag for identifying the corresponding pixel data as a character•line drawing/halftone pixel and a flag for indicating a chromatic/achromatic component are respectively stored in the upper and lower bits of the lower two bits. This eight-bit data can take a value equal to or more than 0 and equal to or less than 3. For the sake of simplicity, assume that one-dimensional image area information is outputted from the image area information generating unit 1701.

The above eight-bit data is outputted from the image area information generating unit 1701 on a pixel basis. Consider the data shown in FIG. 19B as specific output data.

This data is encoded by PackBits into the data shown in FIG. 19C. In this compressed data, a negative value represents the number of consecutive data, and a positive value represents the number of non-consecutive data. Each compressed data is eight-bit (one-byte) data like the data shown in FIG. 19B. The maximum value that can be expressed by one-byte information is about 128, which is half of 255. If the length information is equal to or less than 128, encoding can be done with a set of length information and a succeeding image area flag data group. If the length information exceeds 128, encoding is done by dividing the information into a plurality of sets of length information+image area flag data group.

The compressed data shown in FIG. 19C will be described in detail below. The first length information "−4" is a negative value, and hence represents the number of consecutive data, as descried above, and indicates that four image area flag data "1"s continue immediately after the length information.

The next data "4" is also length information. This information is a positive value, and hence indicates that four non-consecutive data continue. That is, the four data "2, 3, 2, 3" following the above value "4" are non-consecutive data. Referring to FIG. 19C, only the pieces of positive length information are underlined to allow easy discrimination between length information and image area flag data.

The data "−5" following the above non-consecutive data is the length information of consecutive data and indicates that five image area flag data "2"s continue immediately after the length information. The next underlined data "3" is the length information of non-consecutive data, and indicates that the three succeeding data "1, 0, 1" are image area flag data. The next data "−6, 0" indicate that six data "0"s continue.

What becomes of the compressed data when it is re-encoded by the lossless code re-encoding unit 1715 will be described below with reference to FIGS. 19D and 19E. For the sake of simple explanation, assume that all chromatic/achromatic flag bits are fixed to "1" to make all the components become chromatic.

The encoded image area data is temporarily decoded and restored to the data shown in FIG. 19B. The data is then subjected to above flag data replacement to be converted into the data shown in FIG. 19D. When this data is encoded again by PackBits, the encoded data shown in FIG. 19E is obtained. As is obvious, the 15-byte encoded data before re-encoding is reduced to six-byte data after re-encoding.

Assume that the count value of the total amount of code exceeds the target value set in the register in the encoding control unit 1713 again in spite of the execution of the above re-encoding processing. In this case, if the above re-encoding processing is completed, new re-encoding processing is immediately started.

In the new re-encoding processing, the remaining image area flag bit is replaced with "1". With this operation, the value of all image area flag data (eight bits) is set to "3". Letting N be the number of bytes of data, the data amount after encoding becomes (2N/128)+2 bytes.

This is because every time the number of consecutive data exceeds 128, the number of sets of two-byte encoded data (length information and consecutive data) increases.

Since the PackBits encoding circuit, decoding circuit, and data conversion circuit are known techniques, a description of each circuit arrangement will be omitted.

In the above embodiment, for the sake of simple explanation, the image area flag of each pixel is two-bit data. However, another type of information may be added as an image area flag, as described above.

Theoretically, there are $2^N$ image area information conversion processes if an image area type consists of N bits. However, the compression ratio must be increased every time conversion is performed. In any case, as the number of bits constituting image area information increases, the number of times of re-encoding processing can be increased. This makes it possible to control the amount of code in multiple steps.

As described above, lossless encoding processing for image area information data is controlled independently of image data compression-encoding processing. In each processing, data is compressed within a target amount of code.

The two types of encoded data are multiplexed when they are outputted to an externally connected network device, an image output apparatus, a large-capacity storage unit, or the like. In consideration of the multiplexing, the units in which the two types of data are encoded are set to the same size, and encoded data generated by encoding one unit of data is managed/stored as one packet or file. For example, image data and image area data are concatenated in the order named to form one packet and output it outside.

Figure 20:
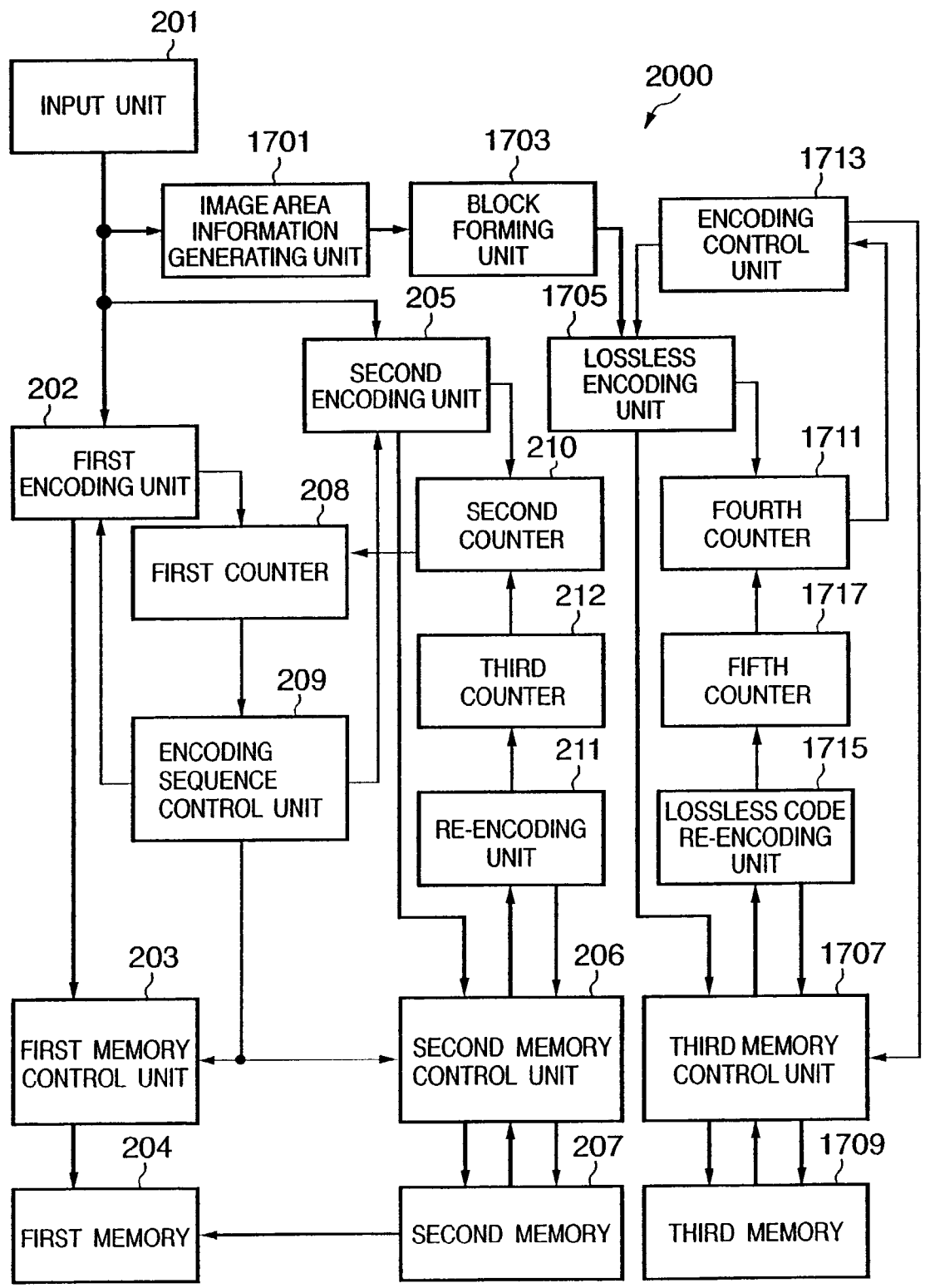
FIG. 20 is a block diagram showing another arrangement of the first embodiment.

Since the two encoding processes are controlled independently, the compression-encoding processing unit for image data may have another arrangement. Even if, therefore, the units 1701 to 17017 for losslessly encoding image area information data are added to the arrangement shown in FIG. 2, processing can be done in the same manner as described above. FIG. 20 shows this arrangement. The operations of the units 1701 to 1717 are the same as those in FIG. 17, and the operation of the image data compressing portion is the same as that in FIG. 2.

<Modification to First Embodiment>

In the embodiment, one of the two bits of image area component information is character•line drawing/halftone identification bit, and the other is set as a chromatic/achromatic component identification bit, and they are handled as one value having 0 to 3. However, the character•line drawing/halftone identification information and chromatic/achromatic component identification are essentially independent of each other. For this reason, a block constituted by character•line drawing/halftone identification bits and a block constituted by chromatic/achromatic component identification bits may be independently encoded. As a result, the respective bits in each block become bits of the same type, and hence the compression efficiency can be increased in the first step. This makes it possible to decrease the probability of converting some bits of image area information to a fixed value and increase the probability of compression-encoding the information as the original image area information.

<Second Embodiment>

The second embodiment will exemplify a processing method which can increase the number of times of re-encoding processing and allows fine amount of code control even if the number of bits constituting image area information is the same as that in the first embodiment. The arrangement of this embodiment is the same as that of the first embodiment except for the method of compressing image area flag data in a lossless encoding unit 1705 and lossless code re-encoding unit 1715.

In the first embodiment, image area flag data is replaced with fixed values bit by bit. In the second embodiment, the number of states is degenerated. For example, a two-bit image area flag can express four states. The number of states is degenerated to three by first re-encoding processing, and degenerated to two by the second re-encoding processing, thereby reducing the information entropy before encoding and reducing the data amount (amount of code) after encoding little by little.

If the first embodiment is expressed by using the words "the number of states", it can be said that the number of states is reduced to half every time image area information is re-encoded.

According to the first embodiment, in the first re-encoding processing, the number of states is substantially reduced to half. In contrast to this, in this embodiment, the number of states is reduced one by one. It is therefore natural that the amount of code can be reduced little by little.

The processing result obtained in the second embodiment will be described with reference to FIGS. 21A to 21E.

The data shown in FIG. 21A is the same as the image area flag data shown in FIG. 19B, and hence includes all two-bit states. The four states are defined as follows:

(1) chromatic character•line drawing portion (corresponding to data "3")

(2) achromatic character•line drawing portion (corresponding to data "2")

(3) chromatic halftone portion (corresponding to data "1"; also called chromatic image portion)

(4) achromatic halftone portion (corresponding to data "0"; also called achromatic image portion)

In the second embodiment, in the first re-encoding processing, of the four states, two states, i.e., (3) chromatic halftone portion and (4) achromatic halftone portion, are degenerated to one state, i.e., (3') halftone portion. With this operation, the four states are reduced to the following three states. This corresponds to process P1 described above.

(1) chromatic character portion
(2) achromatic character portion
(3') halftone portion More specifically, the above states are degenerated by replacing data "0" with "1". After the state degeneracy, the data is changed to the data shown in FIG. 21B. When this data is encoded by PackBits, the encoded data shown in FIG. 21C is obtained. As is obvious, the amount of code is slightly smaller than that of the encoded data in FIG. 19C before re-encoding.

In the second re-encoding processing, the two states, i.e., (1) chromatic character portion and (2) achromatic character portion, are degenerated to one state, i.e., (1') character portion. With this operation, the following two states are set.

(1') character portion
(3') non-character portion

The above states are then degenerated by replacing data "2" with "3". After the state degeneracy, the data is changed to the data shown in FIG. 21D. This data is the same as the data shown in FIG. 19D. Obviously, the encoded data shown in FIG. 21E obtained by encoding this data by PackBits is the same as the encoded data shown in FIG. 19E.

In the first embodiment, 15-byte data before re-encoding is reduced to six-byte data by one re-encoding operation. In this embodiment, this data is reduced to 11-byte data by the first re-encoding operation, and is reduced to six-byte data by the second re-encoding operation. As a consequence, in the second embodiment, an amount of code can be reduced little by little unlike in the first embodiment, and hence the compressed data of an image area flag which is close to a target amount of code can be obtained.

<Application Example>

The first embodiment, its modification, and the second embodiment have exemplified the apparatus for reading an image with an image scanner, and the functions/operations of the apparatus has been described. Most of the functions (including encoding processing) can be implemented by computer programs, as described above.

The present invention may therefore be applied to an application program that operates on a general-purpose information processing apparatus such as a personal computer. When the present invention is to be applied to an application program, it suffices if a GUI is provided, which makes a user designate an image file as a compression source and select a target size. In this case, the user is allowed to arbitrarily set a target value. However, it is difficult to set a target value with a numerical value. A target value may therefore be determined by allowing the user to select it from a menu that is made to be intuitively used in consideration of original sizes and image quality (high, medium, low, and the like).

A quantization step has been exemplified as an encoding parameter in the encoding unit. However, another parameter may be used as long as no sense of incongruity is produced between images in terms of image quality when data with different compression ratios exist together. However, for example, in the arrangement shown in FIG. 1, in order to substantially match data to be re-encoded, which is output from the re-encoding unit 109, with encoded data from the encoding unit 102 after a parameter is changed, it is preferable to use the technique of increasing the quantization step as in the above embodiment.

As described above, since the present invention can be implemented by an application program that operates on a general-purpose apparatus, the present invention incorporates the computer program. In addition, the computer program is generally executed after a storage medium such as a floppy disk or CD-ROM is set in the apparatus and the program is copied or installed, such a storage medium also falls in the category of the present invention.

In addition, in this embodiment, image data is input from the scanner. However, the present invention can be applied to a printer driver that operates on a host computer. Assume that the present invention is to be applied to the printer driver. In this case, when data to be printed is received from upper-level processing (application or the like), the data can be discriminated as a halftone image or character•line drawing. This makes it possible to omit or simplify the arrangement associated with image area information generation processing.

Furthermore, the present invention can be applied to a combination of a computer program and proper hardware (encoding circuit and the like).

As described above, according to the first and second embodiments, the present invention includes a decoding means for decoding losslessly encoded image area information, an image area information conversion means for partly rewriting or deleting the image area information to reduce the information entropy of the image area information, a re-encoding means for losslessly re-encoding the image area information obtained by making the image area information conversion means convert the image area information decoded by the decoding means, a lossless encoding means having the information conversion means, and a storage means capable of storing data obtained by encoding image area information accompanying at least one-page image data.

In this arrangement, one-page image area information can be compressed within a desired encoded data amount by controlling both the image area information conversion means of the lossless conversion means and the image area information conversion means provided on the input stage of the re-encoding means in accordance with the amount of encoded data.

<Third Embodiment>

Figure 22:
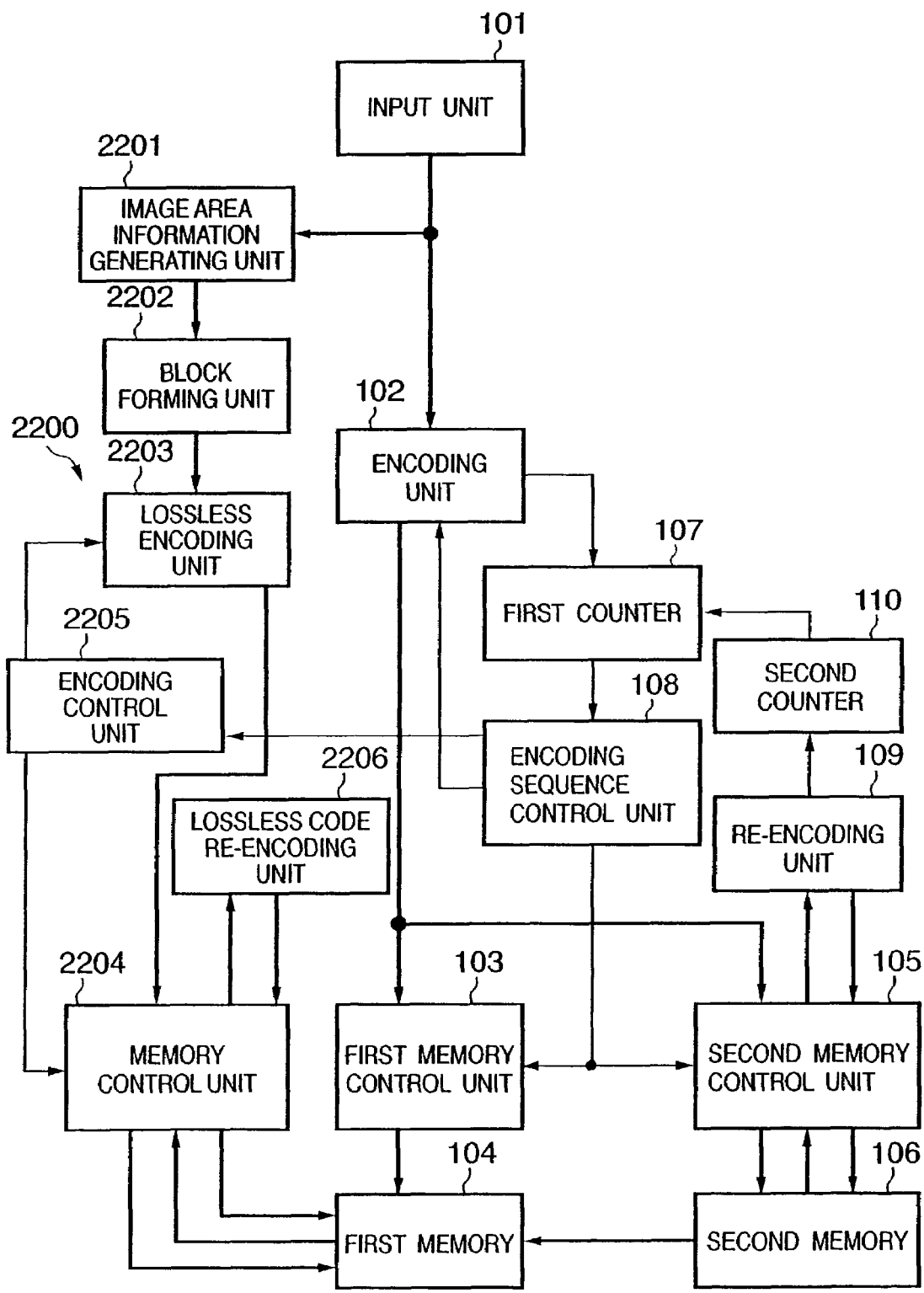
FIG. 22 is a block diagram showing an apparatus according to the third embodiment.

The third embodiment of the present invention will be described. The third embodiment performs almost the same operation as that of the first embodiment described above, but differs from the first embodiment in structure. FIG. 22 is a block diagram of this structure. The constituent elements denoted by the same reference numerals as in FIG. 1 perform the same operation (encoding processing for image data), and hence a description thereof will be omitted. A portion for encoding image area information in the third embodiment will be described below.

The image data (multilevel color image data) input from an image scanner, page description language rendering, or the like through an input unit 101 is supplied to an encoding unit 102 and image area information generating unit 2201. As described above, since the arrangement including the encoding unit 102 and subsequent units is the same as that shown in FIG. 1, a description thereof will be omitted.

The image area information generating unit 2201 generates image area information from the input image data. If a scanner is to be used for input operation, it suffices if the same processing as that performed by the image area information generating unit 1701 in the first embodiment described above is performed. If image data is to be input from PDL rendering, since image area information is known for each pixel when image formation is done by PDL rendering, the information can be utilized.

The generated image area information is formed by a block forming unit 2202 into blocks each having a data size with which information is encoded together, e.g., a size of M×N.

Since multilevel lossy compression such as JPEG used for compression of image data is not suitable for compression of image area information which is a set of binary data, lossless encoding is done in a lossless encoding unit 2203 by using JBIG as a lossless compression scheme or run-length encoding such as PackBits.

The losslessly encoded image area information is stored in a first memory 104 through a memory control unit 2204.

Figure 27:
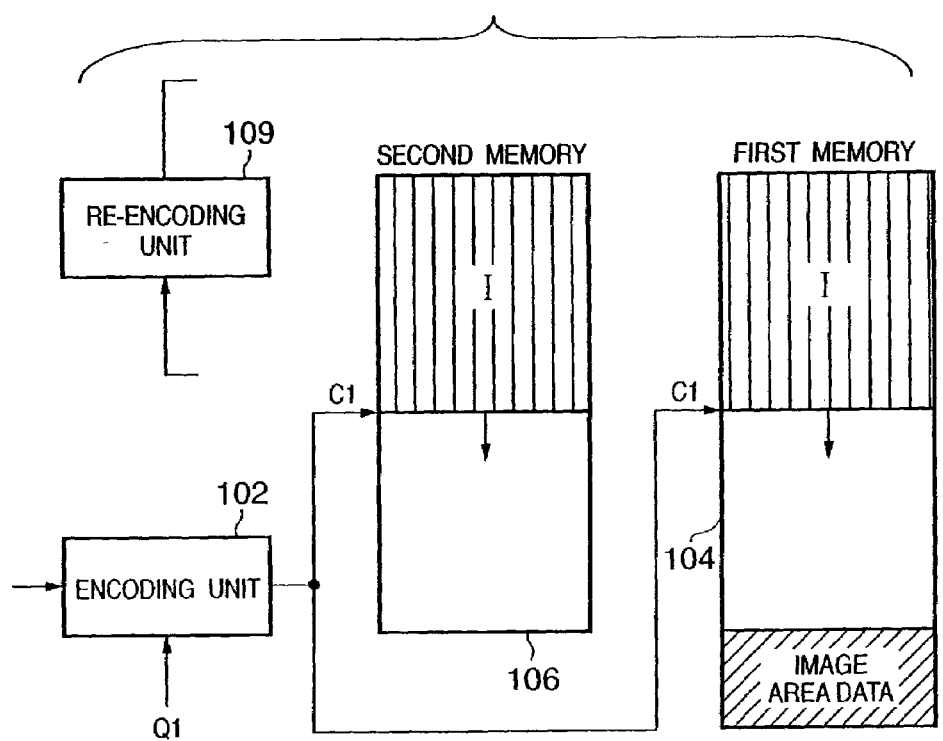
FIG. 27 is a view showing data flows and memory contents in the encoding phase in the initial state in the third embodiment.

FIG. 27 shows the states of memories in the initial state of encoding. This arrangement differs from that shown in FIG. 4 in that a storage area for image area information is provided, as shown in FIG. 27. The encoded image area information is sequentially stored in this storage area through the memory control unit 2204.

As described above, an encoding sequence control unit 108 detects whether the count value of a first counter 107 has reached a given set value. Upon detecting that the count value has reached the set value, the encoding sequence control unit 108 outputs a predetermined control signal to control the encoding unit 102 to encode image data at a compression ratio higher than before.

In the third embodiment, at the same time, the encoding sequence control unit 108 instructs an encoding control unit 2205 to perform re-encoding of image area information, in synchronism with the timing of re-encoding of the above image data.

The encoding control unit 2205 reads out encoded image area data from the first memory 104, and outputs a control signal to the memory control unit 2204 to send the data to a lossless code re-encoding unit 2206.

Upon receiving the encoded data, the lossless code re-encoding unit 2206 decodes it, and discards some of a plurality of attribute flag data or replace some of them with fixed values. Thereafter, the lossless code re-encoding unit 2206 losslessly encodes the resultant data again. Even when some of attribute flags are replaced with fixed values as well, since the information entropy decreases, the data amount after run-length encoding decreases. The attribute data after re-encoding is stored in the first memory 104 again.

The encoding control unit 2205 sends a control signal to the image area information conversion processing unit of the lossless encoding unit 2203 to discard some of attribute flags or replace some of them with fixed values so as to encode the attribute flag data of the same information as the attribute flag data whose information amount is reduced by the lossless code re-encoding unit 2206, thereby continuing the encoding processing.

This processing is continued until there is no image area flag data to be re-encoded and the re-encoding processing is terminated.

The encoding sequence control unit 108 detects whether the count value of the counter 107 has reached a given set value. Every time image data is re-encoded whenever the count value exceeds the target value, the number of attribute flags to be discarded is increased. This makes it possible to decrease the amount of code of image area data stepwise and reduce the amount of code of the image area data within the target value.

Figure 23:
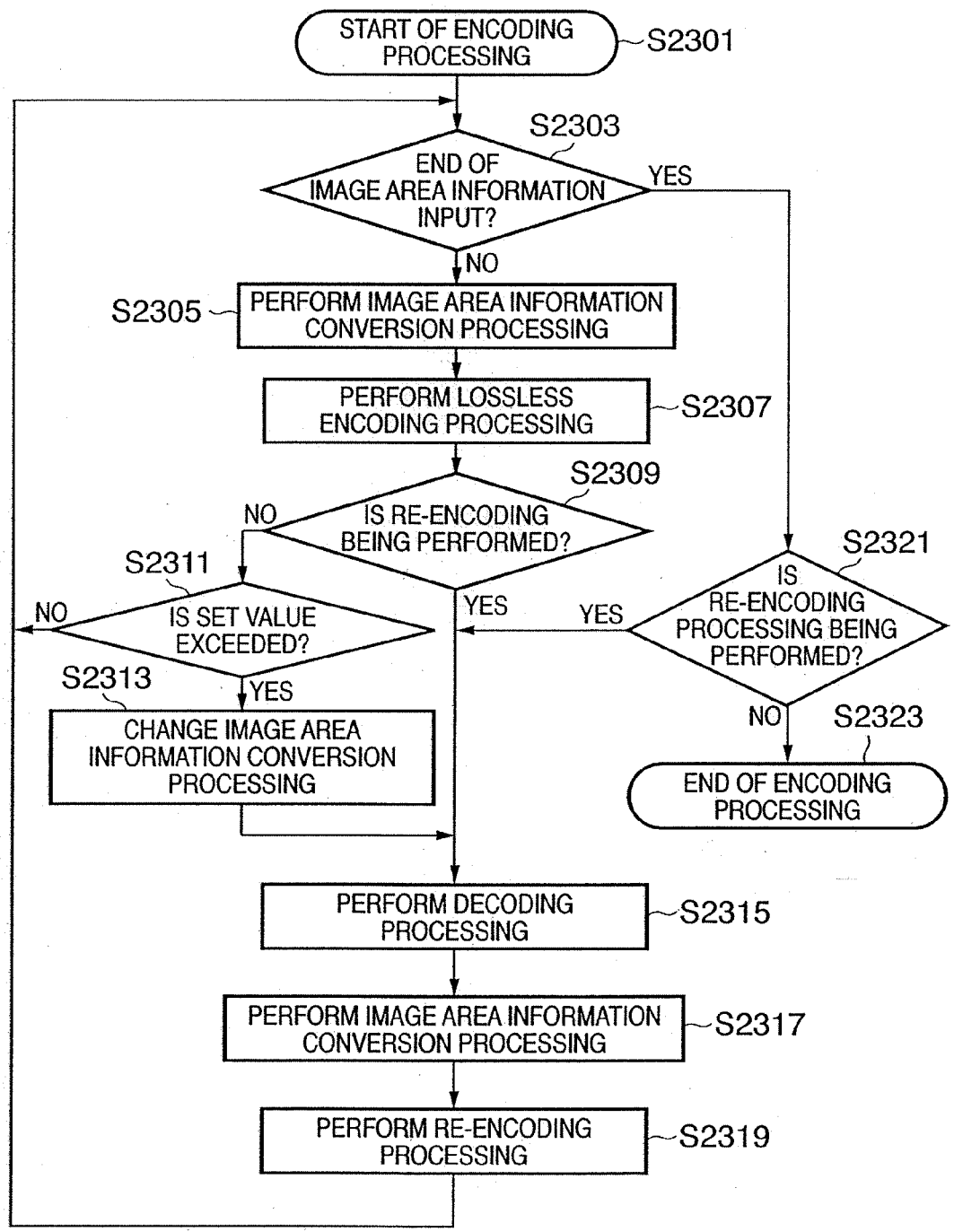
FIG. 23 is a flow chart showing a processing procedure in the third embodiment.
Figure 25:
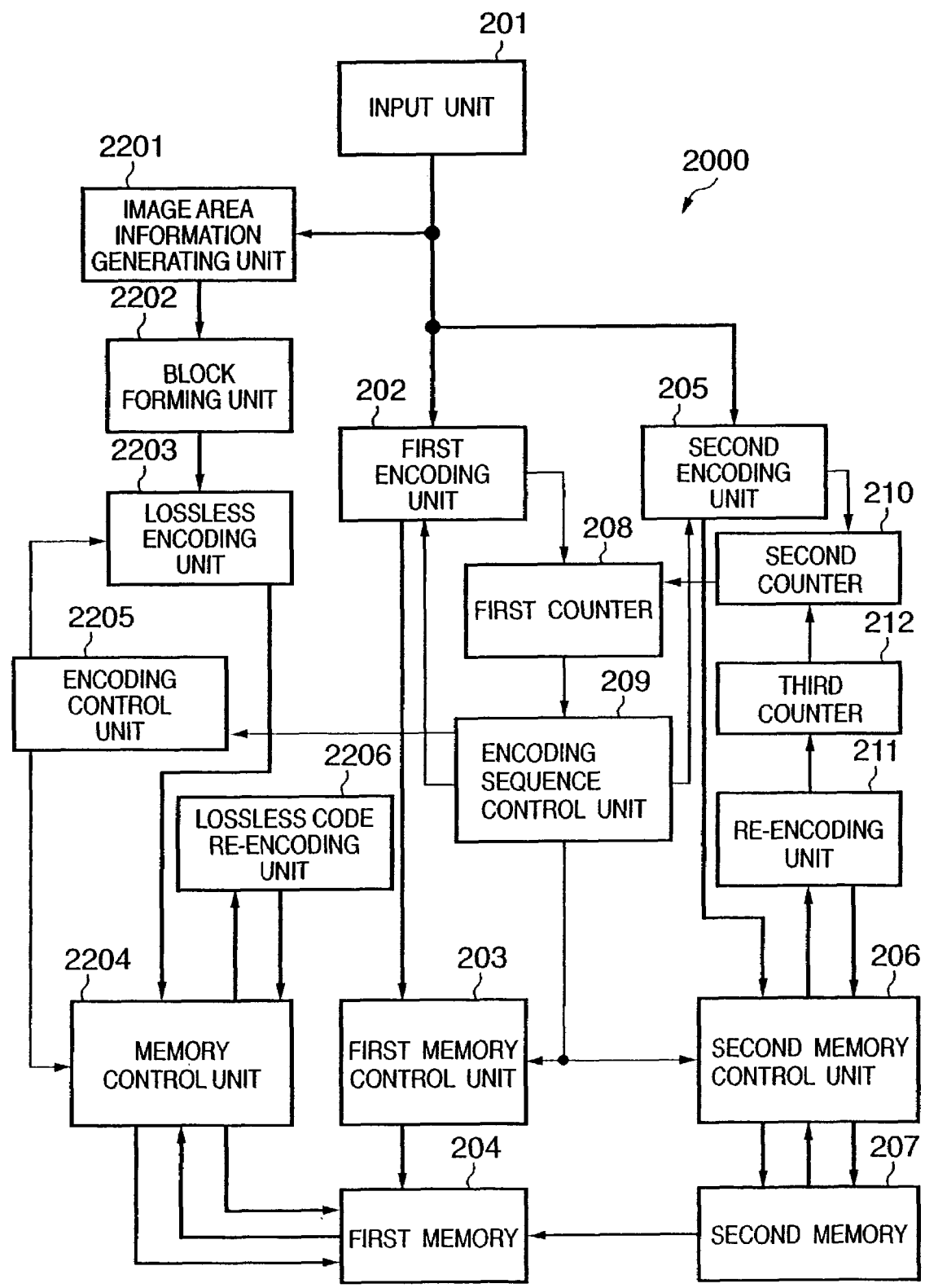
FIG. 25 is a block diagram showing another arrangement of the third embodiment.

The contents of processing (encoding processing for image area information) in the third embodiment will be described next with reference to the flow chart of FIG. 23. As described above, the processing in the third embodiment is roughly divided into two processes. One is a lossless encoding process, and the other is a re-encoding process.

The encoding processing is realized by image area information conversion processing in step S2035 and lossless encoding processing in step S2307. The re-encoding processing is realized by decoding processing in step S2315, image area information conversion processing in step S2317, and re-encoding processing in step S2319.

The remaining steps are conditional branching, start, and end steps except for changing of image area information conversion processing in step S2313.

Image area information encoding processing is started from step S2301. In step S2303, it is checked whether image area information corresponding to one-page image data is completely input. If YES in step S2303, the flow advances to step S2321. If NO in step S2303, i.e., there is still image area information to be input, image area information conversion processing in step S2305 is performed.

In the initial state wherein re-encoding processing has not been activated at all, nothing is done in the image area conversion processing, and the input image area information is directly encoded in the lossless encoding processing in step S2307.

In step S2309, it is checked whether re-encoding processing is being done. If YES in step S2309, the re-encoding processing constituted by steps S2315 to S2319 is performed. If NO in step S2309, the flow advances to step S2311 to check whether the image data is to be re-encoded.

If no control signal is received from the encoding sequence control unit 108, which indicates that encoded data has exceeded a predetermined target value, the flow returns to step S2303 to repeat encoding processing. If such a control signal is received, the contents of image area information conversion processing are changed. With this change, the contents of image area information conversion processing in steps S2305 and S2317 are changed. More specifically, in the initial state, all input image area information is encoded without invalidating any bit. That is, nothing is done in the image area information conversion processing. However, after the processing contents are changed, the processing of discarding at least one bit of the image area information or replacing it with a fixed value is performed in the above image area information conversion processing. For example, all bits indicating character•line drawing portions are converted into bits indicating halftone portions. Subsequently, every time the processing contents are changed, the number of bits of image area flags which are to be discarded or replaced with fixed values is increased (to set a state wherein the run length tends to increase).

After the contents of the image area information conversion processing are changed, re-encoding processing is performed. In the re-encoding processing, the encoded image area information is decoded into data before encoding in step S2315. In step S2317, the above image area information conversion processing is performed to partly discard the image area information or partly replace it with fixed values. In step S2319, the converted image area information is losslessly encoded again.

After the re-encoding processing, the flow returns to step S2303. If image area information is input, the information is encoded. When the amount of code of image data exceeds the set value at least once and re-encoding is started, the contents of the image area information conversion processing are simultaneously changed. After the image area flag data is partly discarded or replaced with fixed values in the image area information conversion processing in step S2305, lossless encoding is performed in step S2307.

If the re-encoding processing is continued even after image area information is completely input, the flow advances from step S2303 to step S2321 to determine that the re-encoding processing is being performed. The re-encoding processing constituted by steps S2315 to S2319 is then performed.

If image area information is completely input and no-recoding processing is done, the flow advances to step S2323 to terminate the encoding processing for image area information.

If the amount of code of image data exceeds the set value at least once again, all bits representing chromatic/achromatic components in the image area information are changed to bits representing chromatic components.

The specific contents of processing in the third embodiment, in which image area information constituted by two bits per pixel is converted into eight-bit information by adding six-bit data "000000", and PackBits encoding is performed as lossless encoding, will be described in further detail with reference to FIGS. 24A to 24E.

As shown in FIG. 24A, the eight-bit data before PackBits encoding is designed such that the upper six bits are all "0"s, and a flag bit for identifying the corresponding pixel data as a pixel belonging to a character•line drawing/halftone area and a flag bit for indicating a chromatic/achromatic component are respectively assigned to the upper and lower bits of the lower two bits. This eight-bit data can take a value equal to or more than 0 and equal to or less than 3.

The above eight-bit data is output from the image area information generating unit 2201 on a pixel basis. Consider the data shown in FIG. 24B as specific output data.

This data is encoded by PackBits into the data shown in FIG. 24C. In this compressed data, a negative value represents the number of consecutive data, and a positive value represents the number of non-consecutive data. These data are called length information. The sign bit (MSB) of the length information makes it possible to discriminate whether consecutive or non-consecutive data will continue. Each compressed data is eight-bit (one-byte) data like the data shown in FIG. 24B. The maximum value that can be expressed by one-byte information is about 128, which is half of 255. If the length information is equal to or less than 128, encoding can be done with a set of length information and a succeeding image area flag data group. If the length information exceeds 128, encoding is done by dividing the information into a plurality of sets of length information+ image area flag data group.

The compressed data shown in FIG. 24C will be described in detail below. The first length information "–4" is a negative value, and hence represents the number of consecutive data, as descried above, and indicates that four image area flag data "1"s continue immediately after the length information.

The next data "4" is also length information. This information is a positive value, and hence indicates that four non-consecutive data continue. That is, the four data "2, 3, 2, 3" following the above value "4" are non-consecutive data. Referring to FIG. 24C, only the pieces of positive length information are underlined to allow easy discrimination between length information and image area flag data.

The data "–5" following the above non-consecutive data is the length information of consecutive data and indicates that five image area flag data "2"s continue immediately after the length information. The next underlined data "3" is the length information of non-consecutive data, and indicates that the three succeeding data "1, 0, 1" are image area flag data. The next data "–6, 0" indicate that six data "0"s continue.

What becomes of the compressed data when it is re-encoded by a lossless code re-encoding unit 1715 will be described below with reference to FIGS. 24D and 24E. A case wherein all chromatic/achromatic flags are fixed to "1" to make all the components become chromatic in re-encoding processing will be described below.

The encoded image area data is temporarily decoded and restored to the data shown in FIG. 24B. The data is then subjected to above flag data replacement to be converted into the data shown in FIG. 24D. When this data is encoded again by PackBits, the encoded data shown in FIG. 24E is obtained. As is obvious, the 15-byte encoded data before re-encoding is reduced to six-byte data after re-encoding.

Assume that the count value of a total amount of code exceeds a set target value in encoding of image data even after the above re-encoding processing, and the image data is to be re-encoded. In this case, a control signal for re-encoding image area data as well is received from the encoding sequence control unit 108. If the above re-encoding processing is completed, new re-encoding processing is immediately started. If the above re-encoding processing is not completed, new re-encoding processing is started immediately after the completion of the re-encoding processing.

In the new re-encoding processing, the remaining image area flag bit is replaced with "1". With this operation, the value of all image area flag data (eight bits) is set to "3". Letting N be the number of bytes of data, the data amount after encoding becomes (2N/128)+2 bytes.

This is because every time the number of consecutive data exceeds 128, the number of sets of two-byte encoded data (length information and consecutive data) increases.

Since the PackBits encoding circuit, decoding circuit, and data conversion circuit are known techniques, a description of each circuit arrangement will be omitted.

In the above description, for the sake of simplicity, the image area flag for each pixel is two-bit information. As described above, however, there are some other types of information as image area flags. In the above re-encoding processing, two-bit image area flag data allows re-encoding processing twice at maximum, and four-bit image area flag data allows re-encoding processing four times at maximum. As the number of bits constituting image area flag data increases, the number of times of re-encoding processing can be increased. This makes it possible to control the amount of code in multiple steps. As described above, lossless encoding processing for image area flag data is controlled independently of image data compression-encoding processing. In each processing, data is compressed within a target amount of code.

The two types of encoded data are multiplexed when they are output to an externally connected network device, an image output apparatus, a large-capacity storage unit, or the like. In consideration of the multiplexing, the units in which the two types of data are encoded are set to the same size, and encoded data generated by encoding one unit of data is managed/stored as one packet or file. For example, image data and image area data are concatenated in the order named to form one packet and output it outside.

Since the two encoding processes are controlled independently, the compression-encoding processing unit for image data may have another arrangement. Even if, therefore, the units 2201 to 2206 for losslessly encoding image area information data are added to the arrangement shown in FIG. 2, processing can be done in the same manner as described above. FIG. 20 shows this arrangement. The operations of the units 2201 to 2206 are the same as those in FIG. 22, and the operation of the image data compressing portion is the same as that in FIG. 2.

<Fourth Embodiment>

The fourth embodiment will exemplify a processing method which can increase the number of times of re-encoding processing and allows fine amount of code control even if the number of bits constituting image area information is the same as that in the third embodiment. The arrangement of this embodiment is the same as that of the first embodiment except for the method of compressing image area flag data in a lossless encoding unit 1703 and lossless code re-encoding unit 1706.

In the first embodiment, image area flag data is replaced with fixed values bit by bit, i.e., data is degenerated bit by bit. In this embodiment, the number of states is degenerated.

For example, a two-bit image area flag can express four states. The number of states is degenerated to three by first re-encoding processing, and degenerated to two by the second re-encoding processing, thereby reducing the information entropy before encoding and reducing the data amount (amount of code) after encoding little by little.

If the third embodiment is expressed by using the words "the number of states", it can be said that the number of states is reduced to half every time image area flag data is encoded.

According to the third embodiment, in the first re-encoding processing, the number of states is reduced to half. In contrast to this, in this embodiment, the number of states is reduced one by one. It is therefore natural that the amount of code can be reduced little by little.

FIGS. 26B, 26C, 26D, and 26E show the processing result obtained in the this embodiment, which will be described below.

The data shown in FIG. 26A is the same as the image area flag data shown in FIG. 24B, and hence includes all four two-bit states. The four states are enumerated again as follows:

(1) chromatic character•line drawing portion (corresponding to data "3")

(2) achromatic character•line drawing portion (corresponding to data "2")

(3) chromatic non-character portion (corresponding to data "1"; also called chromatic image portion)

(4) achromatic non-character portion (corresponding to data "0"; also called achromatic image portion)

In this embodiment, in the first re-encoding processing, of the four states, two states, i.e., (3) chromatic halftone portion and (4) achromatic halftone portion, are degenerated to one state, i.e., (3') non-character portion.

With this operation, the following three states are set.

(1) chromatic character portion (2) achromatic character portion (3') non-character portion More specifically, the above states are degenerated by replacing data "0" with "1". After the state degeneracy, the data is changed to the data shown in FIG. 26B. When this data is encoded by PackBits, the encoded data shown in FIG. 26C is obtained. As is obvious, the amount of code is slightly smaller than that of the encoded data in FIG. 24C before re-encoding.

In the second re-encoding processing, the two states, i.e., (1) chromatic character portion and (2) achromatic character portion, are degenerated to one state, i.e., (1') character portion. With this operation, the following two states are set.

(1') character portion (3') non-character portion

The above states are then degenerated by replacing data "2" with "3". After the state degeneracy, the data is changed to the data shown in FIG. 26D. This data is the same as the data shown in FIG. 24D. Obviously, the encoded data shown in FIG. 26E obtained by encoding this data by PackBits is the same as the encoded data shown in FIG. 24E.

In the third embodiment, 15-byte data before re-encoding is reduced to six-byte data by one re-encoding operation. In the fourth embodiment, this data is reduced to 11-byte data by the first re-encoding operation, and is reduced to six-byte data by the second re-encoding operation. As a consequence, in the fourth embodiment, an amount of code can be reduced little by little unlike in the third embodiment, and hence the compressed data of an image area flag which is close to a target amount of code can be obtained.

As described above, according to the third and fourth embodiments, one-page image area information can be compressed within a desired encoded data amount as in the first and second embodiments described above.

<Fifth Embodiment>

Figure 28:
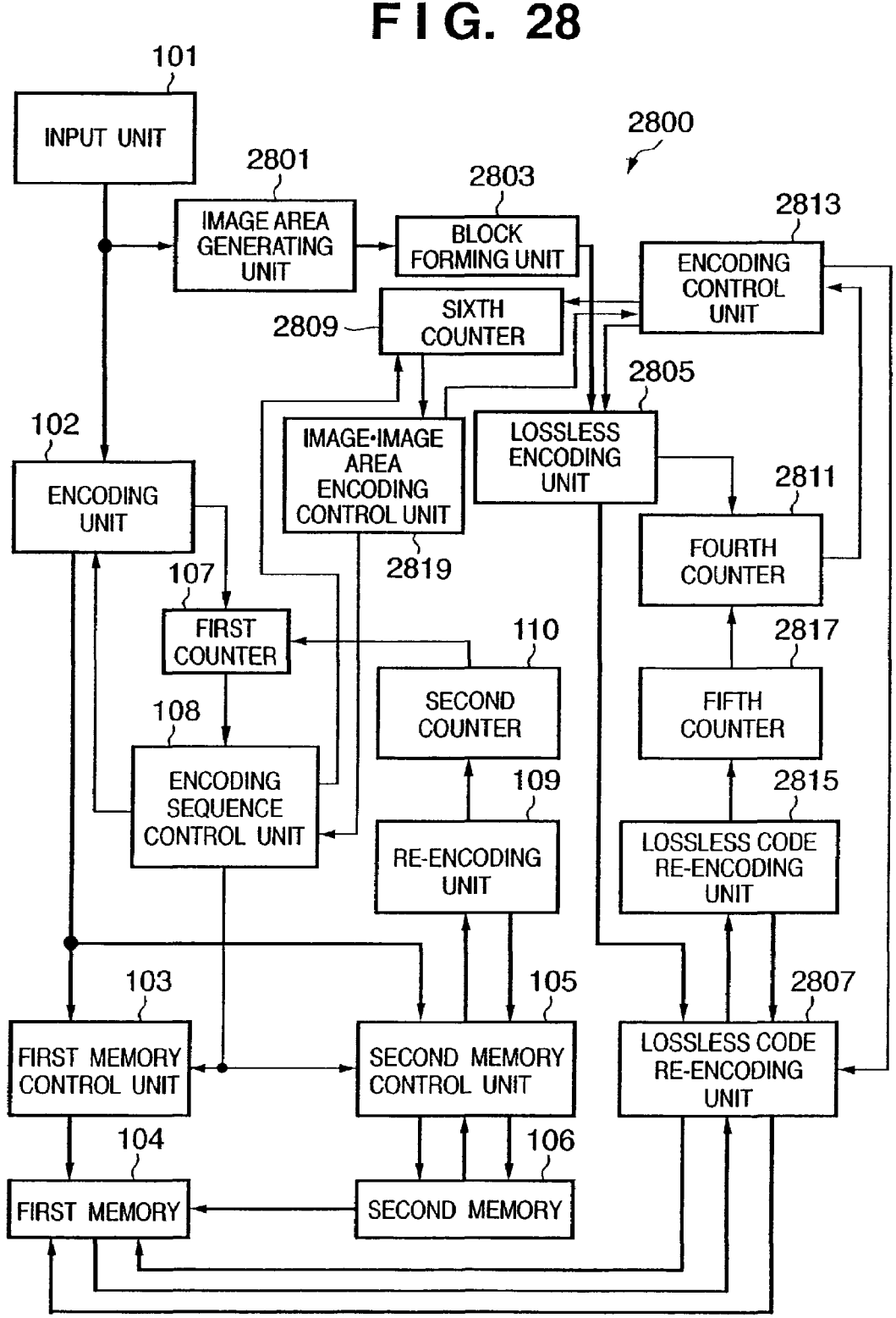
FIG. 28 is a block diagram showing an apparatus according to the fifth embodiment.

The fifth embodiment of the present invention will be described. The fifth embodiment performs almost the same operation as that of the first embodiment described above, but differs from the first embodiment in structure. FIG. 28 is a block diagram of this structure. The constituent elements denoted by the same reference numerals as in FIG. 1 perform the same operation (encoding processing for image data), and hence a description thereof will be omitted. A portion for encoding image area information in the fifth embodiment will be described below.

The image data (multilevel color image data) input from an image scanner, page description language rendering, or the like through an input unit 101 is supplied to an encoding unit 102 and image area information generating unit 2801. As described above, since the arrangement including the encoding unit 102 and subsequent units is the same as that shown in FIG. 1, a description thereof will be omitted.

The image area information generating unit 2801 generates image area information from the input image data. If a scanner is to be used for input operation, it suffices if the same processing as that performed by the image area information generating unit 1701 in the first embodiment described above is performed. If image data is to be input from PDL rendering, since image area information is known for each pixel when image formation is done by PDL rendering, the information can be utilized.

The generated image area information is formed by a block forming unit 2803 into blocks each having a data size with which information is encoded together, e.g., a size of M×N.

Since multilevel lossy compression such as JPEG used for compression of image data is not suitable for compression of image area information which is a set of binary data, lossless encoding is done in a lossless encoding unit 2805 by using JBIG as a lossless compression scheme or run-length encoding such as PackBits.

The losslessly encoded image area information is stored in a first memory 104 through a third memory control unit 2807. At the same time, the amount of encoded data output from the lossless encoding unit is cumulatively counted by a fourth counter 2811. The count value is sent to an encoding control unit 2813.

Figure 33:
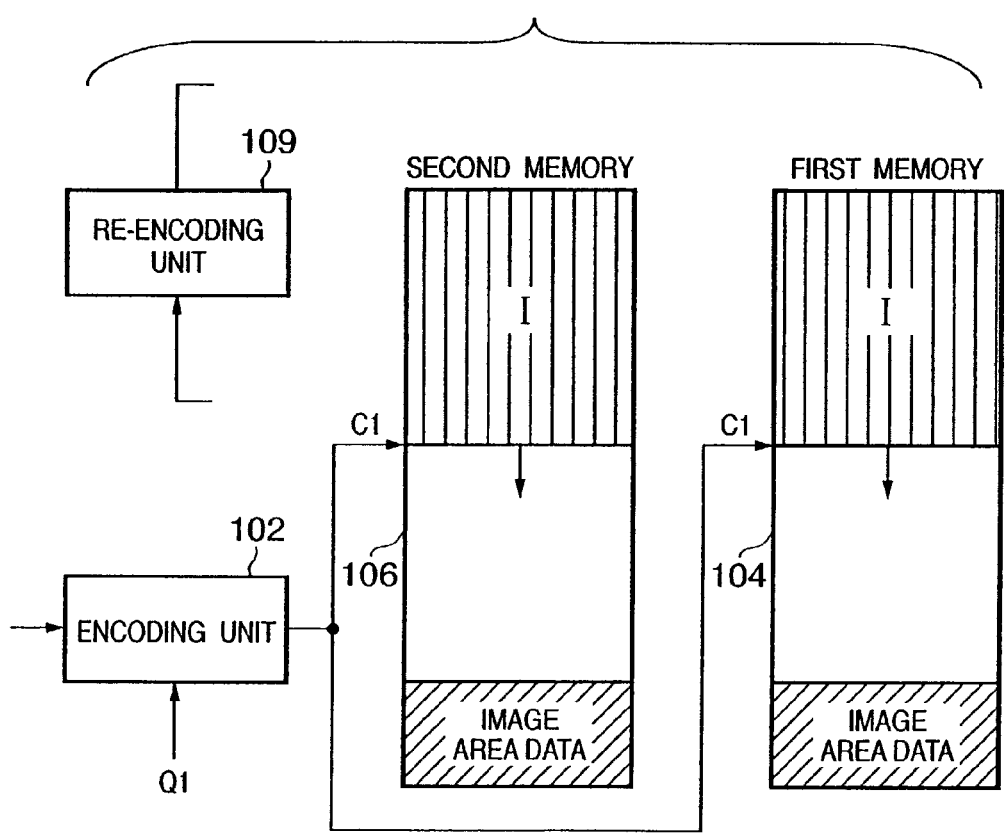
FIG. 33 is a view showing data flows and memory contents in the encoding phase in the initial state in the fifth embodiment.

FIG. 33 shows the states of memories in the initial state of encoding. This arrangement differs from that shown in FIG. 4 in that a storage area for image area information is provided. Basically, encoded image area information is sequentially held in this storage area. As will be described later, however, encoded image data may be stored in this storage area. In addition, as is obvious, even if encoded image area data cannot be completely stored in this storage area but if there is an available space in the storage area for image data, image area data can be held in this available space.

The encoding control unit 2813 and an encoding sequence control unit 108 respectively send count values from the fourth counter 2811 and a first counter 107 to a sixth counter 2809.

The sixth counter adds the count value associated with image data encoding and the count value associated with image area information encoding, and sends the resultant value to an image•image area encoding control unit 2819.

A total target value of image data and image area data is set in the register in the image•image area encoding control unit 2819. When the total count value of the amount of codes of image data and image area data exceeds the target value, the image•image area encoding control unit 2819 outputs control signals to the encoding control unit 2813 and encoding sequence control unit 108 to perform re-encoding processing.

The encoding control unit 2813 reads out encoded image area data from the first memory 104, and outputs a control signal to the memory control unit 2807 so as to send the image area data to a lossless code re-encoding unit 2815.

The encoding sequence control unit 108 outputs a control signal to a first memory control unit 103 so as to discard the data which has already been stored in the first memory 104. The first memory control unit 103 discards the stored data by clearing the memory address counter or the encoded data management table on the basis of this control signal. The encoding sequence control unit 108 controls the encoding unit 102 so as to perform encoding at a compression ratio higher than before, thereby performing re-encoding processing.

Assume that the count value of the first counter 107 exceeds the target value of the amount of code of image data stored in the register in the encoding sequence control unit 108 or the count value of the fourth counter 2811 exceeds the target value of the amount of code of image area data stored in the register in the encoding control unit 2813. Even in this case, if the total amount of code of image data and image area data does not exceed the total target value of the amount of codes of image data and image area data, the encoding processing is continued.

With this operation, image data need not be re-encoded in the following case. Assume that the image data slightly exceeds a target value for the image data, but the amount of code of corresponding image area information is small. If a storage area assigned to the image area data in the first memory 104 is assigned to the image data, and the total amount of code of image data and image area information is smaller than the target value of the amount of code of image data and image area data, there is no need to re-encode the image data. In addition, there is no need to compress the data at a high compression ratio. This makes it possible to improve the image quality and performance.

With regard to re-encoding processing for image data, when the image•image area encoding control unit 2819 outputs a control signal for re-encoding processing to the encoding sequence control unit 108, the encoding sequence control unit 108 performs control for the same re-encoding processing as that described with reference to FIG. 1.

In re-encoding processing for image area information, when the image•image area encoding control unit 2819 outputs a control signal for re-encoding processing to the encoding control unit 2813, the encoding control unit 2813 outputs a control signal to the memory control unit 2807 so as to read out encoded image area data from the first memory 104 and send the data to the lossless code re-encoding unit 2815.

Upon reception of the encoded data, the lossless code re-encoding unit 2815 decodes it and discards some of pieces of attribute information or replaces some of them with fixed values. The lossless code re-encoding unit 1815 then losslessly encodes the resultant data again. When some of the attribute flags are replaced with fixed values as well, since the information entropy decreases, the data amount after run-length encoding decreases. The re-encoded attribute data is stored in the first memory 104 again, and its amount of code is counted by a fifth counter 2817.

Like the lossless code re-encoding unit 2815, the encoding control unit 2813 sends a control signal to the lossless encoding unit 2805 to discard some of pieces of attribute information input from then on or replace some of them with fixed values, thereby continuing the encoding processing. At the same time, the encoding control unit 2813 also sends a control signal to the fourth counter 2811 to reset the value that has been counted and held and newly count the amount of code of data generated by encoding after some of pieces of attribute information are discarded or replaced with fixed values.

When there is no image area information to be re-encoded and the re-encoding processing is terminated, the count value of the fifth counter 2817 is transferred to the fourth counter 2811 to add it to the count value of the fourth counter 2811. With this operation, the fourth counter 2811 counts the total amount of code of losslessly encoded data after some of pieces of attribute information are discarded or replaced with fixed values.

Every time image data and image area information are re-encoded, the respective amount of codes are counted. Every time the total amount of code of image data and image area information exceeds the total target value of image data and information set in the register in the image•image area encoding control unit 2819, the image data and image area information are re-encoded. In re-encoding image area information, the amount of code of image area data can be decreased stepwise by increasing the number of attribute flags to be discarded. This makes it possible to reduce the amount of code of image area information within the target value.

Figure 29:
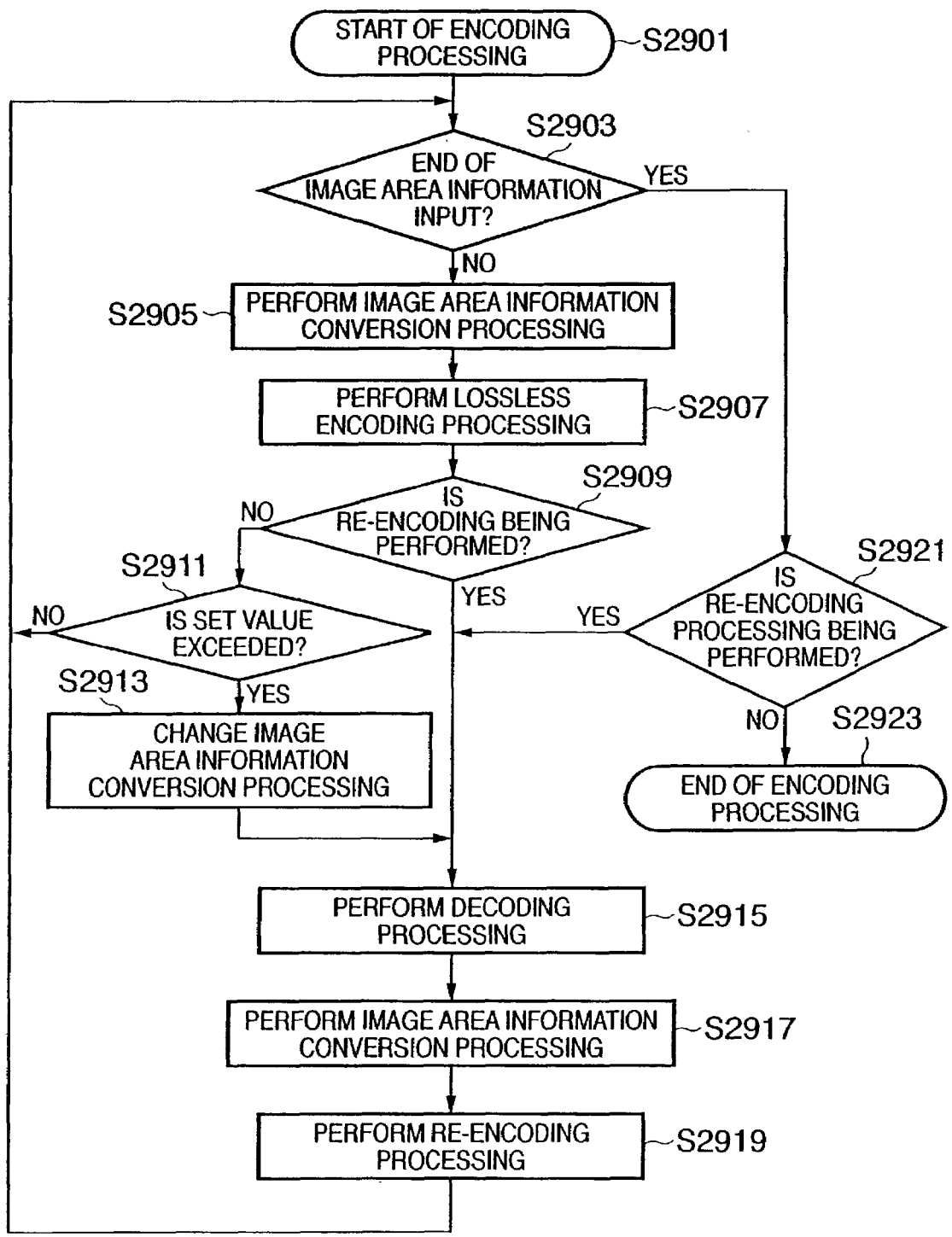
FIG. 29 is a flow chart showing a processing procedure in the fifth embodiment.

The contents of processing in the this embodiment will be described with reference to the flow chart of FIG. 29. The processing in this embodiment is roughly divided into two processes, as described above. One is a lossless encoding process, the other is a re-encoding process.

The encoding process is constituted by image area information conversion processing in step S2905 and lossless encoding processing in step S2907. The re-encoding process is constituted by decoding processing in step S2915, image area information conversion processing in step S2917, and re-encoding processing in step S2919. The remaining steps are conditional branching, start, and end steps except for changing of image area information conversion processing in step S2913.

Image area information encoding processing is started from step S2901. In step S2903, it is checked whether image area information corresponding to one-page image data (one image) is completely input. If YES in step S2903, the flow advances to step S2921. If NO in step S2913, i.e., there is still image area information to be input, image area information conversion processing in step S2905 is performed.

In the initial state wherein re-encoding processing has not been activated at all, nothing is done in the image area conversion processing, and the input image area information is directly encoded in the lossless encoding processing in step S2907.

In step S2909, it is checked whether re-encoding processing is being done. If YES in step S2909, the re-encoding processing constituted by steps S2915 to S2919 is performed. If NO in step S2909, the flow advances to step S2911 to check whether the total data amount (total amount of code) of image data and image area information encoded by the image•image area encoding control unit has exceeded the set value.

If NO in step S2911, the flow returns to step S2903 to repeat encoding processing. If YES in step S2911, the contents of the image area information conversion processing are changed. With this change, the contents of the image area information conversion processing in steps S2905 and S2917 are changed. More specifically, in the initial state, all pieces of input image area flag data are encoded without invalidating any bit. That is, nothing has been done in the image area conversion processing, but at least one-bit flag data in image area information is discarded or replaced with a fixed value in the above image area conversion processing after the contents of processing are changed. Subsequently, every time the contents of processing are changed, the number of bits of an image area flag which is to be discarded or replaced with a fixed value is increased.

After the contents of the image area information conversion processing are changed, re-encoding processing is performed. In the re-encoding processing, the image area information that has already been encoded is decoded into data before encoding in step S2915. In step S2917, image area information conversion processing is performed to partly discard the image area information or partly replace it with fixed values. In step S2919, the converted image area information is losslessly encoded again.

After the re-encoding processing, the flow returns to step S2903. If image area information is input, the information is encoded. In the image•image area encoding control unit, when the total amount of code of image data and image area data exceeds the set value at least once, the contents of the image area information conversion processing are simultaneously changed. After the image area flag data is partly discarded or replaced with fixed values in the image area information conversion processing in step S2905, lossless encoding is performed instep S2907.

If the re-encoding processing is continued even after image area information is completely input, the flow advances from step S2903 to step S2921 to determine that the re-encoding processing is being performed. The re-encoding processing constituted by steps S2915 to S2919 is then performed.

If image area information is completely input and no-recoding processing is done, the flow advances to step S2929 to terminate the encoding processing for image area information.

The specific contents of processing in this embodiment, in which image area information constituted by two bits per pixel is converted into eight-bit information by adding six-bit data "000000", and PackBits encoding is performed as lossless encoding, will be described in further detail with reference to FIGS. 30A to 30E.

Figure 30:
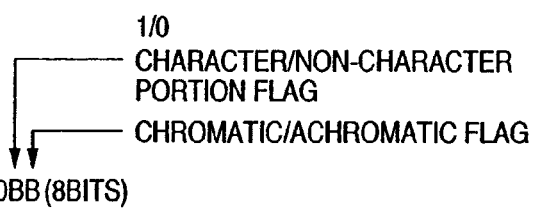
FIGS. 30A to 30E are views showing losslessly encoded data and encoded data after re-encoding in the fifth embodiment.

As shown in FIG. 30A, the eight-bit data before PackBits encoding is designed such that the upper six bits are all "0"s, and a flag for identifying the corresponding pixel data as a pixel belonging to a character•line drawing/halftone area and a flag for indicating a chromatic/achromatic component are respectively set in the upper and lower bits of the lower two bits. This eight-bit data can take a value equal to or more than 0 and equal to or less than 3.

The above eight-bit data is output from the image area information generating unit 2801 on a pixel basis. Consider the data shown in FIG. 30B as specific output data.

This data is encoded by PackBits into the data shown in FIG. 30C. In this compressed data, a negative value represents the number of consecutive data, and a positive value represents the number of non-consecutive data. These data are called length information. The sign bit (MSB) of the length information makes it possible to discriminate whether consecutive or non-consecutive data will continue. Each compressed data is eight-bit (one-byte) data like the data shown in FIG. 30B. The maximum value that can be expressed by one-byte information is about 128, which is half of 255. If the length information is equal to or less than 128, encoding can be done with a set of length information and a succeeding image area flag data group. If the length information exceeds 128, encoding is done by dividing the information into a plurality of sets of length information+ image area flag data group.

The compressed data shown in FIG. 30C will be described in detail below. The first length information "−4" is a negative value, and hence represents the number of consecutive data, as descried above, and indicates that four image area flag data "1"s continue immediately after the length information.

The next data "4" is also length information. This information is a positive value, and hence indicates that four non-consecutive data continue. That is, the four data "2, 3, 2, 3" following the above value "4" are non-consecutive data. Referring to FIG. 30C, only the pieces of positive length information are underlined to allow easy discrimination between length information and image area flag data.

The data "−5" following the above non-consecutive data is the length information of consecutive data and indicates that five image area flag data "2"s continue immediately after the length information. The next underlined data "3" is the length information of non-consecutive data, and indicates that the three succeeding data "1, 0, 1" are image area flag data. The next data "−6, 0" indicate that six data "0"s continue.

What becomes of the compressed data when it is re-encoded by a lossless code re-encoding unit 2815 will be described below with reference to FIGS. 30D and 30E. A case wherein all chromatic/achromatic flags are fixed to "1" to make all the components become chromatic in re-encoding processing will be described below.

The encoded image area data is temporarily decoded and restored to the data shown in FIG. 30B. The data is then subjected to above flag data replacement to be converted into the data shown in FIG. 30D. When this data is encoded again by PackBits, the encoded data shown in FIG. 30E is obtained. As is obvious, the 15-byte encoded data before re-encoding is reduced to six-byte data after re-encoding.

Assume that the count value of the total amount of code of image data and image area data exceeds the target value of the total amount of code of image data and image area data set in the register in the image•image area encoding control unit 2819 again in spite of the execution of the above re-encoding processing. In this case, if the above re-encoding processing is completed, new re-encoding processing is immediately started. If the above re-encoding processing is not completed, new re-encoding processing is started immediately after the completion of the re-encoding processing.

In the new re-encoding processing, the remaining image area flag bit is replaced with "1". With this operation, the value of all image area flag data (eight bits) is set to "3". Letting N be the number of bytes of data, the data amount after encoding becomes (2N/128)+2 bytes.

This is because every time the number of consecutive data exceeds 128, the number of sets of two-byte encoded data (length information and consecutive data) increases.

Since the PackBits encoding circuit, decoding circuit, and data conversion circuit are known techniques, a description of each circuit arrangement will be omitted.

In the above description, for the sake of simplicity, the number of significant bits of the image area information for each pixel is two. As described above, however, there are some other types of information as image area flags. In the above re-encoding processing, two-bit image area flag data allows re-encoding processing twice at maximum, and four-bit image area flag data allows re-encoding processing four times at maximum. As the number of bits constituting image area flag data increases, the number of times of re-encoding processing can be increased. This makes it possible to control the amount of code in multiple steps.

As described above, lossless encoding processing for image area flag data is controlled independently of image data compression-encoding processing. In each processing, data is compressed within a target amount of code.

The two types of encoded data are multiplexed when they are output to an externally connected network device, an image output apparatus, a large-capacity storage unit, or the like. In consideration of the multiplexing, the units in which the two types of data are encoded are set to the same size, and encoded data generated by encoding one unit of data is managed/stored as one packet or file. For example, image data and image area data are concatenated in the order named to form one packet and output it outside.

Figure 31:
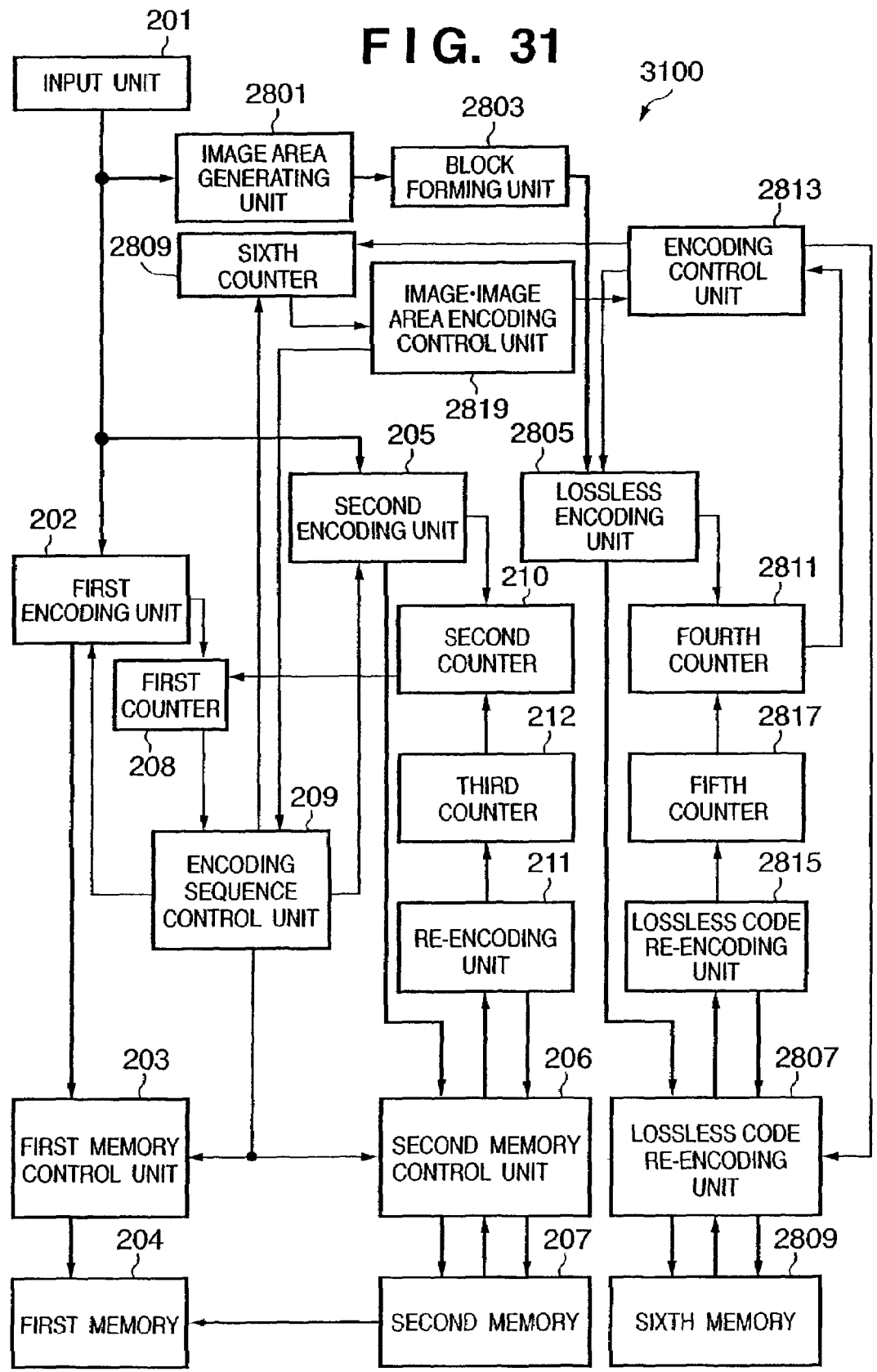
FIG. 31 is a block diagram showing another arrangement of the fifth embodiment.

Since the two encoding processes are controlled independently, the compression-encoding processing unit for image data may have another arrangement. Even if, therefore, the units 2801 to 2819 for losslessly encoding image area information data are added to the arrangement shown in FIG. 2, processing can be done in the same manner as described above. FIG. 31 shows this arrangement. The operations of the units 2801 to 2819 are the same as those in FIG. 28, and the operation of the image data compressing portion is the same as that in FIG. 2.

<Sixth Embodiment>

The sixth embodiment will exemplify a processing method which can increase the number of times of re-encoding processing and allows fine amount of code control even if the number of bits constituting image area information is the same as that in the first embodiment. The arrangement of this embodiment is the same as that of the first embodiment except for the method of compressing image area flag data in a lossless encoding unit 2805 and lossless code re-encoding unit 2815.

In the first embodiment, image area information is replaced with fixed values bit by bit, i.e., data is degenerated bit by bit. In this embodiment, the number of states is degenerated. For example, a two-bit image area flag can express four states. The number of states is degenerated to three by first re-encoding processing, and degenerated to two by the second re-encoding processing, thereby reducing the information entropy before encoding and reducing the data amount (amount of code) after encoding little by little.

If the fifth embodiment is expressed by using the words "the number of states", it can be said that the number of states is reduced to half every time image area flag data is encoded.

According to the fifth embodiment, in the first re-encoding processing, the number of states is reduced to half. In contrast to this, in the sixth embodiment, the number of states is reduced one by one. It is therefore natural that the amount of code can be reduced little by little.

FIGS. 32B, 32C, 32D, and 32E show the processing result obtained in the this embodiment, which will be described below.

The data shown in FIG. 32A is the same as the image area flag data shown in FIG. 30B, and hence includes all four two-bit states. The four states are enumerated again as follows:

(1) chromatic character•line drawing portion (corresponding to data "3")

(2) achromatic character•line drawing portion (corresponding to data "2")

(3) chromatic non-character•line drawing portion (halftone portion) (corresponding to data "1"; also called chromatic image portion)

(4) achromatic non-character•line drawing portion (halftone portion) (corresponding to data "0"; also called achromatic image portion)

In this embodiment, in the first re-encoding processing, of the four states, two states, i.e., (3) chromatic halftone portion and (4) achromatic halftone portion, are degenerated to one state, i.e., (3') non-character portion.

With this operation, the following three states are set.

(1) chromatic character portion (2) achromatic character portion (3') non-character portion More specifically, the above states are degenerated by replacing data "0" with "1". After the state degeneracy, the data is changed to the data shown in FIG. 32B. When this data is encoded by PackBits, the encoded data shown in FIG. 32C is obtained. As is obvious, the amount of code is slightly smaller than that of the encoded data in FIG. 30C before re-encoding.

In the second re-encoding processing, the two states, i.e., (1) chromatic character portion and (2) achromatic character portion, are degenerated to one state, i.e., (1') character portion. With this operation, the following two states are set.

(1') character portion (3') non-character portion

The above states are then degenerated by replacing data "2" with "3". After the state degeneracy, the data is changed to the data shown in FIG. 32D. This data is the same as the data shown in FIG. 30D. Obviously, the encoded data shown in FIG. 32E obtained by encoding this data by PackBits is the same as the encoded data shown in FIG. 30E.

In the fifth embodiment, 15-byte data before re-encoding is reduced to six-byte data by one re-encoding operation. In the sixth embodiment, this data is reduced to 11-byte data by the first re-encoding operation, and is reduced to six-byte data by the second re-encoding operation. As a consequence, in the sixth embodiment, an amount of code can be reduced little by little unlike in the fifth embodiment, and hence the compressed data of an image area flag which is close to a target amount of code can be obtained.

<Seventh Embodiment>

In the fifth embodiment, the encoding control unit 2813 and encoding sequence control unit 108 respectively send the count values of the fourth counter 2811 and first counter 107 to the sixth counter 2809, and the sixth counter 2809 adds the count value associated with image data encoding and the count value associated with image area data encoding, and sends the resultant value to the image•image area encoding control unit 2819. It is then checked whether the total count value of the amount of codes of image data and image area data has exceeded the total target value of image data and image area data held in the register in the image•image area encoding control unit 2819. If the total count value has exceeded the target value, control signals are output to the encoding control unit 1713 and encoding sequence control unit 108 to perform re-encoding processing.

The seventh embodiment will exemplify a case wherein re-encoding processing for image data and re-encoding processing for image area data are independently performed by referring to the count values of a fourth counter 2811, first counter 107, and sixth counter 2809.

The total target value (target amount of code) of image data and image area information is held in the register in an image•image area encoding control unit 2819, which receives the total count value of the amount of codes of image data and image area information from the sixth counter 2809. If this total amount of code has exceeded the target value in the register, the image•image area encoding control unit 2819 outputs control signals to an encoding control unit 2813 and encoding sequence control unit 108 to perform re-encoding processing.

That the count value has exceeded the target value in the image•image area encoding control unit 2819 means that at least one of the amount of codes of image data and image area information has exceeded a corresponding one of the target amount of codes of image data and image area information held in the registers in the encoding sequence control unit 108 and encoding control unit 2813 (including a case wherein both the amount of codes have exceeded the target amount of codes).

Upon reception of the control signals for re-encoding from the image•image area encoding control unit 2819, the encoding control unit 2813 and encoding sequence control unit 108 refer to the target values of the amount of codes of image data and image area data which are respectively held in the registers in the encoding control unit 2813 and encoding sequence control unit 108 to check whether the count values of the first counter 107 and fourth counter 2811 have exceeded the target values. If the count values have exceeded the target values, the control units output control signals for re-encoding processing described above, thereby performing re-encoding processing.

Assume that the amount of code of image area data has not exceeded the target value in the encoding control unit 2813, but the amount of code of image data has exceeded the target value in the encoding sequence control unit 108, so that the target value in the image•image area encoding control unit 2819 is exceeded. In this case, the encoding control unit 1713 does not output a re-encoding control signal for the image area data, whereas the encoding sequence control unit 108 outputs a re-encoding control signal for the image data.

With this operation, even if the total amount of code of image data and image area data has exceeded the total target value, and the execution of re-encoding processing is determined, re-encoding processing is performed for only the data which is a dominant factor that makes the total amount of code exceed the target value. This eliminates the necessity to re-encode data whose amount of code has not exceeded the target value, e.g., the image area data in the above case, thus avoiding an unnecessary deterioration in image quality.

<Eighth Embodiment>

In the fifth embodiment, the encoding control unit 2813 and encoding sequence control unit 108 respectively send the count values of the fourth counter 2811 and first counter 107 to the sixth counter 2809. The sixth counter 2809 adds the amount of codes (count values) associated with image data encoding and image area information encoding, and sends the total value to the image•image area encoding control unit 2819. It is then checked whether the total value of the amount of codes of image data and image area information has exceeded the total target value of image data and image area information held in the register in the image•image area encoding control unit 2819. If the total value has exceeded the target value, control signals are output to the encoding control unit 2813 (including the lossless code re-encoding unit 2807 as a result) and encoding sequence control unit 108 to perform re-encoding processing.

In this arrangement, an image•image area encoding control unit 2819 may alternately output control signals for re-encoding processing to an encoding control unit 2813 and encoding sequence control unit 108.

If the amount of code has exceeded the target value held in the register in the image•image area encoding control unit 2819, a request to perform re-encoding processing is output to the encoding sequence control unit 108 first to perform re-encoding. If the amount of code still exceeds the target value held in the register in the image•image area encoding control unit 2819 even after this re-encoding, a request signal for re-encoding processing is output to the encoding control unit 2813 (lossless encoding unit 2805 and lossless code re-encoding unit 2807).

Subsequently, every time it is determined that the amount of code exceeds the target value, the compression ratios for re-encoding in the respective units are alternately increased.

This makes it possible to suppress the execution of encoding at an excessively high compression ratio.

As has described above, according to the first to eighth embodiments, the image area information of a multilevel image can be encoded within a target size without re-inputting the image data.

<Ninth Embodiment>

A characteristic feature of each embodiment to be described below is that image area information is encoded as well as an image. The specific arrangement and operation (or processing) of each embodiment will be described below.

Figure 34:
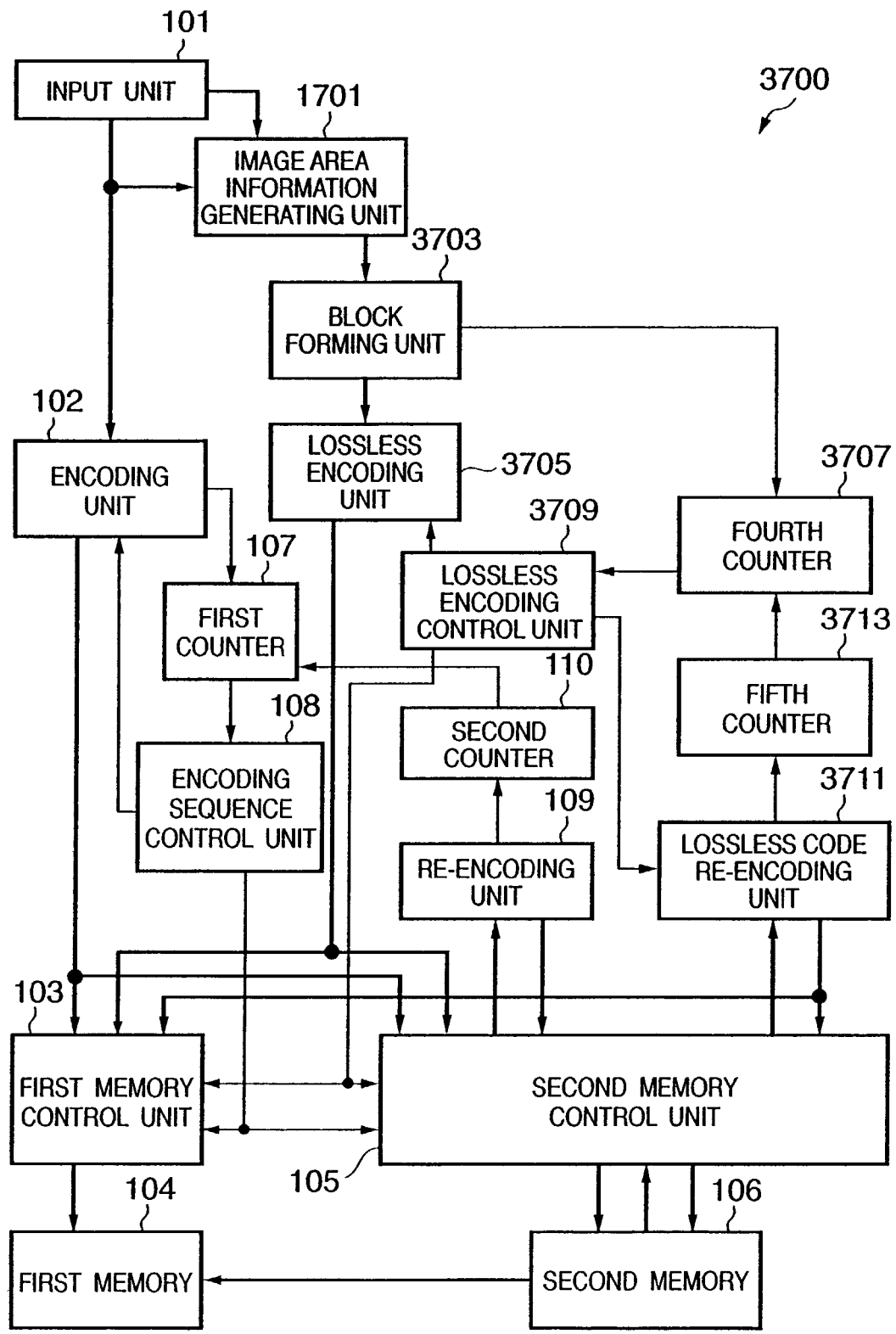
FIG. 34 is a block diagram showing an apparatus according to the ninth embodiment of the present invention.

FIG. 34 shows the ninth embodiment in which the present invention is applied to the above image processing apparatus in FIG. 1. In the embodiment shown in FIG. 34, the present invention is applied to the basic arrangement shown in FIG. 1. The same reference numerals as in FIG. 1 denote the same functional blocks in FIG. 34, and a description thereof will be omitted.

The image data input from an image scanner or page description rendering through an input unit 101 is repeatedly encoded and re-encoded on the basis of the processing method described above to obtain encoded data within a set amount of code.

Meanwhile, the image data is supplied to an image area information generating unit 3701 to generate the above image area information. This embodiment exemplifies a scanner input image, and hence image area information is generated on the basis of only image data. In a case of an image bitmapped/drawn by a page description language (PDL), however, image area information may be generated by referring to the PDL information as well. Note that image area information may be generated by an image input device such as a scanner. In this case, the image area information is also input through the input unit 101 and sent to the next unit upon passing through the image area information generating unit 3701.

As the image area information generated by the image area information generating unit 3701, information indicating whether a target pixel belongs to a character•line drawing area or halftone area and a chromatic component or achromatic component is generated. Each information can be expressed by one bit, and image area information constituting of a total of two bits (each bit constitutes image area information and hence will be referred to as image area component information) is generated for each pixel.

The operation of the image area information generating unit 3701 will be briefly described below.

Consider first determination of a target pixel belonging to a character•line drawing area or halftone area. If the target pixel belongs to a character•line drawing area, the luminance (or density) of the target pixel abruptly changes with respect to the background. If the target pixel belongs to a halftone area, a change in the luminance (or density) of the target pixel small with respect to adjacent pixels. Letting $L_i$ be the luminance of a target pixel and $L_{i-1}$, and $L_{i+1}$, be the luminances of the left and right pixels, if $$|L_i - L_{i-1}| > T \text{ or}$$

$$|L_i - L_{i+1}| > T$$

then it can be determined that the target pixel belongs to a character•line drawing area (its edge). Note that |x| in this case represents the absolute value of x.

Note that a mathematical expression for determining whether density abruptly changes or not is not limited to the above expression. For example, this determination may be made according to $$|2L_i - L_{i-1} - L_{i+1}| > T$$

This determination may be made not only in a one-dimensional direction but also in a two-dimensional direction (Note that in the case of two-dimensional determination, the image area information generating unit 3701 needs to incorporate a memory for storing image data corresponding to a plurality of lines).

Consider determination of chromatic component/achromatic component. Since input image data is read by a scanner, the data has an RGB data format.

An achromatic component is a component in which R, G, and B components have the same luminance. If, therefore, a given component satisfies the relation defined as $$R = G = B$$

then it is determined that the component is achromatic. If the component does not satisfy this relation, it is determined that the component is chromatic. In practice, however, since the precision of the CCD of the scanner must be taken into consideration, if a given component satisfies all the following inequalities:

$$B - \Delta < R < B + \Delta$$

$$R - \Delta < G < R + \Delta$$

$$G - \Delta < B < G + \Delta$$

it may be determined that the component is achromatic ($\Delta$ is an arbitrary small numeral value). Otherwise, it may be determined that the component is chromatic.

In some case, an RGB color space may be converted into luminance, hue, and saturation (e.g., an Lab display color space), and the component may be determined as an achromatic component if the saturation is equal to or less than a predetermined value, and may be determined as a chromatic component if the saturation exceeds the predetermined value.

As described above, the image area information generating unit 3701 generates and outputs, from input image data, two-bit image area information indicating whether a target pixel belongs to a character•line drawing area or halftone area and is chromatic or achromatic.

Referring back to FIG. 34, the image area information generated in the above manner is formed into a block having a data size that allows encoding at once, e.g., a size of M×N (i.e., M×N×2 bits) by the block forming unit 3703. In this case, the block size is set to 32×32. In order to increase the encoding efficiency, however, the block size may be set to, for example, 64×64 or 128×128, and need not be a square size. For this reason, the block size is expressed as M×N.

A multilevel lossy compression scheme such as JPEG used for compression of general image data is not suitable for encoding image area information. For this reason, JBIG or a run-length encoding scheme such as PackBits, which is a lossy compression scheme, is used. A lossless encoding unit 3705 losslessly codes the image area information of the corresponding block.

The encoded image area information is stored in a first memory 104 through a first memory control unit 103. In addition, this information is stored in a second memory 106 through a second memory control unit 105. That is, the encoded image area information is simultaneously stored in the two memories like encoded image data. At the same time, a fourth counter 3711 cumulatively counts (which is reset when starting to read one page) the amount of code output from the lossless encoding unit 3705, and supplies the result to a lossless encoding control unit 3709.

A target value (which can be externally changed as needed) is set in advance in the register in the lossless encoding control unit 3709. When the amount of code of the image area information has exceeded the target value, a control signal is output to the first memory control unit 103, the second memory control unit 105, the lossless encoding unit 3705, and a lossless code re-encoding unit 3711. At this time, the fourth counter 3707 is reset.

The operations which are performed by the first memory control unit 103, second memory control unit 105, lossless encoding unit 3705, and lossless code re-encoding unit 3711 upon reception of the control signal will be described below.

Upon reception of the above control signal (a signal indicating that the target value is exceeded), the first memory control unit 103 discards the encoded data (image area information) stored in the first memory 104. This data is discarded by the same method as the above method of discarding the encoded data of image data.

Upon reception of this control signal, the second memory control unit 105 reads out encoded image area information from the second memory 106 and sends the information to the lossless code re-encoding unit 3711.

Upon reception of the encoded data from the second memory control unit 105, the lossless code re-encoding unit 3711 decodes it and discards part of the image area information or replaces it with a fixed value. The lossless code re-encoding unit 3711 then losslessly encodes the resultant information again. Although a detailed description will be omitted, even if part of image area information is replaced with a fixed value, since the information entropy decreases, the data amount after run-length encoding decreases. The attribute data after re-encoding is stored in the second memory 106 again (in this stage, this data is not stored in the first memory 104). The amount of code after re-encoding is counted by a fifth counter 3713. When it is determined that the target value is exceeded, the fifth counter 3713 counts the encoded data stored in the second memory until the completion of re-encoding. When the re-encoding is completed, this count value is added to the count value of the fourth counter 3707. In addition, when this re-encoding is completed, the re-encoded data of the image area information stored in the second memory 106, which is input before it is detected that the target value is exceeded, is transferred from the second memory 106 to the first memory 104 at once.

Upon reception of the signal indicating that the target value is exceeded, the lossless encoding unit 3705 converts image area information which is input after the reception of the signal (decreases the entropy) like the lossless code re-encoding unit 3711, and encodes it.

When detecting that the target value is exceeded again after this operation, the lossless encoding control unit 3709 repeatedly generates a control signal similar to that described above. Note that the lossless encoding unit 3705 and lossless code re-encoding unit 3711 change or convert part of image area component information so as to increase the compression ratio.

The above operation will be described more plainly below.

The image area information encoded by the lossless encoding unit 3705 is stored in the first and second memories 104 and 106. Upon detecting that the amount of code of image area information exceeds the target value, the lossless encoding control unit 3709 discards the image area information which has already been encoded and stored in the first memory 104, and then converts one piece of image area information of subsequently input image area information to a fixed value, thus changing the information for efficient run-length encoding. The lossless encoding control unit 3709 then issues a control signal to the lossless encoding unit 3705 to perform encoding.

As a result, image area information input after the target value is exceeded is losslessly encoded at a higher compression ratio, and the resultant information is stored in the first memory 104. The fourth counter 3707 is reset when it is detected that the target value is exceeded, and starts counting. By adding the value of the fifth counter to be described below to the count value of the fourth counter 3707, the fourth counter 3707 will count the same information amount as that counted from the beginning of one-page original image data.

Although the image area information before the target value is exceeded is discarded from the first memory 104, the identical information is left in the second memory 106. The lossless code re-encoding unit 3711 receives and decodes the encoded image area information stored in the second memory 106, performs the same encoding as that performed by the lossless encoding unit 3705 in which the encoding method is changed, and stores the resultant information in the second memory 106. At this time, the amount of code of information re-encoded by the lossless code re-encoding unit 3711 is counted by the fifth counter 3713. When the re-encoding processing by the lossless code re-encoding unit 3711 is completed, the count value of the lossless code re-encoding unit 3711 is added to the counter value of the fourth counter. This makes the fourth counter count the same amount of code as that counted from the beginning of an original image.

When the lossless code re-encoding unit 3711 completely re-encodes the image area information encoded before it is detected that the target value is exceeded, the encoded image area information is transferred (copied) from the second memory 106 to the first memory. The encoded image area information output from the lossless encoding unit 3705 is then stored in both the first and second memories 104 and 106.

As a consequence, the image area information before the target value is exceeded is re-encoded and stored in the first memory 104, and hence the encoded data of image area information ranging from the start portion of the original image and the currently input portion is stored in the first memory 104.

Since the original image (lossy code in this embodiment) compressed by substantially the same processing as that for the image area information is also stored in the first memory 104, both the compressed image data and the compressed image area information are so stored in the first memory 104 as to have information amounts equal to or less than the target values.

In the lossless encoding unit 3705 and lossless code re-encoding unit 3711, as specific means for improving the run-length encoding efficiency (improving the compression ratio in spite of lossless compression), the following two means are prepared in this embodiment:

process P1: changing all pieces of chromatic/achromatic identification information at pixel positions where character•line drawing/halftone pixel identification bits indicate halftone pixels into pieces of information indicating chromatic components.

process P2: changing character•line drawing/halftone pixel identification bits so as to indicate halftone pixels.

Upon determining first that the amount of code exceeds the target value while encoding the image area information of a given page, the encoding control unit 3713 controls the lossless encoding unit 3705 and lossless code re-encoding unit 3711 so as to use process P1 described above. If the encoding control unit 1713 determines (second time) that the amount of code exceeds the target value even after this processing, the unit 1713 controls the lossless encoding unit 3705 and lossless code re-encoding unit 3711 so as to perform re-encoding by using process P2.

The reason why the pieces of chromatic/achromatic identification information are changed to pieces of information indicating chromatic components is that no serious problem arises because a chromatic space in a color space includes an achromatic space. The pieces of character•line drawing/halftone pixel identification information are changed to pieces of information indicating halftone areas for the same reason.

In any case, the entropy of such image area information decreases when such image area information is changed, the data amount after run-length encoding decreases stepwise.

As a consequence, both image data and image area information can be encoded within the respective target values (target sizes) while image data is continuously input from the input unit 101.

The contents of processing for image area information in the ninth embodiment will be described next. Image area information is encoded by almost the same procedure as that for image data shown in FIG. 8 except for the following processing unique to image area information.

Figure 35:
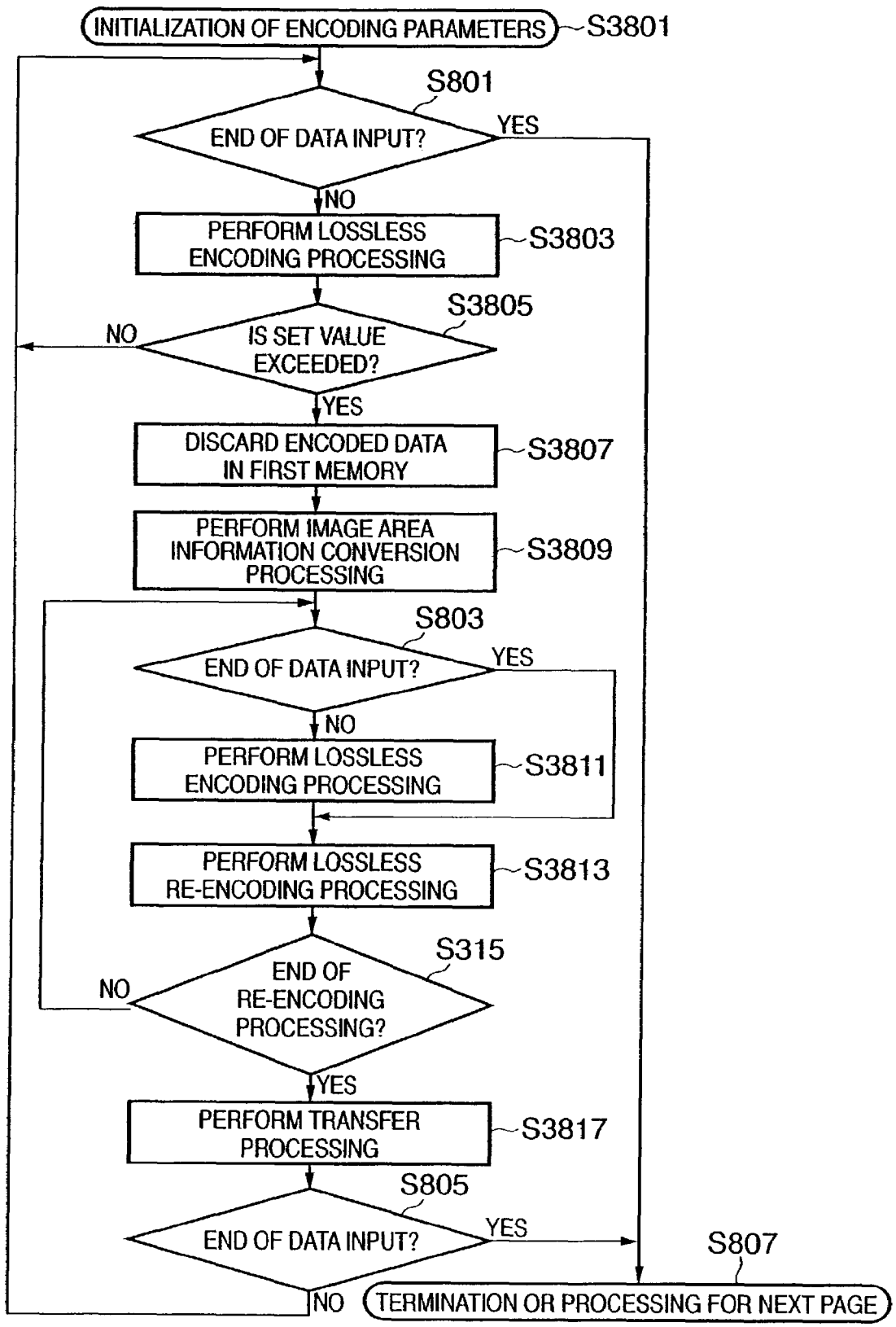
FIG. 35 is a flow chart showing a processing procedure in the ninth embodiment.

(1) encoding processing and lossless encoding processing (2) changing of quantization step and changing of image area information conversion processing (3) re-encoding processing and lossless re-encoding processing FIG. 35 shows a flow chart obtained by reflecting the differences between the processes in the flow chart of FIG. 8. The processes in steps S303, S309, S311, and S313 in FIG. 8 are replaced with the processes in steps S3803, S3809, S3811, and S3813 in FIG. 35. In initializing encoding parameters, the upper limit value of the losslessly encoded data amount determined by the image size is set in the register in the lossless encoding control unit, and the contents of the above image area information conversion processing are reset to the initial state. The subsequent description is the same as that made with reference to the flow chart of FIG. 8. That is, image area component conversion processing in the lossless encoding unit 3705 (and lossless code re-encoding unit 3711) in a case wherein the image area information exceeds the target value is to be done in step S3809.

The specific contents of processing in the ninth embodiment, in which image area information constituted by two bits per pixel is converted into eight-bit information by adding six-bit data "000000", and PackBits encoding is performed as lossless encoding, will be described with reference to FIGS. 36A to 36E.

As shown in FIG. 36A, the eight-bit data before PackBits encoding is designed such that the upper six bits are all "0"s, and flag data for identifying the corresponding pixel data as a character•line drawing or halftone region and flag data for indicating a chromatic or achromatic component are respectively stored in the upper side (bit 1) and lower side (bit 0=LSB) of the lower two bits. This eight-bit data can take a value equal to or more than 0 and equal to or less than 3.

The above eight-bit data is output from the image area information generating unit 3701 on a pixel basis. Consider the data shown in FIG. 36B as specific output data.

This data is encoded by PackBits into the data shown in FIG. 36C. In this compressed data, a negative value represents the number of consecutive data, and a positive value represents the number of non-consecutive data. Each compressed data is eight-bit (one-byte) data like the data shown in FIG. 36B. The maximum value that can be expressed by one-byte information is about 128, which is half of 255. If the length information is equal to or less than 128, encoding can be done with a set of length information and a succeeding image area flag data group. If the length information exceeds 128, encoding is done by dividing the information into a plurality of sets of length information+image area flag data group.

The compressed data shown in FIG. 36C will be described in detail below. The first length information "−4" is a negative value, and hence represents the number of consecutive data, as descried above, and indicates that four image area flag data "1"s continue immediately after the length information.

The next data "4" is also length information. This information is a positive value, and hence indicates that four non-consecutive data continue. That is, the four data "2, 3, 2, 3" following the above value "4" are non-consecutive data. Referring to FIG. 36C, only the pieces of positive length information are underlined to allow easy discrimination between length information and image area flag data.

The data "−5" following the above non-consecutive data is the length information of consecutive data and indicates that five image area flag data "2"s continue immediately after the length information. The next underlined data "3" is the length information of non-consecutive data, and indicates that the three succeeding data "1, 0, 1" are image area flag data. The next data "−6, 0" indicate that six data "0"s continue.

What becomes of the compressed data when it is re-encoded by the lossless code re-encoding unit 3715 will be described below with reference to FIGS. 36D and 36E. For the sake of simple explanation, assume that all chromatic/ achromatic flag bits are fixed to "1" to make all the components become chromatic.

The encoded image area data is temporarily decoded and restored to the data shown in FIG. 36B. The data is then subjected to above flag data replacement to be converted into the data shown in FIG. 36D. When the converted data is encoded again by PackBits, the encoded data shown in FIG. 36E is obtained. As is obvious, the 15-byte encoded data before re-encoding is reduced to six-byte data after re-encoding.

Assume that the count value of the total amount of code exceeds the target value set in the register in the encoding control unit 3713 again in spite of the execution of the above re-encoding processing. In this case, if the above re-encoding processing is completed, new re-encoding processing is immediately started.

In the new re-encoding processing, the remaining image area flag bit is replaced with "1". With this operation, the value of all image area flag data (eight bits) is set to "3". Letting N be the number of bytes of data, the data amount after encoding becomes (2N/128)+2 bytes.

This is because every time the number of consecutive data exceeds 128, the number of sets of two-byte encoded data (length information and consecutive data) increases.

Since the PackBits encoding circuit, decoding circuit, and data conversion circuit are known techniques, a description of each circuit arrangement will be omitted.

In the above description, for the sake of simplicity, the image area flag for each pixel is two-bit information. As described above, however, there are some other types of information as image area flags. In the above re-encoding processing, two-bit image area flag data allows re-encoding processing twice at maximum, and four-bit image area flag data allows re-encoding processing four times at maximum. As the number of bits constituting image area flag data increases, the number of times of re-encoding processing can be increased. This makes it possible to control the amount of code in multiple steps.

The amount of code can be controlled in more steps. For example, a two-bit image area flag can express four states. The number of states is degenerated to three by first re-encoding processing, and degenerated to two by the second re-encoding processing, thereby reducing the information entropy before encoding and reducing the data amount (amount of code) after encoding little by little.

If the above processing of replacing flag data with fixed value bit by bit is expressed by using the words "the number of states", it can be said that the number of states is reduced to half every time image area flag data is encoded.

It is therefore natural that the amount of code can be reduced more finely by decreasing the number of states one by one than by reducing the number of states to half in one re-encoding operation.

FIGS. 37B, 37c, 37D, and 37E show processing results obtained when the number of states is decreased one by one. FIG. 37A shows data in which all four two-bit states exist like the image area flag data shown in FIG. 36B. The four states are enumerated again as follows:

(1) chromatic character•line drawing portion (corresponding to data "3")

(2) achromatic character•line drawing portion (corresponding to data "2")

(3) chromatic non-character portion (corresponding to data "1"; also called chromatic image portion)

(4) achromatic non-character portion (corresponding to data "0"; also called achromatic image portion)

In the first re-encoding processing, of the four states, two states, i.e., (3) chromatic halftone portion and (4) achromatic halftone portion, are degenerated to one state, i.e., (3') non-character portion. With this operation, the following three states are set.

(1) chromatic character portion
(2) achromatic character portion
(3') non-character portion More specifically, the above states are degenerated by replacing data "0" with "1". After the state degeneracy, the data is changed to the data shown in FIG. 37B. When this data is encoded by PackBits, the encoded data shown in FIG. 37C is obtained. As is obvious, the amount of code is slightly smaller than that of the encoded data in FIG. 36C before re-encoding.

In the second re-encoding processing, the two states, i.e., (1) chromatic character portion and (2) achromatic character portion, are degenerated to one state, i.e., (1') character portion. With this operation, the following two states are set.

(1') character portion
(3') non-character portion

The above states are then degenerated by replacing data "2" with "3". After the state degeneracy, the data is changed to the data shown in FIG. 37D. This data is the same as the data shown in FIG. 36D. Obviously, the encoded data shown in FIG. 37E obtained by encoding this data by PackBits is the same as the encoded data shown in FIG. 36E.

When the number of states is decreased one by one, 15-byte data before re-encoding is reduced to 11-byte data by the first re-encoding operation, and is reduced to six-byte data by the second re-encoding operation. Since an amount of code can be changed and reduced little by little in this manner, the compressed data of an image area flag which is close to a target amount of code can be obtained.

As described above, lossless encoding processing for image area flag data is controlled independently of image data compression-encoding processing. In each processing, data is compressed within a target amount of code.

The two types of encoded data are multiplexed when they are output to an externally connected network device, an image output apparatus, a large-capacity storage unit, or the like. In consideration of the multiplexing, the units in which the two types of data are encoded are set to the same size, and encoded data generated by encoding one unit of data is managed/stored as one packet or file. In multiplexing, two types of packet data at the same image position are concatenated in the order of, for example, image data and image area data to form one packet and output outside.

<10th Embodiment>

Figure 38:
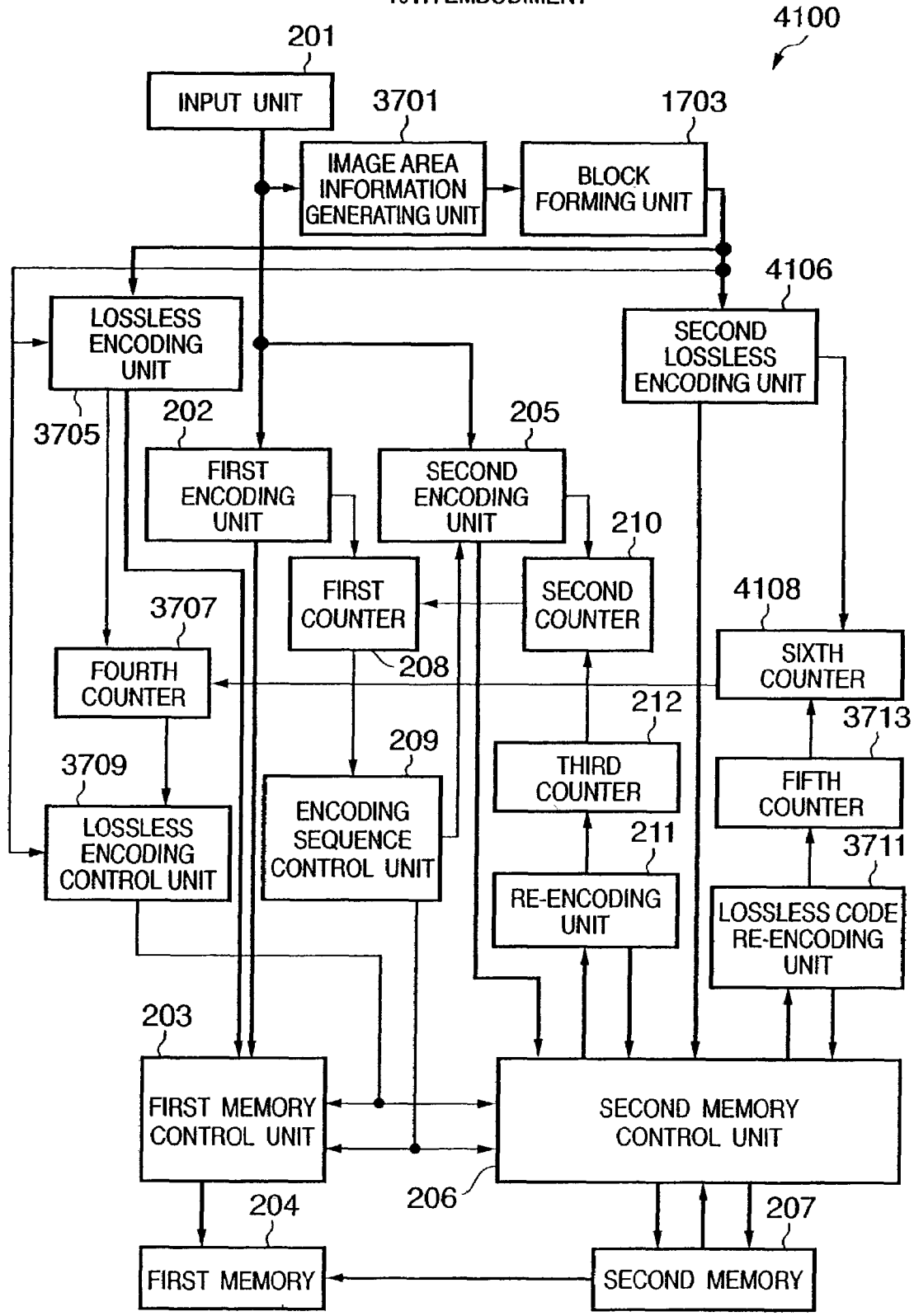
FIG. 38 is a block diagram showing losslessly encoded data after re-encoding and encoded data obtained by re-encoding after re-encoding in the 10th embodiment.

In the 10th embodiment, the present invention is applied to the arrangement shown in FIG. 2. FIG. 38 shows this arrangement. The arrangement in FIG. 38 uses the same functional blocks used in the arrangements shown in FIGS. 2 and 34. The same reference numerals as in FIGS. 2 and 34 denote the same functional blocks in FIG. 38, and a description thereof will be omitted.

In the 10th embodiment, two encoding units losslessly encode two types of image area information with different information entropies in the same manner as in compression encoding processing for image data in the arrangement shown in FIG. 2. These two encoding units are a first lossless encoding unit 3705 and a second lossless encoding unit 4106. The second lossless encoding unit 4106 additionally provided in the 10th embodiment encodes image area information with a lower entropy than that of information encoded by the first lossless encoding unit.

A sixth counter 4108 for counting the amount of code of data output from the second lossless encoding unit 4106 is the only block, other than the above unit, which is added to this embodiment.

Referring to FIG. 38, there is the following correspondence between the blocks for compression-encoding image data and the block for losslessly encoding image area information:

(1) the first and second encoding units and the first and second lossless encoding units;

(2) the first, second, third counters and the fourth, sixth, and fifth counters;

(3) the re-encoding unit and lossless code encoding unit; and (4) the encoding sequence control unit and the lossless encoding control unit.

Image data is compression-encoded by using the former blocks of the respective items described above, and image area information is losslessly encoded by using the latter blocks. Two encoding processes are controlled independently by almost the same method to compress the respective data to target amount of codes or less.

The amount of code of image data is reduced stepwise by changing the quantization step, whereas the amount of code of image area information after lossless encoding is reduced by decreasing the number of states of the flag data of image area information before lossless encoding.

In the initial state, the first lossless encoding unit 3705 encodes all image area information, whereas the second lossless encoding unit 4106 decreases the number of states of the flag data of the image area information by the image area information conversion processing described in the first embodiment, and then losslessly encodes the information.

When the amount of code of data output from the first lossless encoding unit exceeds the target value, the lossless codes stored in a first memory 104 are discarded, and the lossless codes stored in a second memory 106 are transferred to the first memory. The image area information conversion processing that has been performed by the second lossless encoding unit is inherited to the first lossless encoding, and encoded data is stored after the lossless codes transferred to the first memory.

The second lossless encoding unit performs image area information conversion processing to further decrease the number of states of the flag data, and losslessly encodes the resultant data. With this operation, the first lossless encoding unit generates lossless codes in a small amount of code, and stores them in the second memory.

The lossless codes in the second memory, which have already been encoded by the second lossless encoding unit, i.e., the lossless codes transferred to the first memory as well, are decoded by a lossless code re-encoding unit 3711, and is subjected to image area information conversion processing in the lossless code re-encoding unit so as to set the same number of states as that in image area information conversion processing performed by the second lossless encoding unit. The resultant information is losslessly encoded again and written back to the second memory. As described above, in this embodiment as well, image area information can be encoded and its amount of code can be controlled by the same method as compression encoding processing for image data.

As a flow chart for the above processing, the flow chart for compression encoding processing for image data shown in FIG. 12 can be used by changing some expressions. As in the ninth embodiment, the expressions at the following three points are changed as follows:

(1) encoding processing→lossless encoding processing;

(2) changing of quantization step→changing of image area information conversion processing; and (3) re-encoding processing→lossless code re-encoding processing.

Figure 39:
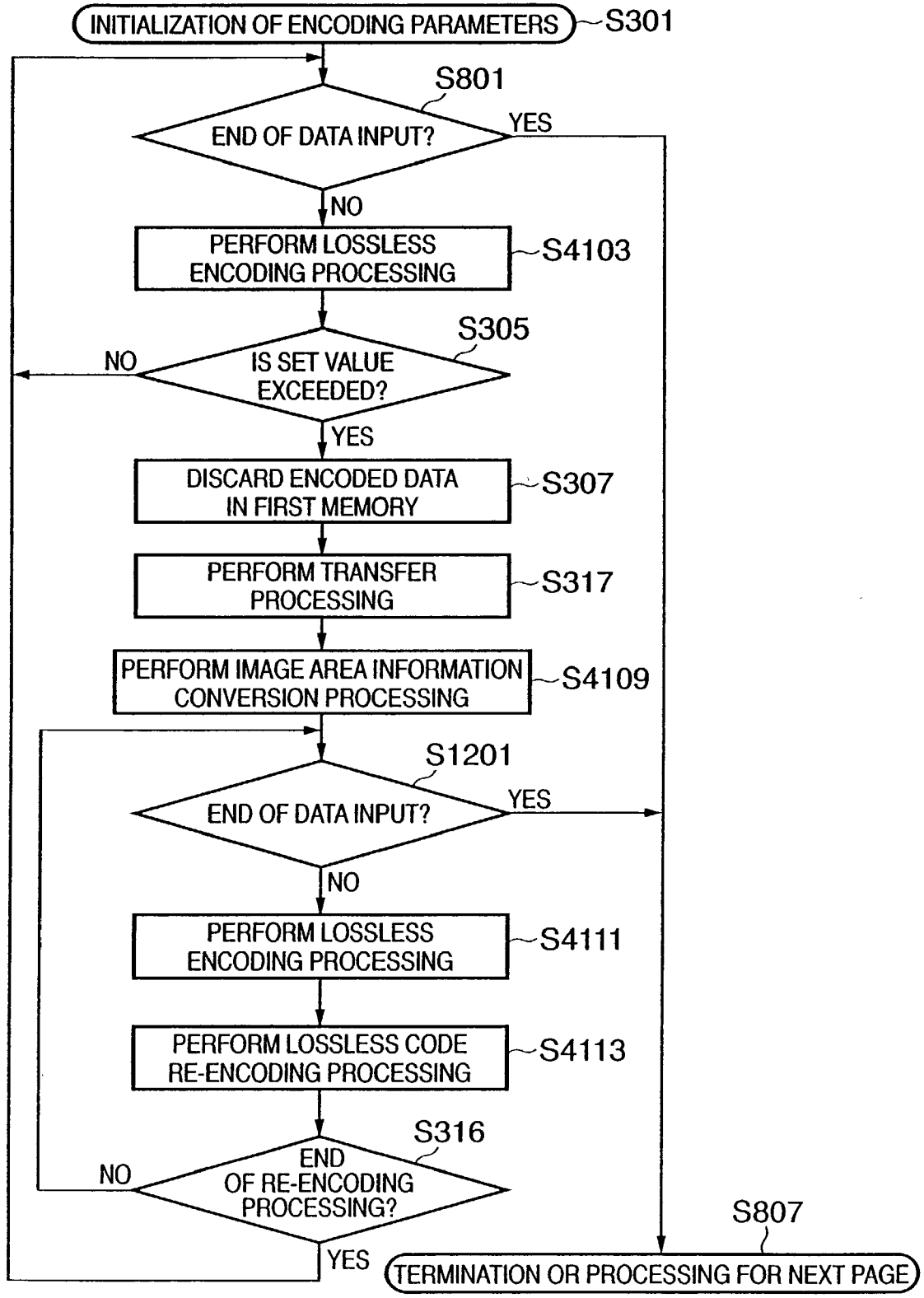
FIG. 39 is a flow chart showing a processing procedure in the 10th embodiment.

FIG. 39 shows a flow chart obtained by changing the expressions in the above three points. The contents of four processes in steps S4103, S4109, S4111, and S4113 are changed in the above manner.

Compression encoding processing for image data and encoding processing for image area information are performed concurrently and controlled independently. Therefore, the 10th embodiment shown in FIG. 38 can define the processing flow by the two flow charts of FIGS. 12 and 39.

As described above, the ninth and 10th embodiments include a decoding means for decoding losslessly encoded image area information, an image area information conversion means for partly rewriting or deleting the image area information so as to reduce the information entropy of the image area information, a re-encoding means for re-encoding the image area information which is decoded by the decoding means and converted by the image area information conversion means, a lossless encoding means having the information conversion means, and a storage means which can store the data obtained by encoding image area information accompanying at least one-page image data. One-page image area information can be made to fall within a desired encoded data amount by controlling both the image area information conversion means of the lossless encoding means and the image area information conversion means at the input stage of the re-encoding means in accordance with the amount of encoded data.

As described above, according to the ninth and 10th embodiments, multilevel image data and its image area information can be encoded within target sizes without re-inputting the multilevel image data.

<11th Embodiment>

The 11th embodiment of the present invention will be described next.

Figure 40:
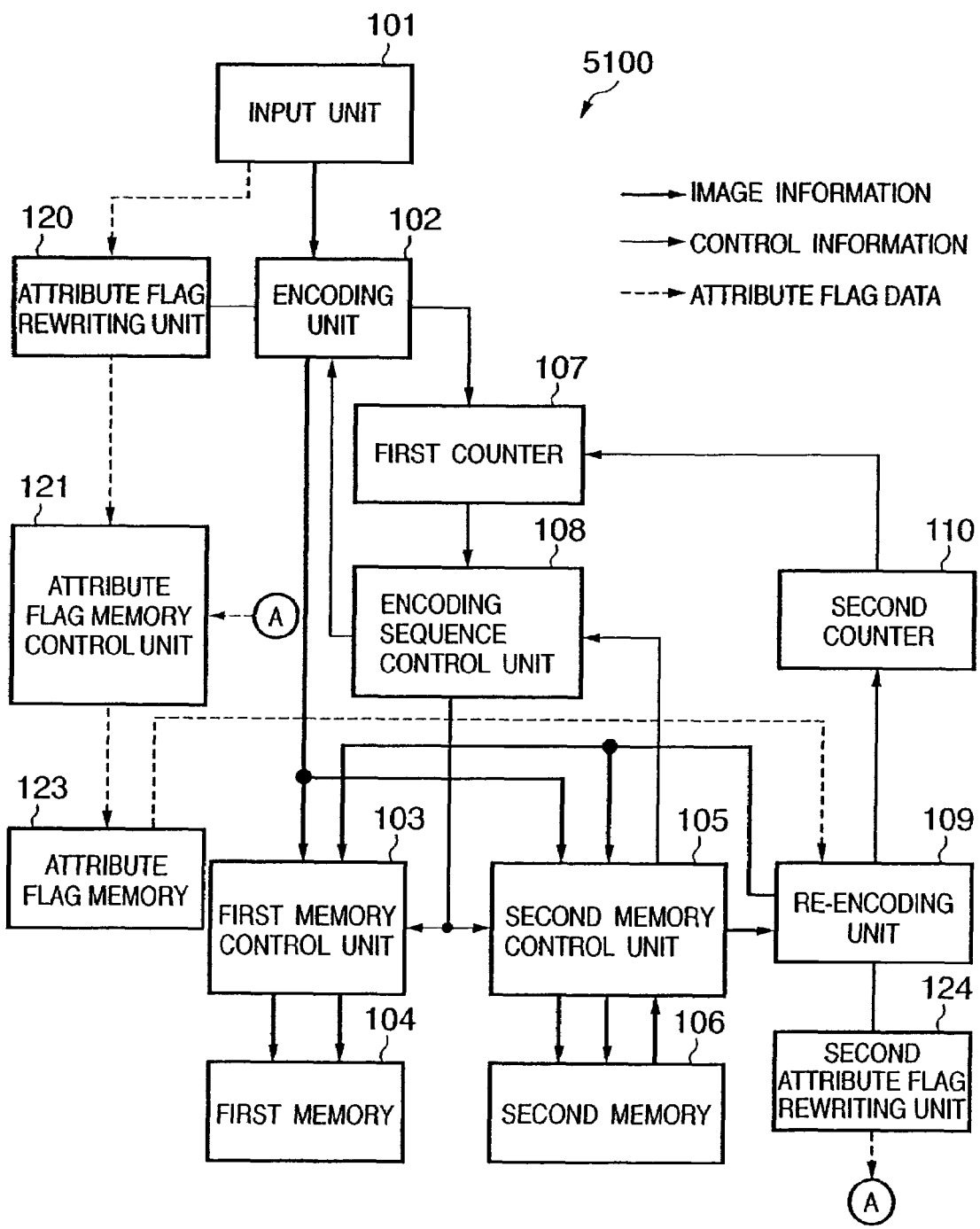
FIG. 40 is a block diagram showing an apparatus according to the 11th embodiment.

FIG. 40 is a block diagram of an image processing apparatus 5100 to which the 11th embodiment is applied. Each unit in FIG. 40 will be briefly described below. The same reference numerals as in FIG. 1 denote the same functional units in FIG. 40.

The image processing apparatus 5100 includes an input unit 101 which inputs an image from an image scanner or the like. The image scanner includes a known image area separating unit, and generates, for example, attribute flag data for identifying a given pixel as a pixel of a black character portion in an original image on a pixel basis. Consider making a determination whether a given pixel is a black pixel or not. The density of a character•line drawing changes more abruptly than that of a halftone image. Therefore, it is checked first whether a density change (the luminance or density difference between adjacent pixels) is larger than a predetermined threshold. If the change is larger than the threshold and the R, G, and B values are almost equal to each other (achromatic), it can be determined that the given pixel is a black pixel. In other words, an attribute flag is constituted by two bits indicating chromatic/achromatic pixel and character•line drawing/halftone pixel (this therefore allows to determine whether a given pixel is a color character pixel). However, the present invention is not limited to this. For example, each flag may include data indicating whether the corresponding pixel belongs to a dot area or not and whether it belongs to a vector graphics area or not. In this case, bits may be assigned to the respective attributes.

In the above case, the input unit 101 inputs image data from the image scanner, and the image scanner incorporates the image area separating unit. If, however, the image scanner does not have this unit, the above determination processing may be done on the apparatus side. In addition, the input unit 101 may input image data from page description language rendering or the like or loads an image file stored in a storage medium instead of the image scanner. In some case, the input unit may receive image data from a network. When page description language data is to be received from a host computer and rendering is to be performed, in particular, since the specific attributes of each pixel are indicated by the page description language, the above determination can be easily made. In addition, if no image area separation unit is incorporated in the image scanner, a processing unit for determining the above attributes may be provided on the apparatus side.

In any case, the image input from the input unit 101 is supplied to an encoding unit 102, and the attribute data is supplied to an attribute flag rewriting unit 120. In this embodiment, in performing encoding processing, the encoding unit 102 performs orthogonal transform (DCT) of image data on an 8×8 pixel basis, quantization using a quantization step to be described later, and Huffman encoding, and outputs the resultant data.

First and second memory control units 103 and 105 perform control to store the compression-encoded data output from the encoding unit 102 in first and second memories 104 and 106. In this case, the first memory 104 is a memory for holding encoded data which is finally confirmed (completely compressed to a data amount within a target value) so as to output it to a network device, image output apparatus, large-capacity storage unit, or the like externally connected to the basic arrangement shown in FIG. 40. The second memory 106 is a work memory for assisting compression-encoding processing to form the encoded data in the first memory.

A counter 107 counts the data amount of image data compression-encoded by the encoding unit 102 and holds the count value. The counter 107 also outputs the count result to an encoding sequence control unit 108 for controlling an encoding sequence.

The encoding sequence control unit 108 detects whether the count value of the counter 107 has reached a given set value. Upon detecting that the count value has reached the set value (or has exceeded a target value), the encoding sequence control unit 108 outputs a control signal to the first memory control unit 103 to discard the data has already been stored in the first memory 104. The first memory control unit 103 discards the stored data by clearing the memory address counter or the encoded data management table for image data on the basis of this control signal. At this time, the encoding sequence control unit 108 clears the counter 107 to zero (data is kept input from the input unit 101) and controls the encoding unit 102 to perform encoding at a higher compression ratio. That is, the encoding sequence control unit 108 performs control to reduce the data amount of encoded data generated in encoding processing by this apparatus to, for example, 1/2. Obviously, although the data amount is reduced to 1/2 in this case, the compression ratio can be set to an arbitrary value.

The encoded data after a change in compression ratio is stored in the first and second memories 104 and 106 through the first and second memory control units 103 and 105 as in the above case.

The encoding sequence control unit 108 outputs a control signal to the second memory control unit 105 to read out the encoded data that has been stored in the second memory 106 so far and output the encoded data to a re-encoding unit 109 as encoded data conversion means.

The re-encoding unit 109 decodes the input encoded data and re-quantizes the data to reduce its data amount. The re-encoding unit 109 then performs encoding processing again to generate data in a data amount corresponding to the same compression ratio as that of data generated by the encoding unit 102 whose compression ratio is changed. This amount of code of data generated is counted by a second counter 110.

The encoded data output from this re-encoding unit 109 is stored in the first and second memories 104 and 106 through the first and second memory control units 103 and 105.

The second memory control unit detects whether re-encoding processing is completed. More specifically, if all data are read out for re-encoding processing, the encoding sequence control unit 108 is notified of the end of re-encoding processing. In practice, the encoding processing is completed when the processing by the re-encoding unit 109 is terminated as well as the read processing by the second memory control unit 105.

The count value obtained by the second counter 110 is added to the counter value held in the first counter 107. This sum represents the total data amount in the first memory 104 immediately after the completion of re-encoding processing. That is, when encoding processing for one frame by the encoding unit 102 and re-encoding unit 109 is completed, the counter value held in the first counter 107 after the above addition represents the total amount of data generated when one-frame data is encoded by this apparatus (to be described in detail later).

The encoding unit 102 continues encoding processing as long as image data (one-page image data) to be encoded which is input from the input unit 101 is left regardless of whether the re-encoding processing is completed or not.

Whether the count value of the counter 107 has reached the set value is kept checked until encoding processing (encoding and re-encoding) for one-page image data input from the input unit 101 is completed. The above encoding processing and re-encoding processing are executed under the control corresponding to the detection result obtained in this case.

The attribute flag rewriting unit 120, an attribute flag memory control unit 121, and an attribute flag memory 123 will be described next.

The attribute flag rewriting unit 120 rewrites data on the basis of the data orthogonally transformed by the encoding unit 102 (without the changing character•line drawing/halftone flag).

In this embodiment, an orthogonal transform, quantization, and encoding are performed on an 8×8 pixel basis, and hence a representative attribute is determined for a pixel block constituted by 8×8 pixels. This determination is made on the basis of the data obtained by the orthogonal transform performed by the encoding unit 102.

In general, in JPEG encoding processing, data is converted into luminance and color difference signals (YCbCr) by a known color conversion scheme, and the luminance and color difference signals are subjected to spatial frequency conversion by a discrete cosine transform. The DCT coefficients are then quantized by using a quantization matrix to reduce the data amount, and the resultant data is encoded.

In this case, according to the embodiment, the attribute data is rewritten by using the quantized DCT coefficients. In this rewriting operation, if, for example, all the DCT values of the color difference (Cb, Cr) components are 0, there is no color component. This indicates an achromatic component. The bit indicating achromatic/chromatic component of the attribute flag is then set to indicate an achromatic bit. Alternatively, a threshold may be set. If all color components are 0 or the number of significant coefficients is 10 or less, the bit may be set to indicate an achromatic component.

The rewritten attribute flag (the representative attribute data of the 8×8 pixel block) is compressed (run-length encoded), and the resultant data is stored in the attribute flag memory 123 through the attribute flag memory control unit 121.

Figure 42:
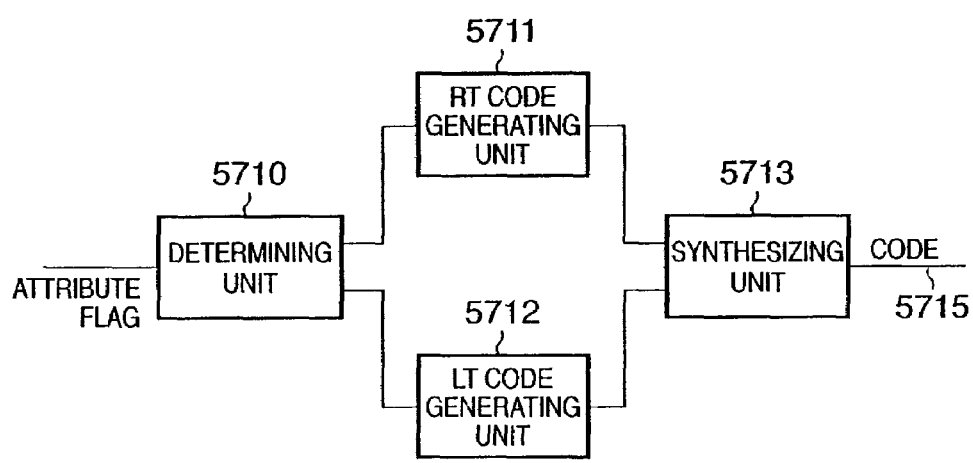
FIG. 42 is a block diagram showing the arrangement of a processing unit for encoding attribute data in the 11th embodiment.

FIG. 42 shows the arrangement of a compression-encoding unit in the attribute flag rewriting unit 120.

Referring to FIG. 42, a determining unit 5710 determines whether the previous value of input attribute flag data is equal to the current value. If they equal to each other, the determining unit 5710 switches to send the data to an RT code generating unit 5711. If they differ from each other, the determining unit 5710 switches to send the data to the LT code generating unit 5712. The RT code generating unit 5711 counts the number of times the same data as the previous data is output until different data is output, and lastly outputs the repeated data. The LT code generating unit 5712 counts the number of times input data differs from the previous pixel, and outputs a code word corresponding to the count and the minimum number of bits constituting the actual data by the count. A synthesizing unit 5713 synthesizes the output data from the RT and LT code generating units and outputs the resultant data as a code 5715 (which is finally stored in the attribute flag memory 123). Note that this arrangement is an example, and the above operation may be implemented by another arrangement.

Compression encoding processing associated with image processing in the arrangement shown in FIG. 40 will be described next. FIG. 8 is a flow chart showing processing in the arrangement shown in FIG. 1. For the sake of simplicity, this processing will be described first with reference to the simplified flow chart of FIG. 3. Although FIG. 3 has already been described, the same description will be made again to facilitate understanding of the 11th embodiment.

As has been described above, the image processing apparatus 5100 of the present invention is an apparatus for compression-encoding one-page image data input from the input unit 101 such as a scanner to a predetermined data amount or less. In order to realize this encoding processing, the apparatus has the encoding unit 102, re-encoding unit 109, first memory 104, second memory 106, and the like in addition to the input unit 101. The apparatus performs encoding processing by using these functional blocks on the basis of the flow chart shown in FIG. 3.

The flow chart of FIG. 3 is roughly divided into the following three processing phases:
 (1) encoding phase,
 (2) encoding/re-encoding phase, and
 (3) transfer phase.

FIGS. 4 to 7 are views that make it easy to visually understand how image data, encoded data, and the like flow, are processed, and stored in memories in the respective processing phases described above.

FIG. 4 shows the initial state of the encoding phase corresponding to steps S303 and S305 in the flow chart of FIG. 3 (however, a description of the encoded data of attribute data is omitted). FIG. 5 shows the processed state of the encoding/re-encoding phase corresponding to steps S307 to S315. FIG. 6 shows the processed state of the transfer phase corresponding to step S317. FIG. 7 shows the processed state of the encoding phase after the transfer phase. Each phase will be described below.

<<Encoding Phase>>

Encoding processing for one-page image data starts from initialization of encoding parameters (step S301). In this step, parameters such as the upper limit of the encoded data amount uniquely determined from an image size for encoding processing (the size of a sheet read by the input unit 101 such as a scanner) and a quantization step (Q1) applied to the encoding unit 102 (assume that a known JPEG encoding scheme is used in this case) are set.

In step S303, the encoding unit 102 orthogonally transforms a target pixel block (=8×8 pixels) in accordance with this quantization step Q1. The resultant data is output to the attribute flag rewriting unit 120. This data is quantized in accordance with the set quantization step (Q1) and encoded. The amount of code of this data is cumulatively counted by the first counter 107 for one page.

In step S305, it is checked whether the count value of the generated data amount has exceeded a predetermined upper limit. If NO in step S305, the JPEG encoding processing in step S303 is continued. This is an encoding phase in the initial state.

The encoded data output from the encoding unit 102 are stored in both the first and second memories 104 and 106, as shown in FIG. 4. The areas indicated by the vertical stripes represent the stored codes.

<<Encoding/Re-encoding Phase>>

As the encoding processing by the encoding unit 102 proceeds and the count value of the data amount exceeds the set upper limit, the encoded data in the first memory 104 is discarded in step S307. In addition, in step S309, the quantization step in the encoding unit 102 is changed to Q2.

That the count value of the data amount of encoded data exceeds the set upper limit means that the data amount after compression exceeds a target value. For this reason, the quantization step Q1 is changed to the quantization step Q2 which is larger in quantization step width than Q1.

After the quantization step is changed, the encoding processing by the encoding unit 102 is resumed in step S311, and the encoded data is stored in only the second memory 106, as shown in FIG. 5. Along with this processing, the re-encoding processing in step S313 is performed. In the re-encoding processing, the encoded data (including both the encoded data of the image and attribute encoded data) stored in the second memory 106 is read out and re-encoded by the re-encoding unit 109. The re-encoded data is then stored in the two memories 104 and 106. The encoding processing and re-encoding processing are continued until all the codes represented by vertical stripes I are re-encoded. Note that the re-encoding unit 109 re-encodes the data by using the same quantization step as the new quantization step set for the encoding unit 102 in accordance with the attribute data obtained by decoding.

More specifically, in this re-encoding processing, the respective quantized values obtained by temporarily Huffman-decoding encoded data are subjected to bit shift processing that can obtain the same result as that obtained by dividing these quantized values by $2^n$, and then, the resultant data is Huffman-encoded again. This method allows high-speed re-encoding processing because it changes the quantization step by only bit shift processing and does not perform inverse orthogonal transform and re-orthogonal transform processing. In step S315, the end of re-encoding processing is detected.

Since the data amount after re-encoding becomes smaller than that of encoded data before re-encoding, the encoded data after re-encoding can be overwritten/stored in the memory area in which the encoded data before re-encoding has been stored, as shown in FIG. 5. When the re-encoding processing is terminated, the data amount of encoded data represented by the vertical stripes I is reduced to that of encoded data represented by oblique stripes I in FIG. 6.

As described above, when encoding data, the re-encoding unit 109 decodes the data to quantized data. That is, the re-encoding unit 109 need not decode the data to image data. This makes it possible to increase the processing speed. In encoding the data, the re-encoding unit 109 quantizes the data upon increasing the quantization step by one step (bit shift is effective for the simplification of the processing, as described above). In this case, data which has not been 0 may become 0 when the quantization step is increased. That is, a pixel block area that has been determined as a chromatic area may be handled as an achromatic area. This makes it necessary to rewrite the attribute flag data. A second attribute flag rewriting unit 124 rewrites the attribute data on the basis of the newly quantized data and overwrites the data in the attribute flag memory 123 with the rewritten data through the attribute flag memory control unit 121.

Steps S307 to S315 described above are performed in the encoding/re-encoding phase.

<<Transfer Phase>>

When the re-encoding processing is completed, transfer processing is performed in step S317. In this transfer processing, as shown in FIG. 6, the encoded data which is represented by oblique stripes II and stored only in the second memory 106 in the encoding/re-encoding phase is transferred to an address linked to the encoded data represented by the oblique stripes I and stored in the first memory 104, and stored at the address. On the other hand, the encoded data represented by the oblique stripes II is transferred within the second memory 106 to the encoded data represented by the oblique stripes I such that the encoded data represented by the oblique stripes I and II which are distributed in the second memory 106 are consecutively stored in the first memory 104. This processing is done in the transfer phase.

When the above transfer phase is completed, the flow returns to the encoding phase in steps S303 and S305 to output the codes represented by oblique stripes IV from the encoding unit 102 and store them in the two memories 104 and 106, as shown in FIG. 7. This encoding phase slightly differs from the encoding phase in the initial state (FIG. 4) in that the quantization step is changed from Q1 to Q2 in encoding by the encoding unit 102, and the encoded data stored in the two memories 104 and 106 are a set of codes processed in various phases. If these differences are neglected, the encoding phase immediately after the transfer phase can be regarded as the same as the encoding phase in the initial state.

By repeating the three phases, namely the encoding phase, encoding/re-encoding phase, and transfer phase, the codes obtained by compressing one-page image data to a set data amount or less can be stored in the first memory. In addition, the input unit 101 only continues input operation until a series of operations is completed. That is, there is no need to input image data again from the beginning.

The flow chart of FIG. 3 describes only processing corresponding to the respective phases shown in FIGS. 4, 5, and 6 for the sake of easy understanding. In practice, however, input operation for one-page image data ends in one of the phases. The subsequent operation therefore slightly differs depending on the phase in which the input operation is terminated. The flow chart of FIG. 8 shows the flow of processing in consideration of this. The flow chart of FIG. 8 describes processing in consideration of the relationship between the completion of inputting of one-page image data and the respective types of processing described with reference to FIG. 3. In this case, steps S801, S803, S805, and S807 are added to the flow chart of FIG. 3.

In steps S801, S803, and S805, the end of inputting of one-page image data from the input unit 101 is detected in the encoding phase, encoding/re-encoding phase, and transfer phase, respectively.

If it is detected that inputting of one-page image data is completed in the encoding phase and transfer phase (steps S801 and S805), the flow advances to step S807 to terminate the compression-encoding processing for the page and start compression-encoding processing for the next one-page image data if image data corresponding to one or more pages are left to be processed. If there is no such data, the apparatus enters a halt condition.

If the end of inputting of one-page image data is detected in the encoding/re-encoding phase (step S803), since the encoding unit 102 must temporarily stop operation until no image data to be re-encoded is left, encoding processing in step S311 is skipped, and only re-encoding processing is continued in step S313 to suppress the image data encoded by the encoding unit 102 to a predetermined encoded data amount. Since encoded data of entire one-page image data cannot be acquired in the first memory unless all the re-encoding processing and subsequent transfer processing are completed, re-encoding processing and subsequent transfer processing must be continued even after the end of inputting of one-page image data. In this case, if it is detected in step S315 that all the re-encoding processing is completed, the encoded data stored in only the second memory 106 is transferred to the first memory during the encoding/re-encoding phase (step S317). Thereafter, the end of inputting of one-page image data is detected in step S805, and the flow advances to step S807.

The above operation is described in the flow chart of FIG. 8.

<Modification to Method of Storing Data in Memories>

FIGS. 9 and 10 are views showing a modification to the method of storing data in the memories indicated by the conceptual views of FIGS. 5 and 6.

In the conceptual view of FIG. 5, in the encoding/re-encoding phase, the encoded data output from the encoding unit 102 is stored in only the second memory 106. As shown in FIG. 9, however, in the encoding/re-encoding phase, the encoded data output from the encoding unit 102 is directly stored in both the first and second memories.

When viewed from the encoding unit 102, encoded data is stored in the two memories regardless of the phase in which the data is encoded and output. Unlike the conceptual view of FIG. 6, as shown in FIG. 10, there is no need to perform data transfer between memories in the transfer phase. In addition, in this modification, in the encoding/re-encoding phase, encoded data and re-encoded data are sequentially stored in the first memory 104 in the order in which they are sent. For this reason, two types of data are mixed together.

In this modification, therefore, in order to solve this problem, encoded data is delimited in given units, and the resultant data are managed as files or packets. More specifically, a file management table, packet management table, or the like is separately generated to manage files or packets.

According to one technique, in storing data from the encoding unit 102 into the first memory 104, management numbers are assigned to the image data from the beginning in proper unit (e.g., every (8×i) (where i is an integer, e.g., 1, 2, . . . )-line data because the unit of orthogonal transform is 8×8 blocks), and a management table is generated, in which the storage start addresses corresponding to the respective management numbers and the corresponding encoded data amounts can be stored in the management number order.

The encoding unit 102 and re-encoding unit 109 hold the management numbers of data under processing and write the start address and encoded data amount of encoded data in the management table on the basis of the management numbers when storing the encoded data. With this operation, even if the encoded data processed by the encoding unit 102 and re-encoding unit 109 are randomly stored, the encoded data can be sequentially read out from the first memory 104 from the beginning of the image by accessing the management table in the order of management numbers and reading out the data on the basis of the start address and encoded data amount read out at the time of the access. With such a management mechanism, there is no need to consecutively store consecutive data of an image in a memory.

The encoding phase after the transfer phase in the conceptual view of FIG. 10 is almost the same as the two encoding phases (FIGS. 4 and 7) described so far except that the stored state of codes in the first memory slightly differs from that in the encoding phases described above, as shown in FIG. 11. Therefore, the technique described above is the same as this modification in terms of repetitive processing of the three phases.

As a result, according to the 11th embodiment, when a given original is read and it is determined, during encoding, that the amount of code of encoded data has reached a target value, subsequent data is compression-encoded at a higher compression ratio in accordance with the newly set quantization step. When it is determined that the amount of code has reached the target value, the data that has already been compression-encoded is temporarily decoded, and the resultant data is re-encoded in accordance with the newly set quantization step. Even if, therefore, the amount of encoded data generated exceeds the target value during original reading, the amount of code can be suppressed within the target value while the original reading is continued. In addition, since the attribute flag data is updated following the encoding/re-encoding of the image data, useful information can be provided for postprocessing (e.g., image processing or editing).

<12th Embodiment>

Figure 41:
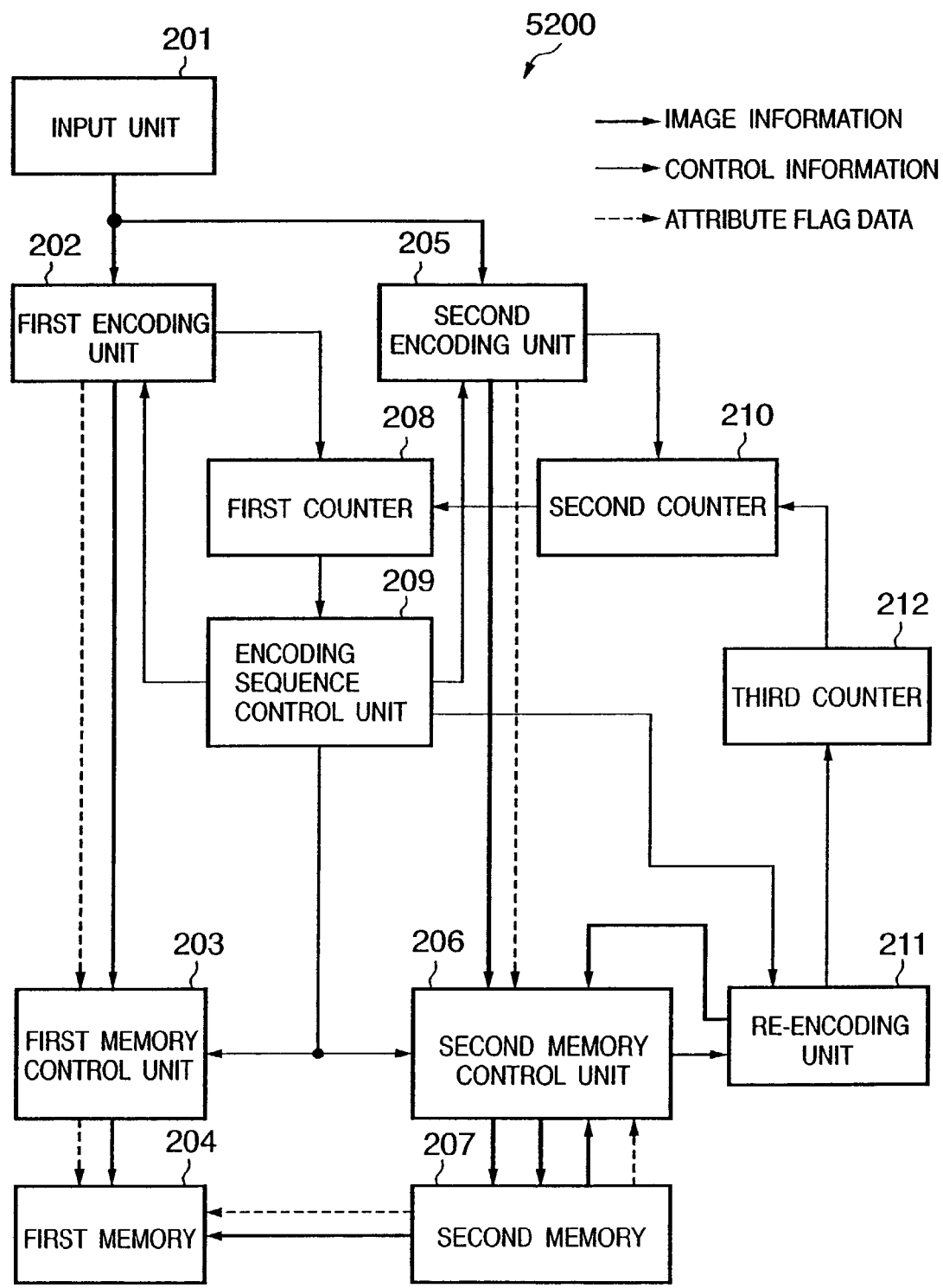
FIG. 41 is a block diagram showing an apparatus according to the 12th embodiment.

The 12th embodiment of the present invention will be described below. FIG. 41 shows the basic arrangement of an image processing apparatus 5200. This arrangement is almost the same as that shown in FIG. 2.

This apparatus greatly differs from the image processing apparatus 5100 in FIG. 40 in that two encoding units for encoding data for the first time exist in parallel. In addition, in the arrangement shown in FIG. 40, the attribute flag rewriting unit 120, attribute flag memory control unit 121, attribute flag memory 123, and attribute flag rewriting unit 124 exist, and attribute data is stored in the memory independent of the memory for image data. In contrast to this, in the 12th embodiment, attribute flag rewriting and encoding processing are performed within encoding units 202 and 205 and a re-encoding unit 211, and the encoded attribute flag data is stored in the same memory as that for encoded image data. In the embodiment, the amount of code of attribute data is assigned representative attribute data about 8×8 pixels (64 pixels), and hence the information amount is basically small. From the viewpoint of overall data, image data is dominant in terms of the amount of data generated. Therefore, first and second counters 208 and 210 are designed to count the amount of code of image data. Obviously, since attribute data is rewritten and the compression ratio varies, the amount of code may be counted, including that of attribute data.

In the image processing apparatus 5200, the first and second encoding units 202 and 205 concurrently encode the image data input from an input unit 201 to generate two types of encoded data with different compression ratios. In this case as well, a known JPEG encoding scheme is used to orthogonally transform image data on an 8×8 pixel basis, and quantization using a quantization step to be described later and Huffman encoding are performed.

In this case, a higher compression ratio is set in the second encoding unit 205 than in the first encoding unit 202. More specifically, in the initial state, a quantization step Q1 is set in the first encoding unit 202, and a quantization step Q2 (Q2=Q1×2) is set in the second encoding unit 205. That is, the quantization step to be set in the second encoding unit 205 is set to be always higher than that set in the first encoding unit 202 by one rank. The first and second encoding units 202 and 205 perform optimal quantization processing for orthogonally transformed data in accordance with set parameters, and then encode the resultant data. Note that the first and second encoding units 202 and 205 rewrite and compression-encode attribute flags in accordance with the orthogonal transform coefficients obtained by quantization done with the quantization steps respectively set in the encoding units. The same attribute flag rewriting and compression-encoding methods as those in the 11th embodiment are used.

The first counter 208 counts the data amount of encoded data of the image data output from the first encoding unit 202 and holds the count value. The first counter 208 also outputs it to an encoding sequence control unit 209.

The data encoded by the encoding unit 205 is stored in the second memory 207 through the second memory control unit 206. At this time, the second counter 210 counts the data amount of encoded data output from the encoding unit 205 and holds the count value.

In addition, when the encoded data stored in a second memory 207 (to be described later) is to be transferred to a first memory 204, the above count value is simultaneously transferred to the first counter 208.

If the count value has reached a given set value while the first counter 208 counts the data amount of encoded data output from the first encoding unit 202, the encoding sequence control unit 209 outputs a control signal to the first memory control unit 203 to discard the data stored in the first memory 204 as in the 11th embodiment described above.

The encoding sequence control unit 209 reads out the encoded data (encoded image data and encoded attribute data) stored in the second memory 207 and transfers it to the first memory 204. The encoding sequence control unit 209 then outputs control signals to the memory control units 206 and 203 to store the encoded data in the first memory 204. At this time, the count value of a second counter 210 is transferred to the first counter 208 and is loaded (overwritten) as the count value of the first counter. Subsequently, the second counter 210 is cleared to zero and starts counting the data amount of encoded image data input after this operation.

In brief, since the count value of the second counter 210 represents the data amount of encoded data stored in the second memory 207, it may be considered that the count value and encoded data are directly copied to the first counter and first memory so as to keep their relationship unchanged.

The encoding sequence control unit 209 also outputs control signals to the first and second encoding units 202 and 205 to perform encoding so as to reduce the amounts of encoded data.

If, for example, it is determined for the first time that the data mount has exceeded the set value, since the quantization steps Q1 and Q2 are set in the first and second encoding units 202 and 205, the quantization steps are changed to Q2 and Q3. As a result, the first encoding unit 202 inherits the quantization step Q2 set in the second encoding unit 205 immediately before the above determination, and the second encoding unit 205 performs encoding processing at a higher compression ratio to cope with the next overflow by using the larger quantization step Q3.

When it is determined that the data amount has exceeded the set value, since the data (image and attribute flag) encoded in accordance with the preceding quantization step Q2 is stored in the second memory 207, this data must be updated to encoded data for the newly set quantization step Q3. Therefore, when it is determined that the data amount has exceeded the set value, the re-encoding unit 211 reads out the previous encoded data (encoded image data and encoded attribute data), decodes it, and re-encodes it with the newly set quantization step Q3. The re-encoding unit 211 then stores the resultant data in the second memory 207 through the second memory control unit 206. At this time, a third counter 212 counts the data amount of data re-encoded by the re-encoding unit 211. When the above re-encoding of the encoded data is completed, this count value is added to the count value of the second counter 210. When this addition is completed, therefore, the second counter 210 equivalently counts the data amount of data encoded by the second encoding unit 205 with the quantization step Q3, starting from the head of the input image.

The two encoding units 202 and 205 continue encoding processing as long as image data to be encoded which is input from the input unit 201 is left regardless of whether the re-encoding processing is completed or not. Whether the count value of the counter 208 has reached a given set value is kept checked until encoding processing (encoding and re-encoding) for one-page image data input from the input unit 201 is completed. The above encoding processing and re-encoding processing are executed under the control corresponding to the detection result obtained in this case.

FIG. 12 is a flow chart showing the flow of processing in the arrangement in FIG. 2. Although FIG. 2 has already been described above, the same description will be made again to facilitate understanding of the 12th embodiment and to explain processing unique to the 12th embodiment.

When there are two encoding units as described with reference to FIG. 2, one-page image data is encoded on the basis of the flow chart shown in FIG. 12. The description based on FIG. 12 is similar to that based on FIG. 8, which is a flow chart for the case wherein only one encoding unit is used, and a person skilled in the art can fully understand the characteristic features of the 11th embodiment from the above description. Therefore, the second example will be described with reference to processing in three phases as in the case of the single encoding unit, and the differences between the processing in FIG. 12 and that in FIG. 8 will be mainly described below.

The biggest difference between the flow in FIG. 8 and that in FIG. 12 is that the transfer processing in step S317 is moved between step S307 and step S309. That is, it can be considered that the encoding/re-encoding phase and transfer phase change their places (discarding processing for encoded data in step S307 is an exception).

In initialization of encoding parameters in step S301, the quantization step Q1 is set in the first encoding unit 202, and the quantization step Q2 is set in the second encoding unit 205.

In the encoding phase, steps S801, S303, and S305 are repeatedly executed. Although the processing in steps S801 and S305 is the same as that in the case of the single encoding unit, only the encoding processing in step S303 differs, as shown in FIG. 13.

In order to store encoded data with higher compression ratios stepwise, the first encoded data stored in the first memory 204 is the data encoded with the smallest quantization step Q1, and the encoded data stored in the second memory is the data encoded with the quantization step Q2.

If the amount of data that is being stored in the first memory 204 exceeds the set upper limit (step S305), the encoded data held in the first memory 204 is immediately discarded (step S307), and the encoded data with a higher compression ratio which is held in the second memory 207 is transferred to the first memory 204 (see step S317 in FIG. 14). This operation makes it possible to store, in the first memory 204, the encoded data as the proper second candidate which does not exceed the upper limit without waiting for the end of the first re-encoding processing described in the 11th embodiment (FIG. 1). In comparison with the arrangement in FIG. 1, this is the largest merit in using the arrangement in FIG. 2 which has the two encoding units.

The 12th embodiment is based on the idea that it is useless to have encoded data with the same compression ratio in the two memories 204 and 207, and hence encoded data with a compression ratio higher than that of encoded data stored in the first memory 204 is stored in the second memory 207. The subsequent processing is performed on the basis of this idea. After the processing (transfer phase) of transferring the encoded data in the second memory 207 to the first memory 204, therefore, the encoded data in the second memory 207 is re-encoded to make the memory hold encoded data with a compression ratio higher than the preceding compression ratio by one step.

More specifically, as shown in FIG. 15, in the encoding/re-encoding phase following the transfer phase, the quantization steps Q1 and Q2 applied to the two encoding units 202 and 205 are changed to Q2 and Q3, respectively (step S309) before the above re-encoding processing. If one-page image is continuously input (step S803), the succeeding image data as the input data are encoded by the two encoding units in which the new quantization steps are set (step S311), and the encoded data are stored in the corresponding memories 204 and 207. Along with the above encoding processing, the encoded data stored in the second memory (transferred to the first memory 204) is re-encoded by the re-encoding unit 211 with the quantization step Q3 to be changed into encoded data with a compression ratio higher than that of the encoded data in the first memory by one step (step S313). The re-encoded data is then re-stored in the second memory 207

As in the 11th embodiment, in the 12th embodiment, in this re-encoding processing, the respective quantized values obtained by temporarily Huffman-decoding encoded data are subjected to bit shift processing that can obtain the same result as that obtained by dividing these quantized values by $2^n$, and then, the resultant data is Huffman-encoded again. This method allows high-speed re-encoding processing because it changes the quantization step by only bit shift processing and does not perform inverse orthogonal transform and re-orthogonal transform processing.

If there are two encoding units as in the 12th embodiment, encoded data and re-encoded data are mixed and stored in the second memory 207, as shown in FIG. 15. As described above, therefore, decoded data must be delimited in given units to be managed in the form of files or packets in the second memory 207 as well. For this purpose, an arrangement similar to that in the modification to the first example may be provided.

Referring to FIG. 12, if the end of re-encoding processing is detected in step S315, the flow shifts to the encoding phase (steps S801 and S303) again. As shown in FIG. 16, in the encoding phase after the encoding/re-encoding phase, the encoded data held in the two memories 204 and 207 differ in their compression ratios, and the manners in which the encoded data are mixed (addresses) greatly differ. If, therefore, the data amount of the first memory 204 exceeds the set value again, the encoded data (the codes in areas indicated by horizontal stripes VI+VIII) held in the second memory 207 must be transferred to the first memory 204. In consideration of these points, the encoded data in the first memory 204 must be managed in the form of files or packets as well as in the second memory 207. A management mechanism using the above management table is also required for the first memory 204.

The state of the encoding phase shown in FIG. 16 is the same as the initial state of the encoding phase (FIG. 13) except that the quantization step and the manner in which encoded data are mixed before re-encoding processing differ from those after re-encoding processing. By repeating the encoding phase, transfer phase, and encoding/re-encoding phase, the encoded data obtained by compressing one-page image data to the set upper limit or less can be reliably stored in the first memory 204 in the end.

The transfer phase and encoding/re-encoding phase in the 12th example are performed in a reverse order with respect to the 11th example. For this reason, the detection of the end of inputting of one-page image data after transfer processing in FIG. 8 (step S805) is done at almost the same timing as that of the detection of the end of inputting of one-page image data in the encoding/re-encoding phase (step S803). In addition, the two detection processes are the same as step S805 in terms of function and are the same as step S803 in terms of timing. These two steps are therefore integrated into a new step of detecting the end of inputting of one-page image data and written as step S1201.

In the 11th and 12th embodiments described above, the first and second memories are physically different memories. This is because the two memories can be accessed independently. This arrangement is a characteristic feature of the present invention. However, the present invention also incorporates a case wherein the first and second memories are not physically different memories. As is obvious, the present invention can also be realized by one memory if two areas corresponding to the first and second memories are ensured in a physically single memory, and the above description is applied to this arrangement, with the first and second memories being replaced with the first and second memory areas, respectively.

When each example described above is to be realized by one memory, some of the data transfer processes described in the transfer phase can be omitted. A detailed description of this will be omitted because such operation can be easily imagined. If the above two areas are to be strictly used as different areas, data transfer processing is required in the same manner as in the case wherein two physically different memories are used. If, however, the same data is to be shared between the two areas, data transfer processing becomes unnecessary, and a reduction in storage capacity can be attained.

Assume that the encoded data held in the second memory area is to be transferred to the first memory area. In this case, the same effect as that of transferring the encoded data can be obtained by simply transferring two kinds of information, i.e., the start address at which the encoded data is stored and the data size from the second memory control unit to the first memory control unit.

If the encoded data is stored in a file or packet form, a slightly larger amount of information must be transferred between the memory control units, and management table information associated with the encoded data must be transferred. However, this operation is more efficient than transferring the encoded data.

According to the above image processing apparatus, when input image data is to be encoded, even if a target size is exceeded, the processing can be continued, while the input operation is continued, such that the encoded data will fall within the target size. In addition, according to the 11th and 12th embodiments, since character and halftone areas are encoded by using quantization matrices suitable for the respective areas instead of using the uniform quantization step, a high compression ratio can be attained, and a deterioration in image quality can be minimized.

In the 12th embodiment, when attribute data is to be compressed, the data is stored in the first and second memories. However, as in the 11th embodiment, such data may be stored in different memories.

As described above, the first to 12th embodiments can also be implemented by application programs running on a general-purpose information processing apparatus. The present invention therefore incorporates the computer programs. In addition, in general, the computer programs are copied or installed in the apparatus through a storage medium such as a floppy disk or CD-ROM set in the apparatus, and executed. As is obvious, therefore, such a storage medium is also incorporated in the present invention.

In the above embodiments, image data is input from the scanner. However, the present invention can also be applied to a printer driver operating on a computer. Assume that the present invention is to be applied to the printer driver. In this case, when data to be printed is received from upper processing (an application or the like), the data can be discriminated as a halftone image or character/line image, the arrangement for image area information generation can be omitted or simplified.

Furthermore, the present invention can be applied to a combination of a computer program and appropriate hardware (an encoding circuit and the like).

As has been described above, according to the 11th and 12th embodiments, encoded data can be efficiency generated within a set size without re-inputting image data, and the attributes of the image can also be efficiently compressed in accordance with the compressed image.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which inputs image area information constituted by a plurality of types of image area component data for each pixel of multilevel image data and encodes the image area information, comprising:

first encoding means for losslessly encoding the inputted image area information;

storage means for storing encoded data losslessly encoded by said first encoding means;

second encoding means for decoding the encoded data stored in said storage means, losslessly encoding the decoded data again, and storing the data in said storage means;

monitoring means for monitoring an amount of data generated by said first encoding means and detecting whether the amount of data has exceeded a target amount; and control means for, when said monitoring means detects that the amount of data exceeds the target amount, generating a request so that image area component data in the image area information encoded by said first encoding means and image area component data in the image area information decoded by said second encoding means are converted in accordance with a predetermined condition, wherein when said control means issues a request to convert the predetermined image area component data, said first encoding means converts the requested image area component data in successively input image area information, encodes the data, and stores the data in said storage means, and said second encoding means converts the requested image area component data in the image area information obtained by decoding the encoded data already stored in said storage means, re-encodes the decoded data, and stores the data in the storage means.

2. The apparatus according to claim 1, wherein said control means converts image area component data as a conversion target every time a target data amount is exceeded.

3. The apparatus according to claim 1, wherein the image area component data contains data indicating whether a target pixel exists in a character•line drawing area or a halftone area, and data indicating whether the target pixel is a chromatic or achromatic pixel.

4. The apparatus according to claim 3, wherein when said monitoring means detects for the first time that an amount of data has exceeded the target amount, said control means generates a request to change pixel attribute information which indicates that the pixel exists in a halftone area and is achromatic into information indicating that the pixel is chromatic, and when said monitoring means detects for the second time that the amount of data has exceeded the target amount, said control means generates a request to change pixel attribute information which indicates that the pixel exists in a character•line drawing and is achromatic into information indicating that the pixel is chromatic.

5. The apparatus according to claim 3, further comprising attribute information generating means for outputting, for each pixel, attribute component data indicating whether the pixel exists in a character•line drawing area or a halftone area and attribute component data indicating whether the pixel is chromatic or achromatic as the attribute information by inputting multilevel image data and analyzing the input multilevel image data.

6. The apparatus according to claim 1, further comprising:

input means for inputting the multilevel image data;

first image encoding means which can change a parameter for determining a compression ratio;

second image encoding means which can change a parameter for determining a compression ratio, decodes data generated by said first image encoding means, and re-encodes the data at a compression ratio higher than that of said first image encoding means;

second monitoring means for monitoring an amount of data while input image data is being encoded by said first image encoding means, and, detecting whether the amount of data has reached a predetermined amount;

setting means for increasing the compression ratios in said first and second image encoding means when said second monitoring means detects that the amount of data has reached the predetermined amount; and control means for, when the parameter is changed by said setting means, causing said second image encoding means to re-encode data previously generated by said first image encoding means, storing the re-encoded data as data code after change of the parameter of said first image encoding means, and storing as succeeding data the encoded data from said first image encoding means after change of the parameter.

7. A control method for an image processing apparatus which inputs image area information constituted by a plurality of types of image area component data for each pixel of multilevel image data and encodes the image area information, comprising:

a first encoding step, of losslessly encoding the inputted image area information and storing the encoded data in predetermined storage means;

a second encoding step, of decoding the generated data stored in the storage means, losslessly encoding the decoded data again, and storing the re-encoded data in the storage means;

a monitoring step, of monitoring an amount of data generated in said first encoding step and detecting whether the amount of data has exceeded a target data amount; and a control step, of, when it is detected in said monitoring step that the amount of data exceeds the target amount, generating a request so that image area component data in the image area information encoded in said first encoding step and image area component data in the image area information decoded in said second encoding step are converted in accordance with a predetermined condition, wherein when a request to convert the predetermined image area component data is issued in said control step, the requested image area component data in successively input image area information is converted, the data is encoded, and the data is stored in the storage means in said first encoding step, and the requested image area component data in the image area information obtained by decoding the data already stored in the storage means is converted, the data re-encoded, and the data is stored in the storage means in said second encoding step.

8. A computer program stored in a computer-readable medium which, when executed, functions as an image processing apparatus which inputs image area information constituted by a plurality of types of image area component data for each pixel of multilevel image data and encodes the image area information, comprising:

program code for a first encoding step, of losslessly encoding the inputted image area information and storing the encoded data in predetermined storage means;

program code for a second encoding step, of decoding the data stored in the storage means, losslessly encoding the decoded data again, and storing the data in the storage means;

program code for a monitoring step, of monitoring an amount of data generated in the first encoding step and detecting whether the amount of data has exceeded a target amount; and program code for a control step, of, when it is detected in the monitoring step that the data amount exceeds the target amount, generating a request so that image area component data in the image area information encoded in the first encoding step and image area component data in the image area information decoded in the second encoding step are converted in accordance with a predetermined condition, wherein the first encoding step includes program code for, when a request to convert the predetermined image area component data is issued in the control step, converting the requested image area component data in successively inputted image area information, encoding the data, and storing the data in the storage means in the first encoding step, and the second encoding step includes program code for converting the requested image area component data in the image area information obtained by decoding the code already stored in the storage means, re-encoding the decoded data, and storing the re-encoded data in the storage means in the second encoding step.

9. A computer-readable medium storing a computer program which, when executed, functions as an image processing apparatus which inputs image area information constituted by a plurality of types of image area component data for each pixel of multilevel image data and encodes the image area information, the program comprising:

program code for a first encoding step, of losslessly encoding the inputted image area information and storing the encoded data in predetermined storage means;

program code for a second encoding step, of decoding the data stored in the storage means, losslessly encoding the decoded data again, and storing the data in the storage means;

program code for a monitoring step, of monitoring an amount of data generated in the first encoding step and detecting whether the amount of data has exceeded a target amount; and program code for a control step, of, when it is detected in the monitoring step that the data amount exceeds the target amount, generating a request so that image area component data in the image area information encoded in the first encoding step and image area component data in the image area information decompressed in the second encoding step are converted in accordance with a predetermined condition, wherein the first encoding step includes program code for, when a request to convert the predetermined image area component data is issued in the control step, converting the requested image area component data in successively inputted image area information, encoding the data, and storing the data in the storage means in the first encoding step, and the second encoding step includes program code for converting the requested image area component data in the image area information obtained by decoding the data already stored in the storage means, re-encoding the decoded data, and storing the data in the storage means in the second encoding step.

10. An image processing apparatus which inputs multilevel image data and image area information of each pixel and performs encoding comprising:

first image data encoding means which can change a parameter for determining a compression ratio for the multilevel image data;

second image data encoding means which can change a parameter for determining a compression ratio, decodes the encoded data generated by said first image data encoding means, and re-encodes the decoded data;

first image area encoding compressing means for lossless encoding which can change a parameter for determining a compression ratio for the image area information;

second image area information encoding means for lossless encoding which can change a parameter for determining a compression ratio, decodes the encoded data generated by said first image area information encoding means, and re-encodes the decoded data;

monitoring means for monitoring an amount of data while image data that is being input is encoded by said first image data encoding compressing means, and detecting whether the amount of data has reached a predetermined amount;

setting means for, when said monitoring means detects that the amount of data has reached the predetermined amount, setting parameters for increasing the compression ratios in said first and second image data encoding means and said first and second image area information encoding means; and control means for, when said setting means changes a parameter, causing said second image data encoding means to re-encode the previously generated by said first image data encoding means, causing said second image area information encoding means to re-encode the data previously generated by said first image area information encoding means, storing the respective re-encoded data as data after change of the parameters in said first image data encoding means and said first image area information encoding means, and storing as successive encoded data the data from said first image data encoding means and said first image area information encoding means after change of the parameters.

11. The apparatus according to claim 10, wherein said control means changes image area component information constituting image area information into a predetermined state every time it is detected that the target data amount. is exceeded.

12. The apparatus according to claim 10, wherein the image area component information contains data indicating whether a target pixel exists in a character•line drawing area or a halftone area, and data indicating whether the target pixel is a chromatic or achromatic pixel.

13. An image processing method of inputting multilevel image data and image area information of each pixel and performing encoding comprising:

a first image data encoding step, of changing a parameter for determining a compression ratio for the multilevel image data;

a second image data encoding step, of changing a parameter for determining a compression ratio, decoding the encoded data generated in said first image data encoding step, and re-encoding the data;

a first image area information encoding step of lossless encoding, of changing a parameter for determining a compression ratio for the image area information;

a second image area information encoding step of lossless encoding, of changing a parameter for determining a compression ratio, decoding the encoded data generated in the first image area information compressing step, and re-encoding the decoded data;

a monitoring step, of monitoring an amount of data while image data that is being input is encoded in said first image data encoding step, and detecting whether the amount of data has reached a predetermined amount;

a setting step, of, when it is detected in said monitoring step that the code data amount has reached the predetermined amount, setting parameters for increasing the compression ratios in said first and second image data compressing steps and said first and second image area information encoding steps; and a control step, of, when a parameter is changed in said setting step, causing the data previously generated in said first image data encoding step to be re-encoded in said second image data compressing step, causing the data previously generated in said first image area information encoding step to be re-encoded in said second image area information encoding step, storing the respective re-encoded data as data after change of the parameters in said first image data encoding step and said first image area information encoding step, and storing as successive data the data from said first image data encoding step and said first image area information encoding step after change of the parameters.

14. A computer program stored in a computer-readable medium which, when executed, functions as an image processing apparatus for inputting multilevel image data and image area information of each pixel and performing encoding comprising:

program code for a first image data encoding step, of changing a parameter for determining a compression ratio for the multilevel image data;

program code for a second image data encoding step, of changing a parameter for determining a compression ratio, decoding the encoded data generated in the first image data compressing step, and re-compressing the decoded data;

program code for a first image area information encoding step of lossless encoding, of changing a parameter for determining a compression ratio for the image area information;

program code for a second image area information encoding step of lossless encoding, of changing a parameter for determining a compression ratio, decoding the encoded data generated in the first image area information encoding step, and re-compressing the decoded data;

program code for a monitoring step, of monitoring an amount of data while image data that is being input is encoding in the first image data encoding step, and detecting whether the data amount has reached a predetermined amount;

program code for a setting step, of, when it is detected in the monitoring step that the amount of data has reached the predetermined amount, setting parameters for increasing the compression ratios in the first and second image data encoding steps and the first and second image area information encoding steps; and program code for a control step, of, when a parameter is changed in the setting step, causing the code previously generated in the first image data encoding step to be re-encoded in the second image data encoding step, causing the data previously generated in the first image area information encoding step to be re-encoded in the second image area information encoding step, storing the respective re-encoded data as data after change of the parameters in the first image data encoding step and the first image area information encoding step, and storing as successive data the data from the first image data encoding step and the first image area information encoding step after change of the parameters.

15. A computer-readable medium storing a computer program which, when executed, functions as an image processing apparatus for inputting multilevel image data and image area information of each pixel and performing encoding, the program comprising:

program code for a first image data encoding step, of changing a parameter for determining a compression ratio for the multilevel image data;

program code for a second image data encoding step, of changing a parameter for determining a compression ratio, decoding the encoded data generated in the first image data encoding step, and re-encoding the decoded data;

program code for a first image area information encoding step of lossless encoding, of changing a parameter for determining a compression ratio for the image area information;

program code for a second image area information encoding step of lossless encoding, of changing a parameter for determining a compression ratio, decoding the encoded data generated in the first image area information encoding step, and re-encoding the data;

program code for a monitoring step, of monitoring an amount of data while image data that is being input is encoded in the first image data encoding step, and detecting whether the data amount has reached a predetermined amount;

program code for a setting step, of, when it is detected in the monitoring step that the amount of data has reached the predetermined amount, setting parameters for increasing the compression ratios in the first and second image data encoding steps and the first and second image area information encoding steps; and program code for a control step, of, when a parameter is changed in the setting step, causing the code previously generated in the first image data encoding step to be re-encoded in the second image data encoding step, causing the data previously generated in the first image area information step to be re-encoded in the second image area information encoding step, storing the respective re-encoded code as data after change of the parameters in the first image data encoding step and the first image area information encoding step, and storing as successive data the data from the first image data encoding step and the first image area information encoding step after change of the parameters.

16. An image processing apparatus which inputs multilevel image data and image area information of each pixel and performs encoding, comprising:

first image data encoding means which can change a parameter for determining a compression ratio for the multilevel image data;

second image data encoding means which can change a parameter for determining a compression ratio, decodes the encoded data generated by said first image data encoding means, and re-encodes the data;

first image area information encoding means for lossless encoding which can change a parameter for determining a compression ratio for the image area information;

second image area information encoding means for lossless encoding which can change a parameter for determining a compression ratio, decodes the encoded data encoded by said first image area information encoding means, and re-encodes the decoded data;

monitoring means for monitoring a total amount of data while image data and image area information that are being input are encoded by said first image data encoding means and said first image area information encoding means, and detecting whether the total amount of data has reached a predetermined amount;

setting means for, when said monitoring means detects that the amount of data has reached the predetermined amount, setting parameters for increasing the compression ratios in said first and second image data encoding and said first and second image area information encoding means; and control means for, when said setting means changes a parameter, causing said second image data encoding means to re-encode the data previously generated by said first image data encoding means, causing said second image area information encoding means to re-encode the code data previously generated by said first image area information encoding means, storing the respective re-encoded data as data after change of the parameters in said first image data encoding means and said first image area information encoding means, and storing as successive data the data from said first image data encoding means and said first image area information encoding means after change of the parameters.

17. The apparatus according to claim 16, wherein said control means changes image area component information constituting image area information into a predetermined state every time it is detected that the target data amount is exceeded.

18. The apparatus according to claim 16, wherein the image area component information contains data indicating whether a target pixel exists in a character•line drawing area or a halftone area, and data indicating whether the target pixel is a chromatic or achromatic pixel.

19. An image processing method of inputting multilevel image data and image area information of each pixel and performing encoding, comprising:

a first image data encoding step, of changing a parameter for determining a compression ratio for the multilevel image data;

a second image data encoding step, of changing a parameter for determining a compression ratio, decoding the encoded data generated in said first image data encoding step, and re-encodina the decoded data;

a first image area information encoding step of lossless encoding, of changing a parameter for determining a compression ratio for the image area information;

a second image area information encoding step of lossless encoding, of changing a parameter for determining a compression ratio, decoding the encoded data generated in said first image area information encoding step, and re-encoding the decoded data;

a monitoring step, of monitoring a total amount of data while image data and image area information that are being input are encoded in said first image data encoding step and said first image area information encoding step, and detecting whether the total amount of data has reached a predetermined amount;

a setting step, of, when it is detected in said monitoring step that the amount of data has reached the predetermined amount, setting parameters for increasing the compression ratios in said first and second image data encoding steps and said first and second image area information encoding step; and a control step, of, when a parameter is changed in said setting step, causing the code previously generated in said first image data encoding step to be re-encoded in said second image data encoding step, causing the code previously generated in said first image area information encoding step to be re-encoded in said second image area information encoding step, storing the respective re-encoded data as data after change of the parameters in said first image data encoding step and said first image area information encoding step, and storing as successive data the data from said first image data encoding step and said first image area information encoding step after change of the parameters.

20. A computer program stored in a computer-readable medium which, when executed, functions as an image processing apparatus for inputting multilevel image data and image area information of each pixel and performing encoding, comprising:

program code for a first image data encoding step, of changing a parameter for determining a compression ratio for the multilevel image data;

program code for a second image data encoding step, of changing a parameter for determining a compression ratio, decoding the encoded data generated in said first image data encoding step, and re-encoding the decoded data;

program code for a first image area information encoding step of lossless encoding, of changing a parameter for determining a compression ratio for the image area information;

program code for a second image area information encoding step of lossless encoding, of changing a parameter for determining a compression ratio, decoding the encoded data encoding in the first image area information encoding step, and re-encoding the decoded data;

program code for a monitoring step, of monitoring a total amount of data while image data and image area information that are being input are encoding in the first image data encoding step and the first image area information encoding step, and detecting whether the total amount of data has reached a predetermined amount;

program code for a selling step, of, when it is detected in the monitoring step that the amount of data has reached the predetermined amount, setting parameters for increasing the compression ratios in the first and second image data encoding steps and the first and second image area information encoding step; and program code for a control step, of, when a parameter is changed in the setting step, causing the code previously generated in the first image data encoding step to be re-encoded in the second image data encoding step, causing the data previously generated in the first image area information encoding step to be re-encoded in the second image area information encoding step, storing the respective re-encoded data as data after change of the parameters in the first image data encoding step and the first image area information encoding step, and storing as successive data the data from the first image data encoding step and the first image area information encoding step after change of the parameters.

21. A computer-readable medium storing a computer program which, when executed, functions as an image processing apparatus for inputting multilevel image data and image area information of each pixel and performing encoding, the program comprising:

program code for a first image data encoding step, of changing a parameter for determining a compression ratio for the multilevel image data;

program code for a second image data encoding step, of changing a parameter for determining a compression ratio, decoding the encoded data generated in said first image data encoding step, and re-encoding the decoded data;

program code for a first image area information encoding step of lossless encoding, of changing a parameter for determining a compression ratio for the image area information;

program code for a second image area information encoding step of lossless encoding, of changing a parameter for determining a compression ratio, decoding the encoded data generated in the first image area information encoding step, and re-encoding the decoded data;

program code for a monitoring step, of monitoring a total amount of data while image data and image area information that are being input are encoded in the first image data encoding step and the first image area information encoding step, and detecting whether the total amount of data has reached a predetermined amount;

program code for a setting step, of, when it is detected in the monitoring step that the amount of data has reached the predetermined amount, setting parameters for increasing the compression ratios in the first and second image data encoding steps and the first and second image area information encoding step; and program code for a control step, of, when a parameter is changed in the setting step, causing the data previously generated in the first image data encoding step to be re-encoded in the second image data encoding step, causing the data previously generated in the first image area information encoding step to be re-encoded in the second image area information encoding step, storing the respective re-encoded data as data after change of the parameters in the first image data encoding step and the first image area information encoding step, and storing as successive data the data from the first image data encoding step and the first image area information encoding step after change of the parameters.

22. An image processing apparatus which inputs multilevel image data and image area information of each pixel and performs encoding, comprising:

first image data compressing encoding means which can change a parameter for determining a compression ratio for the multilevel image data;

second image data encoding means which can change a parameter for determining a compression ratio, decodes the encoded data generated by said first image data encoding means, and re-encodes the decoded data;

first image area information encoding means for lossless encoding which can change a parameter for determining a compression ratio for the image area information;

second image area information encoding means for lossless encoding which can change a parameter for determining a compression ratio, decodes the encoded data generated by said first image area information encoding means, and re-encodes the decoded data;

monitoring means for monitoring amounts of data while image data and image area information that are being input are encoded by said first image data encoding means and said first image area information encoding means, and detecting whether the amounts respective data have reached predetermined amounts;

first setting means for, when said monitoring means detects that the amount of data of the image data has reached the predetermined amount, setting parameters for increasing the compression ratios in said first and second image data encoding means;

control means for, when the parameter is changed by said first setting means, causing said second image data encoding means to re-encode the data previously generated by said first image data encoding means, storing the re-encoded data as data before change of the parameter in said first image data encoding means, and storing as successive data the data from said first image data encoding means after change of the parameter;

second setting means for, when said monitoring means detects that the amount of data of image area information has reached the predetermined amount, setting parameters for increasing the compression ratios in said first and second image area information encoding means; and second control means for, when the parameter is changed by said second setting means, causing said second image area information encoding means to re-encode the data previously generated by said first image area information encoding means, storing the re-encoded data as data after change of the parameter in said first image area information encoding means, and storing as successive data the data from said first image area information encoding means after change of the parameter.

23. The apparatus according to claim 22, wherein said second control means changes image area component information constituting image area information into a predetermined state every time it is detected that the target data amount is exceeded.

24. The apparatus according to claim 22, wherein the image area component information contains data indicating whether a target pixel exists in a character•line drawing area or a halftone area, and data indicating whether the target pixel is a chromatic or achromatic pixel.

25. An image processing method of inputting multilevel image data and image area information of each pixel and performing encoding, comprising:

a first image data encoding step, of changing a parameter for determining a compression ratio for the multilevel image data;

a second image data encoding step, of changing a parameter for determining a compression ratio, decoding the encoded data generated in said first image data encoding step, and re-encoding the decoded data;

a first image area information encoding step of lossless encoding, of changing a parameter for determining a compression ratio for the image area information;

a second image area information encoding step of lossless encoding, of changing a parameter for determining a compression ratio, decoding the encoded data generated in the first image area information encoding step, and re-encoding the decoded data;

a monitoring step, of monitoring amounts of data while image data and image area information that are being input are encoded in said first image data encoding step and said first image area information encoding step, and detecting whether the respective amount of data have reached predetermined amounts;

a first setting step, of when it is detected in said monitoring step that the amount of data of the image data has reached the predetermined amount, setting parameters for increasing the ratios in said first and second image data encoding steps;

a control step, of, when the parameter is changed in said first setting step, causing the data previously generated in said first image data compressing step to be re-encoded in said second image data encoding step, storing the re-encoded data as data before change of the parameter in said first image data encoding step, and storing as successive data the data from said first image data encoding step after change of the parameter;

a second setting step, of; when it is detected in said monitoring step that the amount of data of image area information has reached the predetermined amount, setting parameters for increasing the compression ratios in said first and second image area information encoding steps; and a second control step, of, when the parameter is changed in said second setting step, causing the data previously generated in said first image area information encoding step to be re-encoded in said second image area information encoding step, storing the re-encoded data as data after change of the parameter in said first image area information encoding step, and storing as successive data the data from said first image area information encoding step after change of the parameter.

26. A computer program stored in a computer-readable medium which, when executed, functions as an image processing apparatus for inputting multilevel image data and image area information of each pixel and performing encoding, comprising:

program code for a first image data encoding step, of changing a parameter for determining a compression ratio for the multilevel image data;

program code for a second image data encoding step, of changing a parameter for determining a compression ratio, decoding the encoded data generated in the first image data encoding steps, and re-encoding the decoded data;

program code for a first image area information encoding step of lossless encoding, of changing a parameter for determining a compression ratio for the image area information;

program code for a second image area information encoding step of lossless encoding, of changing a parameter for determining a compression ratio, decoding the encoded data generated in the first image area information encoding step, and re-encoding the decoded data;

program code for a monitoring step, of monitoring amounts of data while image data and image area information that are being input are encoded in the first image data encoding step and the first image area information encoding step, and detecting whether the respective amounts of data have reached predetermined amounts;

program code for a first setting step, of when it is detected in the monitoring step that the amount of data of the image data has reached the predetermined amount, setting parameters for increasing the compression ratios in the first and second image data encoding steps;

program code for a control step, of, when the parameter is changed in the first setting step, causing the data previously generated in the first image data encoding step to be re-encoded in the second image data encoding step, storing the re-encoded data as data before change of the parameter in the first image data encoding step, and storing as successive data the data from the first image data compressing step after change of the parameter;

program code for a second setting step, of, when it is detected in the monitoring step that the amount of data of image area information has reached the predetermined amount, setting parameters for increasing the compression ratios in the first and second image area information encoding steps; and program code for a second control step, of, when the parameter is changed in the second setting step, causing the data previously generated in the first image area information encoding step to be re-encoded in the second image area information encoding step, storing the re-encoded data as data after change of the parameter in the first image area information encoding step, and storing as successive data the data from the first image area information encoding step after change of the parameter.

27. A computer-readable medium storing a computer program which, when executed, functions as an image processing apparatus for inputting multilevel image data and image area information of each pixel and performing encoding, the program comprising:

program code for a first image data encoding step, of changing a parameter for determining a compression ratio for the multilevel image data;

program code for a second image data encoding step, of changing a parameter for determining a compression ratio, decoding the encoded data generated in the first image data encoding steps, and re-encoding the decoded data;

program code for a first image area information encoding step of lossless encoding, of changing a parameter for determining a compression ratio for the image area information;

program code for a second image area information encoding step of lossless encoding, of changing a parameter for determining a compression ratio, decoding the encoded data generated in the first image area information encoding step, and re-encoding the decoded data;

program code for a monitoring step, of monitoring amounts of data while image data and image area information that are being input are encoded in the first image data encoding step and the first image area information encoding step, and detecting whether the respective amounts of data have reached predetermined amounts;

program code for a first setting step, of, when it is detected in the monitoring step that the amount of data of the image data has reached the predetermined amount, setting parameters for increasing the compression ratios in the first and second image data encoding steps;

program code for a control step, of, when the parameter is changed in the first setting step, causing the data previously generated in the first image data encoding step to be re-encoded in the second image data encoding step, storing the re-encoded data as data before change of the parameter in the first image data encoding step, and storing as successive data as data from the first image data encoding step after change of the parameter;

program code for a second setting step, of, when it is detected in the monitoring step that the amount of data of image area information has reached the predetermined amount, setting parameters for increasing the compression ratios in the first and second image area information encoding steps; and program code for a second control step, of, when the parameter is changed in the second setting step, causing the data previously generated in the first image area information encoding step to be re-encoded in the second image area information encoding step, storing the re-encoded data as data after change of the parameter in the first image area information encoding step, and storing as successive data as data from the first image area information encoding step after change of the parameter.

28. An image processing apparatus including multilevel image encoding means and image area information encoding means which are independent of each other and to which multilevel image data and image area information of each pixel of the multilevel image data are respectively input, comprising a memory which stores encoded multilevel image data and image area information, said multilevel image encoding means including first multilevel image encoding means which can change a parameter for determining a compression ratio, second multilevel image encoding means which can change a parameter for determining a compression ratio, decodes encoded data generated by said first multilevel image encoding means, and re-encodes the decoded data, image data amount monitoring means for monitoring an amount of data generated by said first multilevel image encoding means and detecting whether the amount of data has reached a predetermined amount, image code parameter setting means for, when said image data amount monitoring means detects that the amount of data has reached the predetermined amount, setting parameters for increasing the compression ratios in said first and second multilevel image encoding means, and image encoding control means for, when the parameter is changed by said image code parameter setting means, causing said second multilevel image encoding means to re-encode data previously generated by said first multilevel image encoding means, and storing the re-encoded data in said first memory as data after change of the parameter in said first multilevel image encoding means, and storing as successive encoded data in said first memory data from said first multilevel image encoding means after change of the parameter, and said image area information encoding means including first image area information encoding means for losslessly encoding the image area information, second image area information encoding means for losslessly re-encoding image area information generated by said first image area information encoding means, image area information amount monitoring means for monitoring an amount of data generated by said first image area information encoding means and detecting whether the amount of data has reached a predetermined amount, image area code parameter setting means for, when said image area information amount monitoring means detects that the amount of data has reached the predetermined amount, setting parameters for increasing the compression ratios in said first and second image area encoding means, and image area encoding control means for, when the parameter is changed by said image area code parameter setting means, causing said second image area information encoding means to re-encode data previously generated by said first image area information encoding means, storing the re-encoded data as data after change of the parameter in said first image area information encoding means, and storing as successive data in said memory the data from said first image area information compressing means after change of the parameter.

29. The apparatus according to claim 28, wherein said image encoding control means sets a quantization step for encoding which is larger than before every time it is detected that a target data amount is exceeded.

30. The apparatus according to claim 28, wherein said image area encoding control means reduces entropy by replacing part of image area component data constituting image area information with a fixed value every time it is detected that a target data amount is exceeded.

31. The apparatus according to claim 30, wherein the image area component data contains data indicating whether a target pixel exists in a character•line drawing area or a halftone area, and data indicating whether the target pixel is a chromatic or achromatic pixel.

32. The apparatus according to claim 31, wherein when said image area information amount monitoring means detects for the first time that an amount of data has exceeded the target data amount, said image area encoding control means generates a request to change image area component information of a pixel which indicates that the pixel exists in a halftone area and is achromatic into information indicating that the pixel is chromatic, and when said image area information amount monitoring means detects for the second time that the amount of data has exceeded the target data amount, said image area encoding control means generates a request to change pixel attribute information which indicates that the pixel exists in a line drawing and is achromatic into information indicating that the pixel is chromatic.

33. The apparatus according to claim 31, further comprising attribute information generating means for outputting, for each pixel, attribute component data indicating whether the pixel exists in a character•line drawing area or a halftone area and attribute component data indicating whether the pixel is chromatic or achromatic as the attribute information by inputting multilevel image data and analyzing the input multilevel image data.

34. A control method for an image processing apparatus, including a multilevel image encoding step and an image area information encoding step which are independent of each other and in which multilevel image data and image area information of each pixel of the multilevel image data are respectively input, wherein said multilevel image encoding step includes a first multilevel image encoding step, of changing a parameter for determining a compression ratio, a second multilevel image encoding step, of changing a parameter for determining a compression ratio, decoding data generated by said first multilevel image compressing step, and re-encoding the decoded data;

an image data amount monitoring step, of monitoring an amount of data generated in said first multilevel image encoding step and detecting whether the amount of data has reached a predetermined amount, an image code parameter setting step of when it is detected in said image data amount monitoring step that the amount of data has reached the predetermined amount, setting parameters for increasing the compression ratios in said first and second multilevel image encoding steps, and an image encoding control step of, when the parameter is changed in said image code parameter setting step, causing data previously generated in said first multilevel image encoding step to be re-encoded in said second multilevel image encoding step, and storing the re-encoded data in a predetermined memory as data after change of the parameter in said first multilevel image encoding step, and storing as successive data in the memory the data from said first multilevel image encoding step after change of the parameter, and said image area information encoding step includes:

a first image area information encoding step, of losslessly encoding the image area information, an second image area information encoding step, of losslessly re-encoding image area information generated in said first image area information encoding step, an image area information amount monitoring step, of monitoring an amount of data generated in said first image area encoding step and detecting whether the amount of data has reached a predetermined amount, an image area code parameter setting step, of, when it is detected in said image area information amount monitoring step that the amount of data has reached the predetermined amount, setting parameters for increasing the compression ratios in said first and second image area information encoding steps, and an image area encoding control step, of, when the parameter is changed in said image area code parameter setting step, causing data previously generated in said first image area information encoding step to be re-encoded in said second image area information encoding step, storing the re-encoded data as data after change of the parameter in said first image area information encoding step, and storing the encoded data generated in said first image area information encoding step after change of the parameter as successive data in the memory.

35. A computer program stored in a computer-readable medium and constituted by a program for a multilevel image encoding step and a program for an image area information encoding step in which multilevel image data and image area information of each pixel of the multilevel image data are respectively input and independently encoded, wherein the program for the multilevel image encoding step includes a program for a first multilevel image encoding step, of changing a parameter for determining a compression ratio, a program for a second multilevel image encoding step, of changing a parameter for determining a compression ratio, decoding data generated by the first multilevel image encoding step, and re-encoding the decoded data, a program for an image data amount monitoring step, of monitoring an amount of data generated in the first multilevel image encoding step and detecting whether the amount of data has reached a predetermined amount, a program for an image code parameter setting step, of, when it is detected in the image data amount monitoring step that the amount of data has reached the predetermined amount, setting parameters for increasing the compression ratios in the first and second multilevel image encoding step, and a program for an image encoding control step, of, when the parameter is changed in the image code parameter setting step, causing data previously generated in the first multilevel image compressing step to be re-encoded in the second multilevel image encoding step, and storing the re-encoded code data in a predetermined memory as data after change of the parameter in the first multilevel image encoding step, and storing as successive data in the memory the data from the first multilevel image encoding step after change of the parameter, and the program for the image area information encoding step includes a program for a first image area information encoding step, of losslessly encoding the image area information, a program for a second image area information encoding step, of losslessly re-encoding image area information generated in the first image area information encoding step, a program for an image area information amount monitoring step, of monitoring an amount of data generated in the first image area encoding step and detecting whether the amount of data has reached a predetermined amount, a program for the image area code parameter setting step, of, when it is detected in the image area information amount monitoring step that the amount of data has reached the predetermined amount, setting parameters for increasing the compression ratios in the first and second image area information encoding step, and a program for an image area encoding control step of, when the parameter is changed in the image area code parameter setting step, causing data previously generated in the first image area information encoding step to be re-encoded in the second image area information encoding step, storing the re-encoded data as data after change of the parameter in the first image area information encoding step, and storing the encoded data generated in the first image area information encoding step after change of the parameter as successive data in the memory.

36. A computer-readable storage medium storing a computer program constituted by a program for a multilevel image encoding step and a program for an image area information encoding step in which multilevel image data and image area information of each pixel of the multilevel image data are respectively input and independently encoded, wherein the program for the multilevel image encoding step includes
a program for a first multilevel image encoding step, of changing a parameter for determining a compression ratio,
a program for a second multilevel image encoding step, of changing a parameter for determining a compression ratio, decoding encoded data generated in the first multilevel image encoding step, and re-encoded the decoded data,
a program for an image data amount monitoring step, of monitoring an amount of data generated in the first multilevel image compressing step and detecting whether the amount of data has reached a predetermined amount,
a program for an image code parameter setting step, of, when it is detected in the image data amount of data monitoring step that the amount of data has reached the predetermined amount, setting parameters for increasing the compression ratios in the first and second multilevel image encoding step, and
a program for an image encoding control step, of, when the parameter is changed in the image code parameter setting step, causing data previously generated in the first multilevel image encoding step to be re-encoded in the second multilevel image encoding step, and storing the re-encoded data in a predetermined memory as data after change of the parameter in the first multilevel image encoding step, and storing as successive data in the memory the data from the first multilevel image encoding step after change of the parameter, and
the program for the image area information encoding step includes
a program for a first image area information encoding step, of losslessly encoding the image area information,
a program for a second image area information encoding step, of losslessly re-encoding image area information encoded in the first image area information encoding step,
a program for an image area information amount monitoring step, of monitoring an amount of data generated in the first image area encoding step and detecting whether the amount of data has reached a predetermined amount,
a program for the image area code parameter setting step, of, when it is detected in the image area information amount monitoring step that the amount of data has reached the predetermined amount, setting parameters for increasing the compression ratios in the first and second image area information encoding step, and
a program for an image area encoding control step of, when the parameter is changed in the image area code parameter setting step, causing data previously generated in the first image area information encoding step to be re-encoded in the second image area information encoding step, storing the re-encoded data as data after change of the parameter in the first image area information encoding step, and storing the encoded data generated in the first image area information encoding step after change of the parameter as successive data in the memory.

37. An image processing apparatus for encoding pixel data, comprising:
storage means for storing encoded data; first encoding means which orthogonally transforms, quantizes, and encodes image data on a pixel block basis, and can change a parameter associated with a quantization step in quantization processing;
first attribute data encoding means for determining an attribute of a target pixel block on the basis of data after the quantization when the data is encoded by said first encoding means, and encoding the determination result;
second encoding means which can change a parameter associated with a quantization step, decodes data generated by said first encoding means, and re-encodes the decoded data;
second attribute data encoding means for determining an attribute of a target pixel block on the basis of data after quantization when the data is re-encoded by said second encoding means, and encoding the determination result;
amount monitoring means for monitoring an amount of data generated by said first encoding means, and detecting whether the amount of data has reached a predetermined amount;
setting means for, when said amount monitoring means detects that the amount of data has reached the predetermined amount, setting parameters for increasing the quantization steps in said first and second encoding means; and
control means for, when the parameter is changed by said parameter setting means, causing said second encoding means to re-encode data previously generated by said first encoding means, storing the re-encoded data in said storage means as data after change of the parameter in said first encoding means, updating attribute data encoded by said first attribute data encoding means with attribute data encoded by said second attribute data encoding means, and storing as successive data in said storage means the data from said first encoding means after change of the parameter.

38. The apparatus according to claim 37, wherein the attribute is an achromatic/chromatic color.

39. An image processing method of encoding pixel data, comprising:
a first encoding step, of orthogonally transforming, quantizing, and encoding image data on a pixel block basis, and changing a parameter associated with a quantization step in quantization processing;
a first attribute data encoding step, of determining an attribute of a target pixel block on the basis of data after the quantization when the data is encoded in the said encoding step, and encoding the determination result;
a second encoding step, of changing a parameter associated with a quantization step, decoding data generated in said first encoding step, and re-encoding the decoded data;
a second attribute data encoding step, of determining an attribute of a target pixel block on the basis of data after quantization when the data is re-encoded in said second encoding step, and encoding the determination result;
an amount monitoring step, of monitoring an amount of data generated in said first encoding step, and detecting whether the amount of data has reached a predetermined amount;
a setting step, of, when it is detected in said amount monitoring step that the amount of data has reached the predetermined amount, setting parameters for increasing the quantization steps in said first and second encoding steps; and
a control step, of, when the parameter is changed in said parameter setting step, causing data previously generated in said first encoding step to be re-encoded in said second encoding step, storing the re-encoded data in a predetermined storage means as data after change of the parameter in said first encoding step, updating attribute data encoded in said first attribute data encoding step with attribute data encoded in said second attribute data encoding step, and storing as successive data in the storage means the data from said first encoding step after change of the parameter.

40. A computer program stored in a computer-readable medium which is loaded and executed by a computer to function as an image processing apparatus for encoding pixel data, functioning as first encoding means which orthogonally transforms, quantizes, and encodes image data on a pixel block basis, and can change a parameter associated with a quantization step in quantization processing, first attribute data encoding means for determining an attribute of a target pixel block on the basis of data after the quantization when the data is encoded by said first encoding means, and encoding the determination result, second encoding means which can change a parameter associated with a quantization step, decodes data generated by said first encoding means, and re-encodes the decoded data, second attribute data encoding means for determining an attribute of a target pixel block on the basis of data after quantization when the data is re-encoded by said second encoding means, and encoding the determination result, amount monitoring means for monitoring an amount of data generated by said first encoding means, and detecting whether the amount of data has reached a predetermined amount, setting means for, when the amount monitoring means detects that the amount of data has reached the predetermined amount, setting parameters for increasing the quantization steps in said first and second encoding means, and control means for, when the parameter is changed by said parameter setting means, causing the second encoding means to re-encode data previously generated by said first encoding means, storing the re-encoded data in the storage means as data after change of the parameter in said first encoding means, updating attribute data encoded by said first attribute data encoding means with attribute data encoded by said second attribute data encoding means, and storing as successive data in the storage means the data from said first encoding means after change of the parameter.

41. A computer-readable storage medium storing a computer program which is loaded and executed by a computer to function as an image processing apparatus for encoding pixel data, functioning as:

first encoding means which orthogonally transforms, quantizes, and encodes image data on a pixel block basis, and can change a parameter associated with a quantization step in quantization processing, first attribute data encoding means for determining an attribute of a target pixel block on the basis of data after the quantization when the data is encoded by said first encoding means, and encoding the determination result, second encoding means which can change a parameter associated with a quantization step, decodes data generated by said first encoding means, and re-encodes the decoded data, second attribute data encoding means for determining an attribute of a target pixel block on the basis of data after quantization when the data is re-encoded by said second encoding means, and encoding the determination result, amount monitoring means for monitoring an amount of data generated by said first compression-encoding means, and detecting whether the amount of data has reached a predetermined amount, setting means for, when the amount monitoring means detects that the amount of data has reached the predetermined amount, setting parameters for increasing the quantization steps in said first and second encoding means, and control means for, when the parameter is changed by said parameter setting means, causing the second encoding means to re-encode data previously generated by said first encoding means, storing the re-encoded data in the storage means as data after change of the parameter in said first encoding means, updating attribute data encoded by said first attribute data encoding means with attribute data encoded by said second attribute data encoding means, and storing as successive data in the storage means the data from said first encoding means after change of the parameter.

42. An image processing apparatus for encoding pixel data, comprising:

storage means for storing encoded data;

first encoding means which orthogonally transforms, quantizes, and encodes image data on a pixel block basis, and can change a parameter associated with a quantization step in quantization processing;

first attribute data encoding means for determining an attribute of a target pixel block on the basis of data after the quantization when the data is encoded by said first encoding means, and encoding the determination result;

second encoding means which can change a parameter associated with a quantization step, operates concurrently with said first encoding means, and performs encoding at a compression ratio higher than a compression ration in said first encoding means;

second attribute data encoding means for determining an attribute of a target pixel block on the basis of data after quantization when the data is encoded by said second encoding means, and encoding the determination result;

amount monitoring means for monitoring an amount of data generated by said first encoding means, and detecting whether the amount of data has reached a predetermined amount;

parameter setting means for, when said amount monitoring means detects that the amount of data has reached the predetermined amount, setting, in said first encoding means, a parameter previously set in said second encoding means, and setting a new parameter in said second encoding means; and control means for, when the parameter is changed by said parameter setting means, storing data from said second encoding means in said storage means as data after change of the parameter in said first encoding means in place of data previously from said first encoding means, storing encoded data of attribute data from said second attribute data encoding means as compressed data of attribute data obtained by said first attribute data encoding means, and storing as successive data in said storage means the data encoded from first encoding means after change of the parameter.

43. An image processing method of encoding pixel data, comprising:

a first encoding step in which image data is orthogonally transformed, quantized, and encoded on a pixel block basis, and a parameter associated with a quantization step can be changed in quantization processing;

a first attribute data encoding step, of determining an attribute of a target pixel block on the basis of data after the quantization when the data is encoded in said first encoding step, and encoding the determination result;

a second encoding step which can change a parameter associated with a quantization step, operates concurrently with said first encoding step, and performs encoding at a compression ratio higher than a compression ratio in said first encoding step;

a second attribute data encoding step, of determining an attribute of a target pixel block on the basis of data after quantization when the data is encoded in said second encoding step, and encoding the determination result;

an amount monitoring step, of monitoring an amount of data generated in said first encoding step, and detecting whether the amount of data has reached a predetermined amount;

a parameter setting step, of, when it is detected in said data amount monitoring step that the amount of data has reached the predetermined amount, setting, in said first encoding step, a parameter previously set in said second encoding step, and setting a new parameter in said second encoding step; and a control step, of, when the parameter is changed in said parameter setting step, storing data from said second encoding step in predetermined storage means as data after change of the parameter in said first encoding step in place of data previously generated in said first encoding step, storing encoded data of attribute data from said second attribute data encoding step as encoded data of attribute data from said first attribute data encoding step, and storing as successive data in the storage means the data from said first encoding step after change of the parameter.

44. A computer program stored in a computer-readable medium which is loaded and executed by a computer to function as an image processing apparatus for encoding pixel data, ftmnctioning as first encoding means which orthogonally transforms, quantizes, and encodes image data on a pixel block basis, and can change a parameter associated with a quantization step in quantization processing;

first attribute data encoding means for determining an attribute of a target pixel block on the basis of data after the quantization when the data is encoded by said first encoding means, and encoding the determination result;

second encoding means which can change a parameter associated with a quantization step, operates concurrently with said first encoding means, and performs encoding at a compression ratio higher than a compression ration in the first encoding means;

second attribute data encoding means for determining an attribute of a target pixel block on the basis of data after quantization when the data is encoded by said second encoding means, and encoding the determination result;

amount monitoring means for monitoring an amount of data generated by said first encoding means, and detecting whether the amount of data has reached a predetermined amount;

parameter setting means for, when the amount monitoring means detects that the data amount has reached the predetermined amount, setting, in said first encoding means, a parameter previously set in said second encoding means, and setting a new parameter in said second encoding means; and control means for, when the parameter is changed by said parameter setting means, storing data from said second encoding means in the storage means as data after change of the parameter in said first encoding means in place of data previously generated by said first encoding means, storing encoded data of attribute data from said second attribute data encoding means as encoded data of attribute data obtained by said first attribute data encoding means, and storing as successive data in the storage means the data from the first encoding means after change of the parameter.

45. A computer-readable storage medium storing a computer program which is loaded and executed by a computer to function as an image processing apparatus for encoding pixel data, functioning as:

first encoding means which orthogonally transforms, quantizes, and encodes image data on a pixel block basis, and can change a parameter associated with a quantization step in quantization processing;

first attribute data encoding means for determining an attribute of a target pixel block on the basis of data after the quantization when the data is encoded by said first encoding means, and encoding the determination result;

second encoding means which can change a parameter associated with a quantization step, operates concurrently with said first encoding means, and performs encoding at a compression ratio higher than a compression ration in the first encoding means;

second attribute data encoding means for determining an attribute of a target pixel block on the basis of data after quantization when the data is encoded by said second encoding means, and encoding the determination result;

amount monitoring means for monitoring an amount of data generated by said first encoding means, and detecting whether the amount of data has reached a predetermined amount;

parameter setting means for, when the amount monitoring means detects that the data amount has reached the predetermined amount, setting, in said first encoding means, a parameter previously set in said second encoding means, and setting a new parameter in said second encoding means; and control means for, when the parameter is changed by said parameter setting means, storing data from said second encoding means in the storage means as data after change of the parameter in said first encoding means in place of data previously generated by said first encoding means, storing encoded data of attribute data from said second attribute data encoding means as encoded data of attribute data obtained by said first attribute data encoding means, and storing as successive data in the storage means the data from the first encoding means after change of the parameter.

46. An image processing apparatus which inputs image area information constituted by a plurality of image area component data for each pixel of multilevel-image data and encodes the image area information comprising:
- first encoding means for losslessly encoding inputted image area information;
- storage means for storing encoded image area information generated by said first encoding means;
- second encoding means for decoding the data stored in said storage means, losslessly encoding the decoded data again, and storing the re-encoded data in said storage means;
- monitoring means for monitoring an amount of data generated by said first encoding means and detecting whether the amount of data has exceeded a target amount; and
- control means for, when said monitoring means detects that the amount of data exceeds the target amount, causing said second encoding means to decode the encoded image area information stored in said storage means, to convert a part of image area component data in the decoded image area information, and to losslessly encode the converted image area information again, and causing said first encoding means to convert a part of image area component data in inputted image area information, which has not been encoded by said first encoding means.

47. The apparatus according to claim 46, wherein the image area component data contains data indicating whether a target pixel exists in a character•line drawing area or a halftone area, and data indicating whether the target pixel is a chromatic or achromatic pixel,
- wherein, when said monitoring means detects for the first time that an amount of data has exceeded the target amount, said control means causes said first and second encoding means to change image area component data which indicates that the pixel exists in a halftone area and is chromatic into data indicating that the pixel is chromatic, and
- wherein, when said monitoring means detects for the second time that an amount of data has exceeded the target amount, said control means causes said first and second encoding means to change image area component data which indicates that the pixel exists in a character•line drawing area and is achromatic into data indicating that the pixel is chromatic.

48. An image processing method which inputs image area information constituted by a plurality of image area component data for each pixel of multilevel-image data and encodes the image area information comprising:
- a first encoding step, of losslessly encoding inputted image area information;
- a storage step, of storing encoded image area information generated in said first encoding step;
- a second encoding step, of decoding the data stored in said storage step, losslessly encoding the decoded data again, and storing the re-encoded data in said storage step;
- a monitoring step, of monitoring an amount of data generated in said first encoding step and detecting whether the amount of data has exceeded a target amount; and
- a control step, of when said monitoring step determines detects that the amount of data exceeds the target data amount, causing said second encoding step to decode the encoded image area information stored in said storage means, to convert a part of image area component data in the image area information, and to losslessly encode the converted image area information again, and causing said first encoding step to convert a part of image area component data in inputted image area information, which has not been encoded in said first encoding step.

49. The method according to claim 48, wherein the image area component data contains data indicating whether a target pixel exists in a character•line drawing area or a halftone area, and data indicating whether the target pixel is a chromatic or achromatic pixel,
- wherein, when said monitoring step detects for the first time that an amount of data has exceeded the target amount, said control step causes said first and second encoding steps to change image area component data which indicates that the pixel exists in a halftone area and is chromatic into data indicating that the pixel is chromatic, and
- wherein, when said monitoring step detects for the second time that an amount of data has exceeded the target amount, said control step causes said first and second encoding steps to change image area component data which indicates that the pixel exists in a character•line drawing area and is achromatic into data indicating that the pixel is chromatic.

50. A computer-readable storage medium storing a computer program which is loaded and executed by a computer to function as image processing apparatus which inputs image area information constituted by a plurality of image area component data for each pixel of multilevel-image data and encodes the image area information, comprising:
- first encoding means for losslessly encoding inputted image area information;
- storage means for storing encoded image area information generated by said first encoding means;
- second encoding means for decoding the data stored in said storage means, losslessly encoding the decoded data again, and storing the re-encoded data in said storage means;
- monitoring means for monitoring an amount of data generated by said first encoding means and detecting whether the amount of data has exceeded a target amount; and
- control means for, when said monitoring means detects that the amount of data exceeds the target data amount, causing said second encoding means to decode the encoded image area information stored in said storage means, to convert a part of image area component data in the decoded image area information, and to losslessly encode the converted image area information again, and causing said first encoding means to convert a part of image area component data in inputted image area information, which has not been encoded by said first encoding means.

51. The computer-readable storage medium according to claim 50, wherein the image area component data contains data indicating whether a target pixel exists in a character•line drawing area or a halftone area, and data indicating whether the target pixel is a chromatic or achromatic pixel,
- wherein, when said monitoring means detects for the first time that an amount of data has exceeded the target amount, said control means causes said first and second encoding means to change image area component data which indicates that the pixel exists in a halftone area and is chromatic into data indicating that the pixel is chromatic, and wherein, when said monitoring means detects for the second time that an amount of data has exceeded the target amount, said control means causes said first and second encoding means to change image area component data which indicates that the pixel exists in a character•line drawing area and is achromatic into data indicating that the pixel is chromatic.

* * * * *

UNITED STATES PATENT AND TRADEMARK OFFICE
CERTIFICATE OF CORRECTION

| | |
|---|---|
| PATENT NO. | : 7,257,264 B2 |
| APPLICATION NO. | : 10/230276 |
| DATED | : August 14, 2007 |
| INVENTOR(S) | : Tadayoshi Nakayama et al. |

It is certified that error appears in the above-identified patent and that said Letters Patent is hereby corrected as shown below:

ON COVER PAGE ITEM (75) INVENTORS

"Ken-Ichi Ohta," should read --Ken-ichi Ohta,--.

ON COVER PAGE AT (56) FOREIGN PATENT DOCUMENTS

"0469835 A" should read --0 469 835 A--.

COLUMN 11

Line 56, "instep" should read --in step--; and
Line 62, "instep" should read --in step--.

COLUMN 12

Line 51, "207" should read --207.--.

COLUMN 15

Line 49, "an" should read --a--.

COLUMN 19

Line 36, "descried" should read --described--.

COLUMN 20

Line 46, "17017" should read --1717--.

COLUMN 24

Line 57, "instep" should read --in step--.

COLUMN 26

Line 35, "descried" should read --described--.

COLUMN 28

Line 17, "the" should be deleted.

UNITED STATES PATENT AND TRADEMARK OFFICE
CERTIFICATE OF CORRECTION

PATENT NO. : 7,257,264 B2
APPLICATION NO. : 10/230276
DATED : August 14, 2007
INVENTOR(S) : Tadayoshi Nakayama et al.

It is certified that error appears in the above-identified patent and that said Letters Patent is hereby corrected as shown below:

COLUMN 31

Line 34, "the" should be deleted.

COLUMN 32

Line 34, "instep" should read --in step--.

COLUMN 33

Line 14, "descried" should read --described--.

COLUMN 34

Line 66, "the" should be deleted.

COLUMN 37

Line 30, "has" should read --has been--.

COLUMN 38

Line 15, "pixel" should read --pixel is--.

COLUMN 42

Line 46, "descried" should read --described--.

COLUMN 43

Line 55, "37c," should read --37C,--.

COLUMN 55

Line 17, "mount" should read --amount--.

COLUMN 56

Line 67, "207" should read --207.--.

UNITED STATES PATENT AND TRADEMARK OFFICE
CERTIFICATE OF CORRECTION

PATENT NO.      : 7,257,264 B2
APPLICATION NO. : 10/230276
DATED           : August 14, 2007
INVENTOR(S)     : Tadayoshi Nakayama et al.

It is certified that error appears in the above-identified patent and that said Letters Patent is hereby corrected as shown below:

COLUMN 60

Line 18, "and," should read --and--; and
Line 28, "code" should be deleted.

COLUMN 62

Line 32, "compressing" should be deleted;
Line 43, "the" should read --the data--; and
Line 58, "amount." should read --amount--.

COLUMN 63

Line 21, "code" should be deleted;
Line 44, "ing" should read --ing,--; and
Line 65, "encoding in" should read --encoded in--.

COLUMN 65

Line 28, "encoding" should read --encoding means--;
Line 30, "and" should be deleted;
Line 36, "code" should be deleted;
Line 37, "means," should read --means; and--; and
Line 64, "re-encodina" should read --re-encoding--.

COLUMN 66

Line 51, "encoding" should read --encoded--;
Line 55, "encoding" should read --encoded--; and
Line 60, "selling" should read --setting--.

COLUMN 67

Line 65, "compressing" should be deleted.

COLUMN 68

Line 39, close up right margin; and
Line 40, close up left margin.

UNITED STATES PATENT AND TRADEMARK OFFICE
CERTIFICATE OF CORRECTION

PATENT NO. : 7,257,264 B2
APPLICATION NO. : 10/230276
DATED : August 14, 2007
INVENTOR(S) : Tadayoshi Nakayama et al.

It is certified that error appears in the above-identified patent and that said Letters Patent is hereby corrected as shown below:

COLUMN 69

Line 15, "of" should read --of,--; and
Line 28, "of;" should read --of,--.

COLUMN 70

Line 6, "of" should read --of,--.

COLUMN 72

Line 54, "a line" should read --a character line--.

COLUMN 73

Line 9, "data;" should read --data,--;
Line 14, "of" should read --of,--; and
Line 33, "an" should read --a--.

COLUMN 74

Line 23, "code" should be deleted.

COLUMN 75

Line 9, "re-encoded" should read --re-encoding--; and
Line 61, "first" should read --¶ first--.

COLUMN 78

Line 42, "ration" should read --ratio--.

COLUMN 79

Line 47, "ftmnctioning" should read --functioning--; and
Line 62, "ration" should read --ratio--.

UNITED STATES PATENT AND TRADEMARK OFFICE
CERTIFICATE OF CORRECTION

PATENT NO. : 7,257,264 B2
APPLICATION NO. : 10/230276
DATED : August 14, 2007
INVENTOR(S) : Tadayoshi Nakayama et al.

It is certified that error appears in the above-identified patent and that said Letters Patent is hereby corrected as shown below:

COLUMN 80

Line 39, "ration" should read --ratio--.

COLUMN 81

Line 48, "information" should read --information,--; and
Line 61, "determines" should be deleted.

Signed and Sealed this

Twenty-sixth Day of August, 2008

JON W. DUDAS
*Director of the United States Patent and Trademark Office*